United States Patent [19]
Gates et al.

[11] Patent Number: 5,225,975
[45] Date of Patent: * Jul. 6, 1993

[54] NETWORK PROGRAMMABLE LOGIC CONTROLLER SYSTEM WITH LADDER EDITOR AND PARALLEL AND SYNCHRONOUS LOGIC AND I/O SCANNING

[75] Inventors: Dirk I. Gates, Woodland Hills, Calif.; Walter W. Kurczewski, Northbrook, Ill.

[73] Assignee: Square D Company, Palatine, Ill.

[*] Notice: The portion of the term of this patent subsequent to Nov. 6, 2007 has been disclaimed.

[21] Appl. No.: 595,249

[22] Filed: Oct. 10, 1990

Related U.S. Application Data

[63] Continuation-in-part of Ser. No. 176,831, Apr. 4, 1988, Pat. No. 4,969,083.

[51] Int. Cl.5 .............................................. G01F 13/10
[52] U.S. Cl. ...................................... 364/147; 364/136
[58] Field of Search ............... 364/147, 136, 228, 231, 364/238.3, 280.2, 280.7, 923.71, 935.2; 395/163, 275

[56] References Cited

U.S. PATENT DOCUMENTS

| | | | |
|---|---|---|---|
| 4,165,534 | 8/1979 | Dummermuth et al. | 364/136 |
| 4,217,658 | 8/1980 | Henry et al. | 364/147 |
| 4,663,704 | 5/1987 | Jones et al. | 364/147 |
| 4,969,083 | 11/1990 | Gates | 364/147 |
| 5,005,152 | 4/1991 | Knutsen | 395/700 |
| 5,058,052 | 10/1991 | Sexton et al. | 364/900 |

Primary Examiner—Jerry Smith
Assistant Examiner—Paul Gordon
Attorney, Agent, or Firm—Larry I. Golden; Michael J. Femal

[57] ABSTRACT

A programmable logic controller system having the capability of controlling up to 64 clusters of peripheral controllers, wherein each cluster has up to seven racks of peripheral controllers, each rack having up to 16 individual peripheral controllers. Excepting for the cluster containing the programmable logic controller, each cluster is coupled to the programmable logic controller through an ethernet cable to a cluster controller. Each of the seven racks of peripheral controller cards is connected to its respective programmable logic controller or cluster controller directly (for the first rack) or through a local rack adaptor (for the other six racks). The programmable logic controller generates data, address and control signals which are used by the peripheral controllers to operate machines and equipment on an assembly line. The data, address and control signals are generated by a ladder diagram created and modified in a separate personal computer, which may be coupled to the programmable logic controller through an ethernet cable. The code representing the ladder diagram created in the personal computer is downloaded through the ethernet cable to the programmable logic controller. The ladder diagram is created and edited using a ladder editor program having the following features: scrolling, zoom in/out, free format line drawing, real time incremental compiler/linker, dynamic reconfiguration.

17 Claims, 7 Drawing Sheets

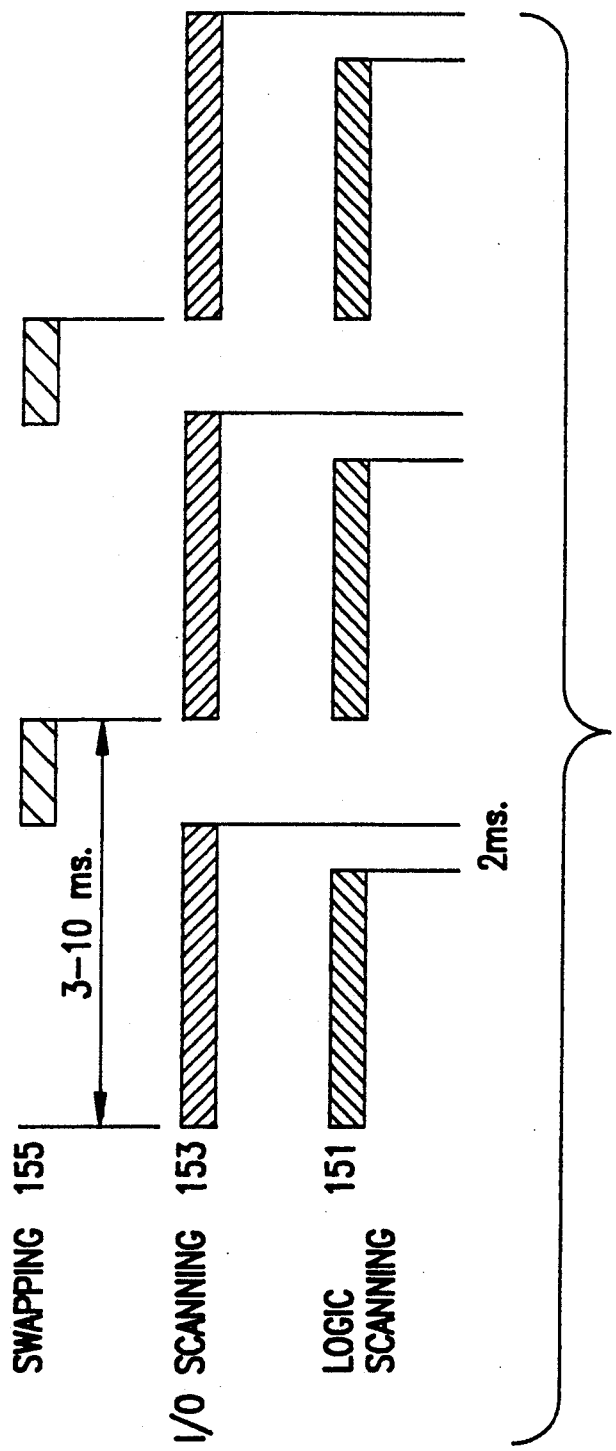

NETWORK PROGRAMMABLE LOGIC CONTROLLER SYSTEM WITH LADDER EDITOR AND PARALLEL AND SYNCHRONOUS LOGIC AND I/O SCANNING

This is a continuation-in-part of application Ser. No. 176,831 filed Apr. 4, 1988 now U.S. Pat. No. 4,969,083.

BACKGROUND OF THE INVENTION

1. Field Of The Invention

The invention relates to the field of programmable logic controllers which are used to control machinery and equipment for automated and partially automated assembly lines. The controllers are programmed by the use of ladder diagrams wherein elements of a ladder diagram represent relays, switches and the like associated with the equipment and machinery on the assembly line.

2. Prior Art

Prior art programmable logic controllers can be directly coupled to up to 16 peripheral controllers which serve to interface the assembly line machinery and equipment to the programmable logic controller. Additionally, prior art programmable logic controllers can indirectly control six additional racks of sixteen peripheral controllers by using local rack adapters, there being one local rack adapter for each rack of sixteen peripheral controllers, for a total of 896 inputs and 896 outputs (assuming 8 inputs and 8 outputs per peripheral controller). Ladder diagrams which are, in effect, the program used by the programmable logic controller to generate the appropriate control, data and address signals for the peripheral controllers, are created and edited using a separate processor such as a personal computer or minicomputer. The completed ladder diagram is recorded on magnetic tape or disk which is removed from the processor which created the ladder diagram, and read into the memory of the programmable logic controller through a disk or tape drive connected to the programmable logic controller. A representative prior art programmable logic controller is a Model 700 Controller manufactured by Square D Company.

Prior art ladder editors are typically part of the programming panel of the prior art programmable controllers.

SUMMARY OF THE INVENTION

The present invention is directed to a programmable logic controller system having the capability of controlling up to 64 clusters of peripheral controllers, wherein each cluster has up to seven racks of peripheral controllers, each rack having up to 16 individual peripheral controllers. Excepting for the cluster containing the programmable logic controller, each cluster is coupled to the programmable logic controller through an ethernet cable to a cluster controller. Each of the seven racks of peripheral controller cards is connected to its respective programmable logic controller or cluster controller directly (for the first rack) or through a local rack adaptor (for the other six racks). The programmable logic controller generates data, address and control signals which are used by the peripheral controllers to operate machines and equipment on an assembly line. The data, address and control signals are generated by a ladder diagram created and modified in a separate personal computer, which may be coupled to the programmable logic controller through an ethernet cable. The code representing the ladder diagram created in the personal computer is downloaded through the ethernet cable to the programmable logic controller. The ladder diagram is created and edited using a ladder editor program having the following features: scrolling, zoom in/out, free format line drawing, real time incremental compiler/linker, dynamic reconfiguration.

Assuming an eight bit data path, each peripheral controller controls up to eight points such as an on/off switch. Since each controller has an input channel and an output channel, there are, in effect, 16 control lines available per controller, although only 8 are available at a time for input or output. Thus, within a group of 16 peripheral controllers, up to 256 points may be controlled (128 input points and 128 output points). Within a cluster of 7 racks of 16 peripheral controllers, up to 1792 points can be controlled with a single programmable logic controller (and 6 local rack adaptors). Similarly, when the full complement of 64 clusters is installed, up to 114,688 points can be controlled by the single programmable logic controller, 63 cluster controllers and 384 local rack adaptors (i.e., six local rack adaptors per cluster).

Using a personal computer coupled to the programmable logic controller through an ethernet cable, the ladder diagram used in the system can be easily and dynamically modified as required. The programmable logic controller includes two processors, one of which scans the peripheral controllers and reads the status of the various points (I/O scan) while the other performs calculations using the data read during on I/O scan (logic scan). In the present invention, the I/O scan and the logic scan are performed synchronously and in parallel.

BRIEF DESCRIPTION OF THE DRAWINGS

FIG. 7 is a diagram showing the relationship between a logic scan and an I/O scan.

DETAILED DESCRIPTION OF THE INVENTION

Figure 1:
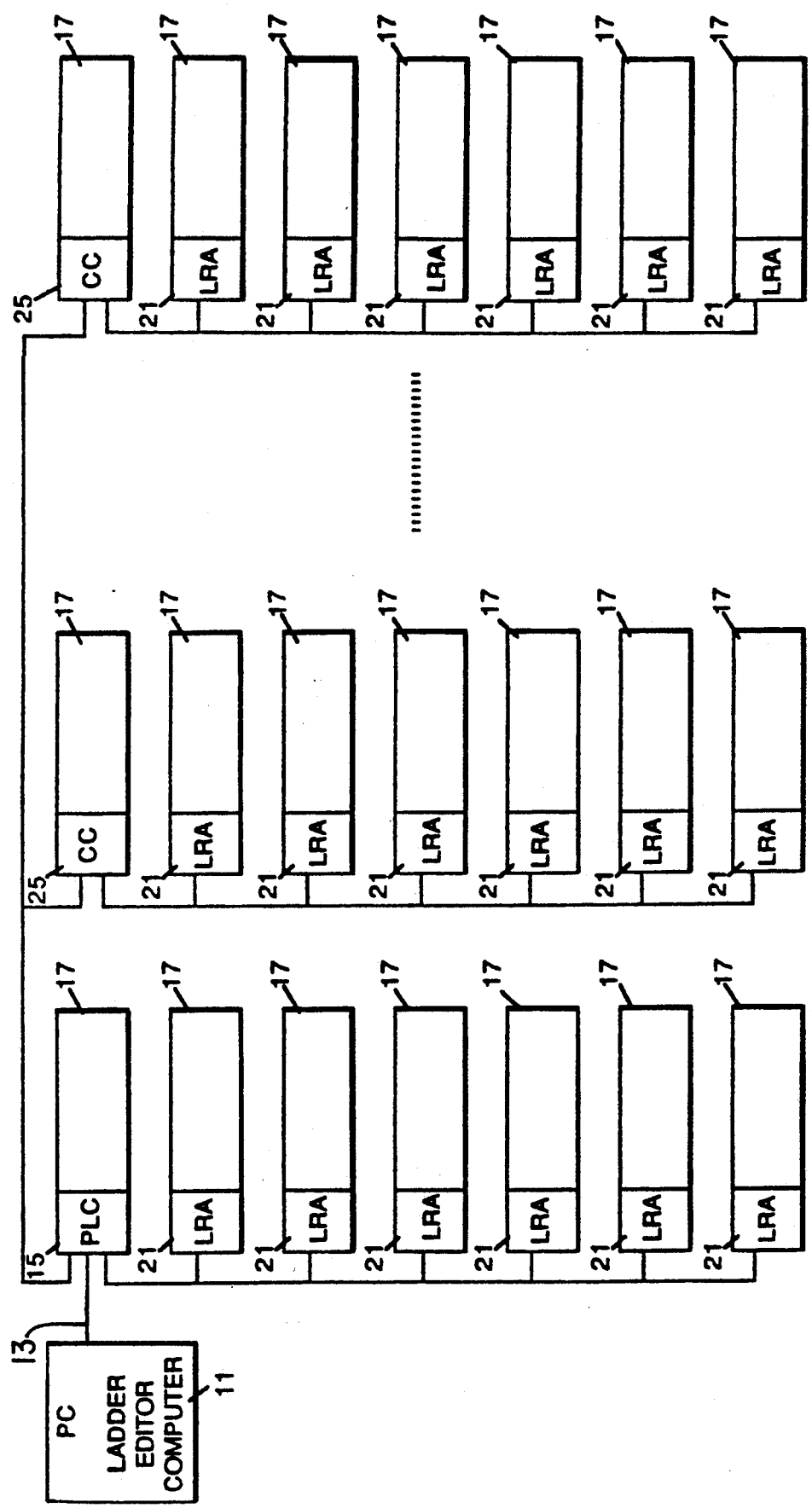
FIG. 1 is an overview diagram of the invented programmable logic controller system showing the use of a single programmable logic controller to control up to 64 clusters, each containing seven racks of peripheral controllers.

Referring first to FIG. 1, the components of the invented programmable logic controller system are shown as personal computer (PC) 11 which is coupled through an ethernet cable 13 to programmable logic controller (PLC) 15. PLC 15 controls up to sixteen peripheral controllers 17 directly and, indirectly, six additional local racks, each having up to sixteen peripheral controllers, through local rack adaptors 21. PLC 15 is also shown coupled through an ethernet cable to up to 63 cluster controllers 25. In this manner, PLC 15 and each cluster controller 25, directly control up to sixteen peripheral controllers 17, and indirectly control up to sixteen peripheral controllers in each of six racks through six local rack adapters 21. Within a cluster, each local rack adapter is coupled to its adjacent local rack adapter, cluster controller or PLC by a 50 conductor cable.

Figure 2:
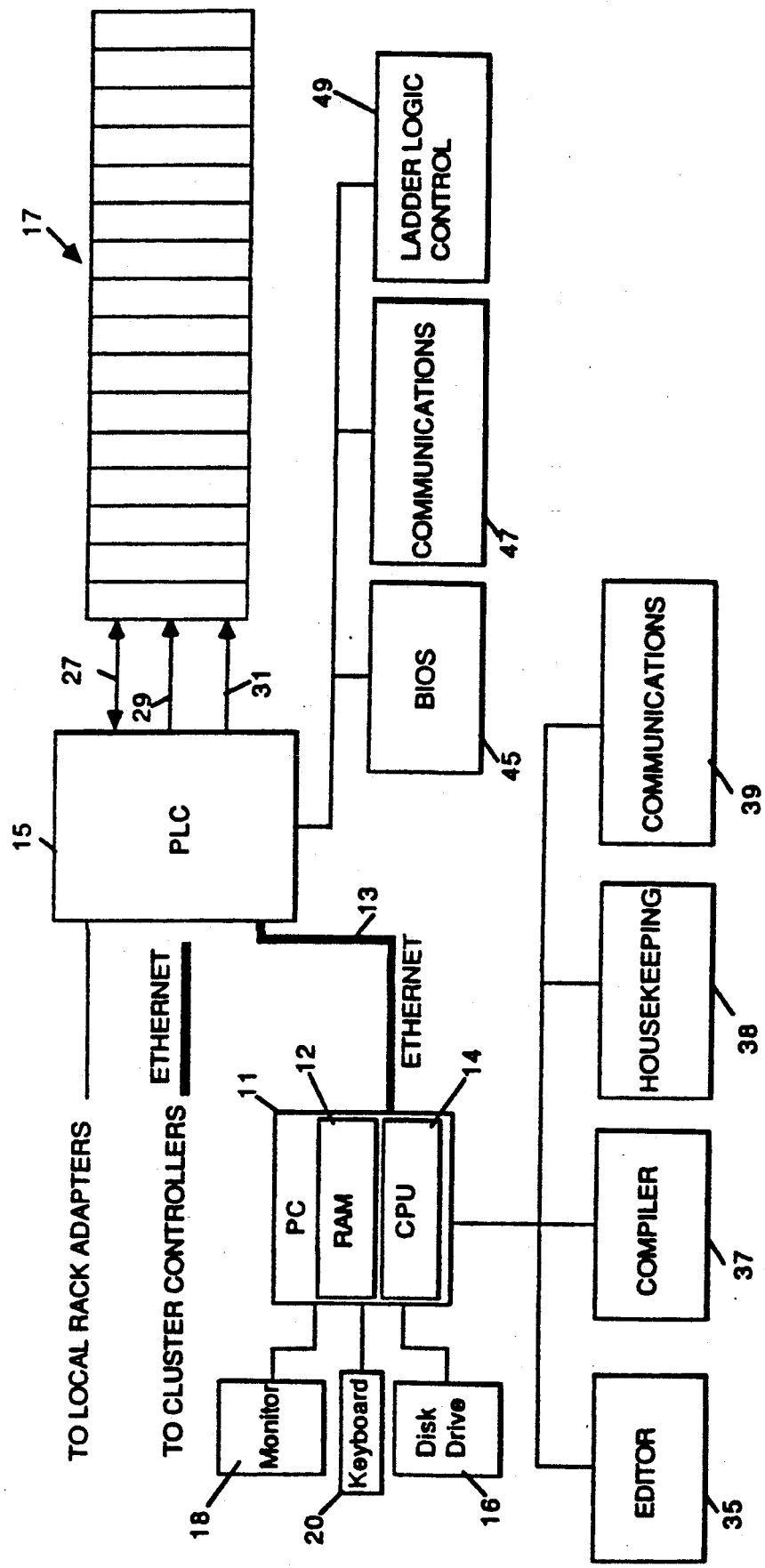
FIG. 2 is an overview block diagram showing the various functional elements coupled to a programmable logic controller for use in the present invention.

FIG. 2 illustrates in further detail the relationships between the major components of the invented programmable logic controller system. Specifically, PLC 15 is coupled to peripheral controller 17 through an 8 bit data bus 27, a six line control bus 29 and an 8 bit address bus 31.

PLC 15 is coupled to PC 11 through an ethernet cable 13. Personal computer II may be any commercially available personal computer, but in the preferred embodiment, is an IBM PC/XT, IBM PC/AT or compatible. PC 11 performs three tasks which are shown in FIG. 2 as the editor task 35, the compiler task 37, the housekeeping task 38 and the communications task 39. The compiler task should have the capability of generating executable object code from ladder diagram source code on a line by line basis. A suitable compiler task which may be used in the present invention is disclosed in U.S. Pat. No. 4,722,071 which issued Jan. 26, 1988. Editor task 35, housekeeping task 38 and communications task 39 will be described in detail below.

Figure 4:
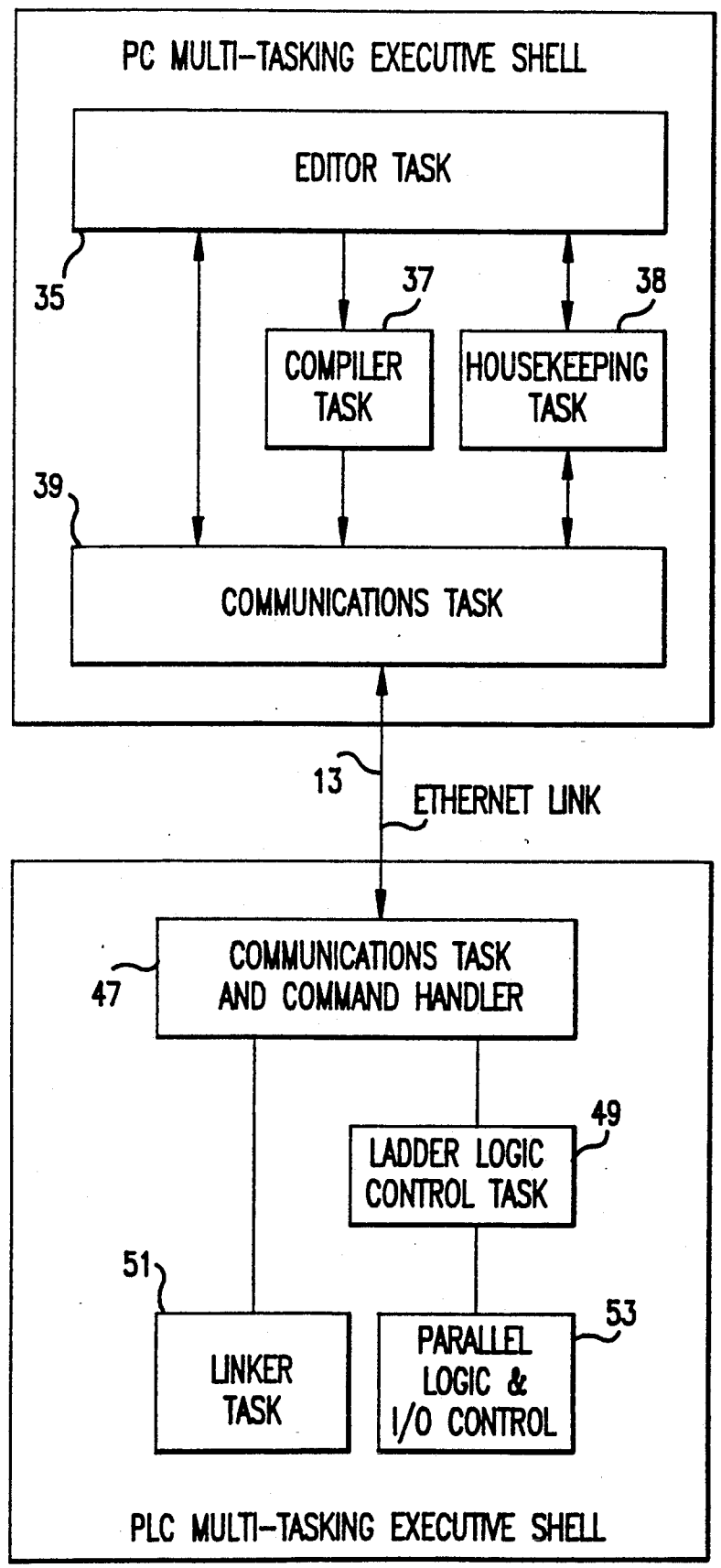
FIG. 4 is an overview block diagram illustrating the relationship of various software tasks necessary to implement the invented programmable logic controller system.

PLC 15 in the present invention performs the three task which are shown in FIG. 2 as the basic input output system (BIOS) task 45, communications task 47 and ladder logic control task 49. Details of each of the foregoing tasks and sub tasks will be described below. The logical relationships between the foregoing tasks is shown in FIG. 4, which shows the PC 11 tasks under control of a PC multitasking executive shell and the PLC 15 tasks and subtasks under control of a PLC multitasking executive shell.

Figure 3:
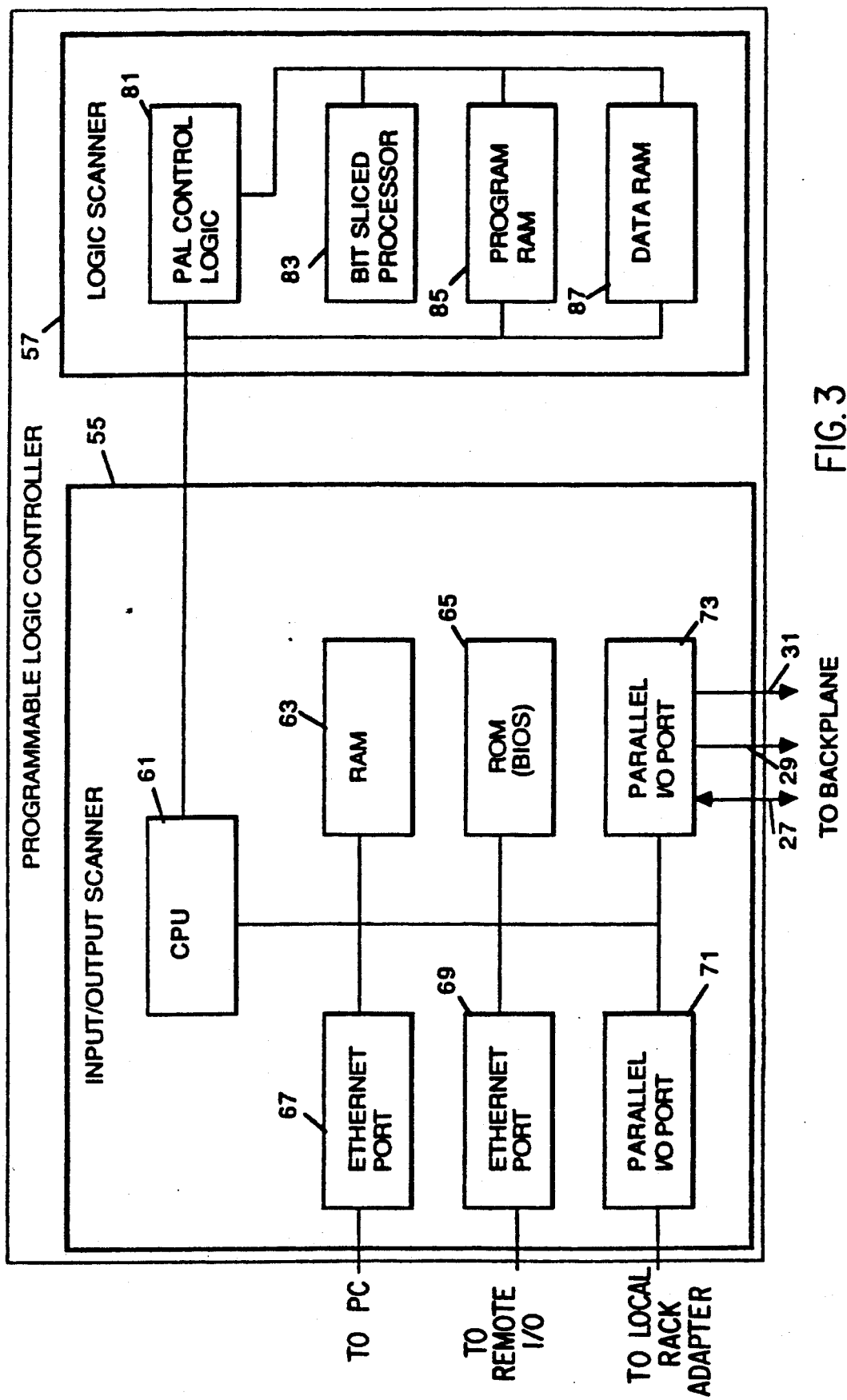
FIG. 3 is a block diagram showing the components of a programmable logic controller for use in the invented system.

The components necessary to implement PLC 15 in the present invention are shown in block diagram form in FIG. 3 and comprise input/output scanner 55 and logic scanner 57.

Input/output scanner 55 includes a central processing unit (CPU) 61, random access memory (RAM) 63, read only memory (ROM) 65, ethernet ports 67 and 69 and parallel I/O ports 71 and 73.

Logic scanner 57 comprises PAL control logic 81, bit sliced processor 83, program RAM 85 and data RAM 87.

DESCRIPTION OF PC II TASKS

PC II is a commercially available personal computer with a disk drive, display monitor and printer such as on IBM PC/XT, or IBM PC/AT running with a multitasking executive shell such as OS/2 available from Microsoft Corporation or Intel's RMX 86 or AT&T's UNIX.

Editor Task 35

Editor task 35 creates and modifies ladder source code. A ladder diagram is a diagram of a group of parallel lines called rungs, each rung representing an arrangement of contacts, coils and/or switches and their status (normally open or normally closed contacts, energized or unenergized coils and on or off switches). As each rung of the ladder is created or modified, a pointer to that rung is sent to compiler task 37.

When editor task 35 is initiated, an initialization 100 takes place which loads into memory a selected ladder diagram or a default ladder diagram. Once the initialization has been completed, an edit step commences which sets up a screen display of the ladder in memory and then executes a program loop which performs one of four types of editing or related functions as follows: a) command mode; b) data monitor display mode; c) element mode; or d) line mode. In command mode, editing and supervisory commands are entered. In element mode, the various elements of the ladder are installed and removed. In data monitor mode, blocks of ladder data are displayed in various formats. In line mode, elements entered in Element Mode are connected.

Figure 5:
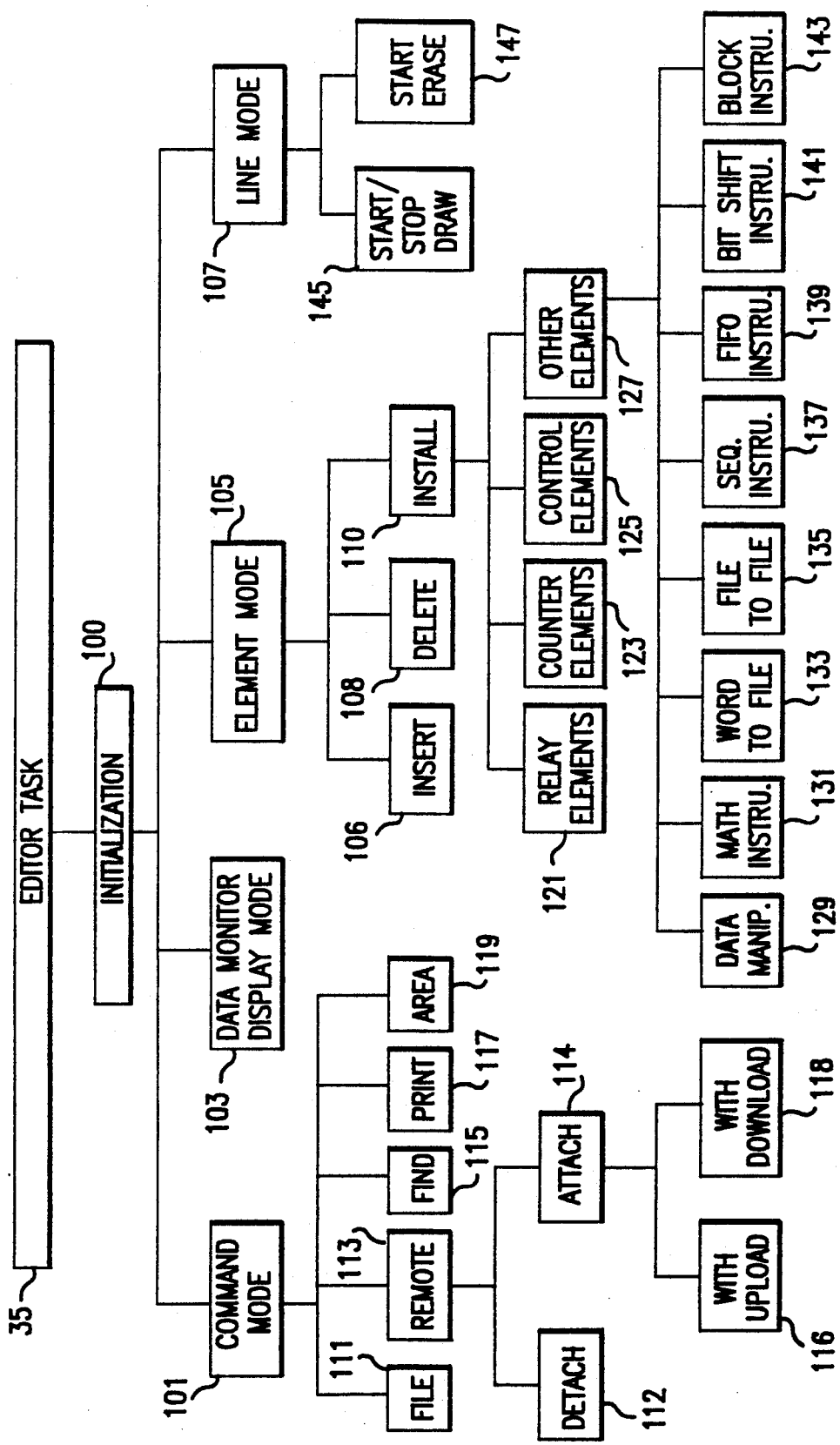
FIG. 5 is a block diagram illustrating the main functions performed by an editor task.

Referring now to FIG. 5, the various functions, i.e., Command Mode 101, Data Monitor Display Mode 103, Element Mode 105 and Line Mode 107, and sub-functions of editor task 35 will be described. References to the "cell locator" means the position of a cursor on a video display of a ladder diagram. The position of the cursor is either on a single element or on a space where a single cell may be added.

Command Mode

Command mode 101 provides File commands 111, Remote commands 113, Find commands 115, Print commands 117 and Area commands 119.

File Commands

The File commands 111 are Load, Save, Directory, Delete, Clear and Exit. The Load command transfers a file containing source code and object code for a PLC 15 from a storage device coupled to PC 11 into PC 11 memory. Similarly, the Save command transfers the entire loaded object code area from PC 11 memory to a specified destination file on a storage device coupled to PC 11. The Directory command lists the files stored on a disk or other storage media on a storage device coupled to PC II. The Delete command removes a specified file from a disk or other storage media coupled to PC 11. The Clear command erases the entire source and object code stored in PC 11 memory. If any modifications were made since the code was last loaded or saved, a message is displayed reminding the operator to save the current ladder in memory if desired. The Exit command returns control to the computer operating system or switches to Line Mode, Element Mode or Data Monitor Display Mode.

Remote Commands

Remote commands 113 are used to attach the editor task 35 in PC 11 to a PLC 15. The available remote commands are Detach 112 which causes the editor task 35 to be detached from PLC 15, and Attach 114 which provides the sub-commands i) attach and up-load ladder from controller 116; and ii) detach and down-load ladder to controller 118. For the attach to controller with up-load sub-command, the name of the PLC to which the editor is to be attached is entered. Assuming that the PLC's name which has been entered is recognized and is not currently attached to another editor, the program currently resident in the controller in program RAM 85 is up-loaded to PC 11 through ethernet 13. The specifics of the handling of the data over ethernet 13 are handled by communications task 39 in PC 11 and communications task 47 in PLC 15. Similarly, when the attach and down-load sub-command is selected, the name of the PLC to which the editor is to be attached must be provided If a valid PLC name has been entered which is not attached to another editor, the editor is attached to the specified controller and the program currently associated with the editor task is down-loaded to the controller into program RAM 85 over ethernet 13.

Find Commands

The Find commands 115 are Rung, Element, Word/bit, Coil and Replace word/bit. The Find commands are used to locate a specific item in a ladder. In the case of Replace word/bit, the word/bit address, when found can be replaced with a different word/bit address. With the exception of Find Rung, the Find commands are directional; that is, the search is from, but not including, the current position of the cell locator forward, i.e., towards the end of the ladder or backward, i.e., towards the beginning of the ladder.

Find Rung requests that a specific rung be specified by number and, therefore, the direction of the search is not applicable. If the Find Rung command is selected, a prompt requesting a number of the rung to be found is displayed. If the entered rung number is found, it and as many following rungs as will fit in the work area of the video display are displayed. If the rung is too large to be displayed in its entirety, as much of the rung as possible is displayed, with the remainder being displayed using the cell locator positioning keys, typically left, right and up, down arrow keys on a keyboard coupled to PC 11.

If Find Element is selected, the direction of the search is requested and then the element to be searched for is specified using the Element mode menus (described below).

If Find Word/bit is selected, after the search direction has been provided, the word/bit value to be searched for is prompted. A word address alone or a combined word/bit address, which may be either a symbol or a numeric word and bit values must be entered. If an element with the specified word/bit address is not found, an error message so indicating is displayed, otherwise the requested word/bit which is found is displayed.

Find Coil operates the same as Find Word/bit, except the search is limited to coil type elements.

If Replace Word/bit is selected, once the direction of the search has been selected, the word/bit value to be replaced is prompted for as described above, after which the new word/bit value is prompted for. Once the replacement value has been entered, the ladder is searched in the specified direction for the value to be replaced. If the word/bit address to be replaced is found, the cell locator is placed on the element with the word/bit address and the user is given the option to replace, don't replace, replace all or quit. If replace is selected, the value at the current location is replaced, and a search for the next occurrence of the value is made and the operator is given the same selection. If don't replace is selected, the value at the current location is unchanged, and a search for the next occurrence of the value is made and the same choices noted above are provided to the operator. If replace all is selected, the value at the current location, and all the subsequent values found in the direction of the search are replaced with no further operator involvement. If quit is selected, the find and replace operation is terminated, leaving the current and all other values unchanged.

Print Commands

The Print commands 117 are Ladder, Rung, Symbols and Cross reference. Print Ladder causes the entire ladder program to be printed in a format similar to the ladder display format with rung numbers printed in the left margin. Print Rung causes the entire rung on which the cell locator is positioned to be printed in a format similar to the display format. Print Symbols prints the entire symbol table for the ladder in alphabetical order. Print Cross reference prints an output of all symbols in the current ladder, each followed by an ordered list of all rungs referencing that symbol.

Area Commands

Area commands 119 are used to operate on areas of the ladder. The area bounds are marked using the Mark sub-command described below. The marked area can then be moved, copied or deleted. The Area commands are Mark, End mark, Unmark, Move, Copy and Delete. The Mark command causes the marked area to begin at the current position of the cell locator. The bounds of the marked area can be extended in any direction by moving the cell locator. The moving cell locator represents the diagonally opposite corners of a rectangle. If any part of a large element lies within the marked area, the marked area is extended horizontally and vertically, if necessary, to include the entire element. Once the desired area has been marked, the End mark command is selected to designate the marked area. When a desired area has been marked, the marked area can then be moved or copied as described below. If Unmark is selected, the marked area is unmarked. If the Move command is selected, the marked area is deleted from its present position and inserted at the current position of the cell locator. Any space required to receive the moved area is obtained by moving existing elements to the right and down. The original area is closed up by moving remaining elements in the rung up and to the left. Vertical and horizontal shorts are maintained if possible. However, manual reconstruction of shorts may be required. After a move, the moved area remains marked permitting subsequent moves or copies. The Copy command causes a copy of the marked area to be inserted at the current position of the cell locator. Space required for the copy is obtained by moving elements to the right and down. The original marked area is unchanged. As with the Move command, vertical and horizontal shorts will be connected if possible, however, manual connection of shorts may be required. The copied area remains marked permitting subsequent moves or copies.

The Delete command is used to remove marked areas from the ladder. The area deleted is closed up by moving remaining elements in the rung up and to the left. Again, vertical and horizontal shorts will be maintained if possible, and manual reconstruction of shorts may be required. Thus, the present invention implements as part of an editor task for ladder diagrams, word processing type functions such as find, replace, move, copy etc., which operations are typically not available in prior art ladder editors.

Figure 6:
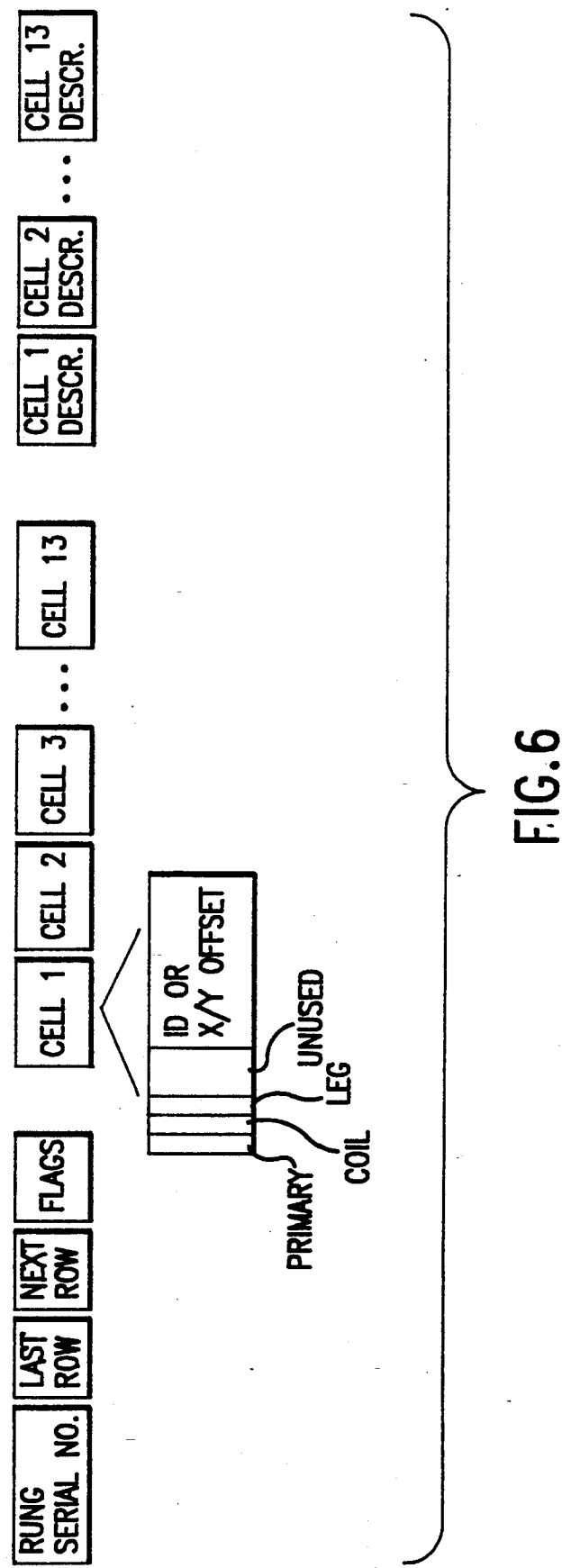
FIG. 6 is a diagram of the data structure of a single rung of a ladder.

The capability of editing ladder diagram using word processing type commands is made possible by the ladder diagram storage structure utilized which will now be described with reference to FIG. 6. A ladder rung is defined as a row of N cells (Cell 1–Cell N), wherein each cell is defined as being 16 bits in length, with one bit specifying whether the cell is a primary cell, one bit specifying whether the cell is a coil cell, and one bit specifying whether the cell is a leg cell. The low order eight bits are used to provide a four bit Y offset to the primary cell and a four bit X offset to the primary cell of the element. In the preferred embodiment, N is 13 such that each rung has 13 cells which is a convenient length for displaying on video displays frequently employed with personal computers. Also associated with each row is a rung serial number which uniquely identifies each rung, a pointer to the row before and the row after the present row, flags which specify whether the row is occupied, whether the row is too complex for compilation and whether the row is in a marked area. Additionally, associated with each cell is a four byte cell descriptor which provides element specific information and scratch pad areas which are used to identify the type of element (contact, coil, timer, logic statement) and provide display information (diagram symbol, name location in rung).

DATA MONITOR DISPLAY MODE 103

In Data Monitor Display Mode, a window is opened on the screen showing the contents of the word or file address for a selected ladder element (i.e., the element on which the cell locator was placed when Data Monitor Display Mode was selected). If the cell locator is on a timer or counter, the window will display the accumulator and preset contents of that element. If the cell locator is on a word or file block, all addresses associated with that particular file range are displayed. If no element, timer, counter, word or file block has been selected, the operator is prompted for an address. The address provided is shown in the top box of the window and addresses relative to the one selected are shown below. The operator can then scroll up and down to the window to either view or make changes to the contents. The address contents may be displayed in binary, octal, decimal, binary coded decimal, hexidecimal or ASCII.

ELEMENT MODE 105

In Element Mode 105, the cursor or cell locator is a box the size of the element on which it is located. If the cell locator is not on an element, the box is the size of a single cell. When an element is selected, the cell locator expands, if necessary, to enclosed the entire element. Cell locator movement in element mode is always from element or element position, to element or element position. Elements are normally installed on "white space" or in place of a previously installed element. Element Mode is the manner in which prior art ladder editors are typically implemented such as shown in Allen Bradley's operation manual for its PLC-2-30 controller.

In this connection, as shown in FIG. 5, the main commands of Element Mode are Insert 105, Delete 108 and Install 110.

The Insert command inserts rows by spreading the row above and the row containing the cell locator to insert a new rung. Additional Insert commands are Insert left and Insert right which insert an element to the left or right of the element on which the cell locator is positioned; Force-on which forces to the On or true state the contact on which the cell locator is placed; Force-Off which forces to the Off or false state the contact on which the cell locator is placed; Delete Force which removes the force and condition (either on or off) from the contact on which the cell locator is placed.

The Delete command 108, deletes a row, an element, or a force.

The Install command 110 itself has the subcommands Install Relay Elements 121, Install Counter Elements 123, Install Control Elements 125 and Install Other Elements 127. The Install Other Elements command has the further subcommands: Data Manipulation Instructions 129, Arithmetic Instructions 131, Word to File Instructions 133, File to File Instructions 135, Sequencer Instructions 137, FIFO Instructions 139, Bit Shift Register Instructions 141 and Block Instructions 143. The details concerning the various commands and subcommands of the Install function, as well as other Element Mode commands Delete and Insert are well known in the prior art as noted above, and therefore will not be further described herein.

LINE MODE

Line Mode 107 has the commands; Start Draw/Stop Draw 145, and Start Erase/Stop Erase 147. In Line Mode, the cursor is a small rectangle. When line drawing is enabled, the rectangle contains a blinking "#". When line erasing is enabled, the rectangle contains a small blinking square. The line mode cursor is placed at a position where vertical and horizontal shorts could intersect and never within an element; however, actual shorts need not exist at the intersection point.

The cursor can be moved without drawing or erasing lines or moved to draw a line or moved to erase a line. An element can be connected to another element by drawing to the element in line with the element's connection stubs.

Line Mode provides an easy and efficient mechanism for connecting and disconnecting elements in a ladder diagram after they have been installed in Element Mode, which capability is not available in the prior art which uses Element Mode Instructions start branch element and end branch element rather than free form line drawing.

The source code of a program in the language C for performing the above described functions of editor task 35 is shown at the end of the description of the invention but before the claims. Of course, the inventive concepts may be incorporated in other computer programs in other languages without departing from the spirit and scope of the invention as defined in the claims.

Compiler Task 37

Compiler task 37 creates object code for each rung from the source code created or modified by editor task 35. Additionally, compiler task 37 may compress the source code by removing unused fields in the source. A complete description and source code listing for a suitable compiler task 37 is set forth in U.S. Pat. No. 4,722,071 which issued Jan. 26, 1988.

Housekeeping Task 38

Housekeeping task 38 creates and maintains a list of data table values representing elements that are presently being displayed by editor task 35. Additionally, housekeeping task 38 dispatches messages to communications task 39 to retrieve the latest values of the contacts generated by PLC 15 as a result of the operation of input/output scanner 55 and logic scanner 57. The data table values generated by housekeeping task 38 and the values obtained from PLC 15 are sent to editor task 35 which updates the display with the generated data table values and contact values obtained from PLC 15. A suitable program in C language source case to perform the functions of housekeeping task 38 is shown at the end of the description of the invention but before the claims.

Communications Task 39

Communications task 39 formats object code and compressed source code generated by compiler task 39 into ethernet packets which are transmitted over ethernet cable 13 to communications task 47 in FLC 15. Communications task 39 also receives messages from housekeeping task 38 and generates commands formatted into ethernet packets for transmitting over ethernet cable 13 to communications task 47. Communications task 39 is a network driver such as TCP/IP or OSI seven layer protocol (TOP or MAP) available from various vendors including Retix of Santa Monica California.

DESCRIPTION OF PLC 15 TASKS AND SUBTASK

BIOS Task 45

BIOS task 45, which is a multitasking executive, is the basic input/output operating system for PLC 15. A suitable multitasking executive for PLC 15 is Motorola System V/68 or Versa DOS. In the preferred embodiment, BIOS task 45 is implemented in ROM 65.

Communications Task 47

Communications task 47 obtains ladder diagram object code and compressed source code for each rung by decoding ethernet packets sent by communications task 39. Once all necessary packets have been received and assembled, communications task 47 invokes linker task 51. Communications task 47, like communications task 39 is a standard network driver available from a number of vendors. A command handler is added to the standard network driver which receives commands generated by editor task 35, or compiler task 37 or housekeeping task 38 and calls the appropriate routine to process the command.

The commands which are sent to communications task 47 for handling are Rung Link which is generated by compiler task 37 when a modified rung has been recompiled, Rung Upload which is generated by editor task 35 when a particular rung in the ladder is to be modified; Data Table Upload and Data Table Download which are generated by housekeeping task 38 to upload and download a data table in RAM 87 which is used to store the status of each data point controlled by the system; Block Read Data Table and Block Write Data Table which are generated by editor task 35 to read and write rung information of the ladder program stored in RAM 85; Read File Name and Write File Name generated by editor task 35 to read and write the file name of the ladder program in RAM 85; and Remove Forces generated by editor task 35 to remove all input/output forcing rungs whenever a ladder is attached or detached.

A C language source code listing of a suitable communications task 47 with command handler is shown at the end of the description of the invention but before the claims.

Ladder Logic Control Task 49

Ladder logic control task 49 downloads and uploads ladder object code and source code and performs I/O scanning and logic scanning as described in detail below in the description of parallel logic and I/O control subtask 53.

Linker Task 51

Linker subtask 51 takes rungs generated by compiler task 37 and adds to or replaces rungs in the ladder stored in program RAM 85. A C language source code listing of a suitable linker task 51 is shown at the end of the description of the invention but before the claims.

Parallel Logic and I/O Control Sub Task 53

Parallel logic and I/O control task 53 ensures that the I/O scanning performed by I/O scanner 55 and the logic scanning performed by logic scanner 57 are synchronized and in parallel. In particular, during an I/O scan, a program in RAM 63 under control of the BIOS in ROM 65 causes CPU 61 to write data from RAM 63 to peripheral controllers 17, and read data from the peripheral controllers for storage in RAM 63. In between I/O scans and logic scans, the data in RAM 63 and RAM 87 are swapped so that the data written to the peripheral controllers is the most recent data calculated by the program in RAM 85, and the data used by the program in RAM 85 is the data most recently read from the peripheral controllers. During a logic scan, based upon a program in RAM 85 (the object code representing a ladder diagram), new output values to be sent to the peripheral controllers during an I/O scan are calculated based upon current input values stored in RAM 63.

Task 53 has a program mode and a run mode as determined by the position of a hardware or software switch for example, a key switch on the control panel of PLC 15 or a bit in data RAM 87. When in program mode, a real time clock is read periodically, for example, every 30 milliseconds and the real time clock's value is written to data RAM 87 by CPU 61 for use by the logic scan performed by the program in RAM 85.

In run mode, a program running in RAM 63 performing input/output scanning reads values in from peripheral controllers and loads the read values into RAM 63 and reads values loaded into RAM 63 from RAM 87 and writes those values back to the peripheral controllers. Synchronously, and in parallel, the ladder diagram loaded in program RAM 85 calculates the output values based upon the values read from the peripheral controllers and loaded into RAM 87 and writes the calculated values to RAM 87 for transfer to RAM 63 for writing back to the peripheral controllers. The present invention performs this synchronous, parallel input/output and logic scanning as follows.

Referring to FIG. 7, three operations are occurring over time, namely logic scanning 151, I/O or input/output scanning 153 and swapping 157. As noted above, logic scanning is performed by logic scanner 57 based upon a ladder diagram program in RAM 85 being executed by bit sliced processor 83 under control of PAL control logic 81. The ladder diagram program operates on data in data RAM 87, calculating new values to be written to the peripheral controllers which are scanned by input/output scanner 55. Input/output scanner 55 utilizes a program in RAM 63 executed by CPU 61 to obtain data from RAM 87 which it writes to parallel I/O port 73, ethernet port 69 and parallel I/0 port 71, and then reads data obtained from parallel I/O port 73, ethernet port 69 and parallel I/O port 71, and temporarily stores the read values in RAM 63. A scan is defined as the time which it takes to read from and write to the peripheral controllers in a single rack and ranges from 3-10 milliseconds depending upon the number of peripheral controllers in the rack. At the commencement of an I/O scan, processor 83 performs a logic scan calculating new values to be written to the peripheral controllers based upon the values of data in RAM 87. For a given rack, the logic scan is completed 2 milliseconds before the corresponding I/O scan. After the I/O scan is completed and before the next 1/0 scan (and logic scan) is begun, CPU 61, in effect, halts the operation of the program in RAM 85 in order to obtain exclusive access to RAM 87 and then moves the most recently calculated data from RAM 87 into RAM 63 and moves the most recently read data from RAM 63 into RAM 87 thereby swapping the data between the two RAMs. Then the exclusive access to program RAM 85 and data RAM 87 is relinquished and the I/O scan and logic scan begin their scans of the next set of data points corresponding to another rack. As shown in FIG. 7, the swap takes place between I/O scans. Thus, the I/O scans and logic scans are synchronized and performed in parallel. A suitable program for performing parallel logic and I/O control task 53 in C language source code is shown at the end of the description of the invention but before the claims.

DESCRIPTION OF PLC 15 COMPONENTS—FIG. 3

Input/Output Scanner 55

CPU 61 is a Motorola 68010 or equivalent. RAM 63 is 128K by 16 bit RAM available from a number of sources. ROM 65 is a 32k by 16 bit EPROM. RAM 65 stores BIOS task 45. Ethernet ports 67 and 69 are AMD part numbers 7990 or equivalent and required support circuity. Ethernet port 67 handles the receipt and transmission of ethernet packets between communications task 39 and communications task 47. Ethernet port 69 handles the receipt and transmission of ethernet packets between communications tasks in cluster controllers 25.

Parallel I/O ports 71 and 73 are standard parallel I/O ports which may be implemented in a variety of ways, the particulars of which are well know to persons skilled in the art. The details regarding a data bus, address bus and control bus, as well as timing and power considerations necessary for the proper operations of such components are well known to those skilled in the art and will be described herein only to the extent necessary for a proper understanding of the invention.

Cluster controllers 25 are similar to input/output scanner scanner 55, but do not have ethernet port 67 or logic scanner 57.

Logic Scanner 57

PAL control logic 81 is a set of eight PALs (programmable logic array) which contain the logic equations or microcode used to control the operation of bit sliced processor 83. In the preferred embodiment, the logic in the eight PALs perform the functions i) logic scanner condition test logic; ii) logic scanner program counter 1 (external load); iii) logic scanner program counter 2; iv) logic scanner program counter 3; v) logic scanner sequencer and interface logic; vi) logic scanner control store bus interface logic; vii) logic scanner internal bus control logic; and viii) logic scanner control store parity logic. The particulars of the PALs and their logic equations which perform these functions are set forth shown at the end of the description of the invention but before the claims.

Bit sliced processor 83 is a 16 bit microprocessor available from Advanced Micro Devices as its part number Am29116.

Program RAM 85 is a 32K by 64 bit RAM which contains executable ladder object code generated by compiler task 37 and linked by linker task 51.

Data RAM 87 is a 32K by 16 bit RAM which stores the status of each data point controlled by the system. In a fully configured system (i.e. 64 clusters of 7 racks, 16 peripheral controllers per rack for a total of 114,688 points), only 7K of storage is required. This 7K portion of RAM 87 is bit mapped to corresponding data points. The remaining 25K portion of data RAM 87 is available for use as temporary storage by the executing ladder diagram.

The following are source code listings of editor task 35 (MAIN.C, EDITOR.C, LINE.C and IDMAIN.C); housekeeping task 38 (HOUSEKEEP.C); communications task 47 (PLCNET.C, COMM.H, COMMTASK.C and AUXCMD.C); ladder logic control task 49 and parallel logic and I/O control task 53 (SCANLOOP.C); linker task 51 (LINKER.C); and logic scanner 57 (PAL20L8A). various "Include" files referenced in the C source code listings are also provided.

EDITOR TASK 35

/*title*/

/* main.c — ladder programming panel main module (c) 1986 Pertron Controls */ define MAIN include "stdio.h"

include "stddefs.h"

include "stderrs.h"

```c
#include "lddrdefs.h"
include "elemdraw.h"
#include "display.h"
#include "keyboard.h"
#include "menu.h"
#include "config.h"

/* ------------------------------------------------------------------------------- */
/* all inter-module globals defined here.        */
/* ------------------------------------------------------------------------------- */ int *data_table;                              /* 64K data table */
    char filename[64];                            /* current active file name */
    struct plc_def plc;                           /* plc status flags and parameters */
    struct area_def area;                         /* current area layout parameters */
    struct locator_def locator;                   /* cell locator definition structure */
    struct attribute_def attribute;               /* attribute settings */
    struct row_chain_def row_chain;               /* linked row chain variables */
    struct operating_def operating;               /* current editor mode and menu indices */
    struct editor_flags_def editor_flags;         /* miscellanious editor flags */
    struct screen_layout_def screen_layout;       /* screen layout definitions */
    struct elem_entry *element_tbl;               /* element definition table */
    struct picture *(*mini_editor_fcn)();         /* mini editor function pointer */
```

```c
        struct row_def *blank_row;              /* blank row for padding display
                */
        int moved_short[MAX_BLANK_N_RUNG_HEIGHT];   /* set whenever a vert short is moved
                */
        int moved_element[MAX_BLANK_N_RUNG_HEIGHT]; /* set whenever an element is moved
                */
        int nesting_level;                      /* current subroutine nesting level
                */
        int weird_flag;                         /* temporary debugging flag
                */

/* -------------------------------------------------------------------------------
        ------  */
/* globals for this module
                */
/* -------------------------------------------------------------------------------
        ------  */
static struct attribute_def mono_attr = {   /* --- monochrome attribute table ---      */
        UNDERLINE+INTENSIFY,            /* status line attribute       */
        REG_VIDEO,                      /* message line attribute      */
        REG_VIDEO,                      /* menu area attribute          */
        REG_VIDEO,                      /* work area attribute  (off)   */
        REG_VIDEO+INTENSIFY,            /* work area attribute  (on)    */
        REG_VIDEO,                      /* work area attribute          */
        INV_VIDEO,                      /* cell locator attribute (off) */
        INV_VIDEO+INTENSIFY,            /* cell locator attribute (on)  */
        REG_VIDEO,                      /* work area attribute          */
        INV_VIDEO,                      /* marking area attribute (off) */
        INV_VIDEO+INTENSIFY,            /* marking area attribute (on)  */
        REG_VIDEO,                      /* work area attribute          */
        REG_VIDEO+INTENSIFY,            /* marked area attribute (off)  */
        REG_VIDEO+INTENSIFY,            /* marked area attribute (on)   */
        REG_VIDEO                       /* work area attribute          */
};
static struct attribute_def color_attr = {  /* ----- color attribute table ----- */
        foreground(LIGHT+RED)    + background(BLUE),    /* status line attribute    */
        foreground(LIGHT+RED)    + background(BLUE),    /* message line attribute   */
```

```
        foreground(    CYAN) + background(NONE),        /* menu area attribute                */
        foreground(LIGHT+YELLOW) + background(NONE),    /* work area attribute       (off)    */
        foreground(LIGHT+RED)    + background(NONE),    /* work area attribute       (on)     */
        foreground(LIGHT+YELLOW) + background(NONE),    /* work area attribute                */
        foreground(LIGHT+YELLOW) + background(CYAN),    /* cell locator attribute (off)       */
        foreground(LIGHT+RED)    + background(CYAN),    /* cell locator attribute (on)        */
        foreground(LIGHT+YELLOW) + background(NONE),    /* work area attribute                */
        foreground(LIGHT+YELLOW) + background(MAGENTA), /* marking area attribute (off)       */
        foreground(LIGHT+RED)    + background(MAGENTA), /* marking area attribute (on)        */
        foreground(LIGHT+YELLOW) + background(NONE),    /* work area attribute                */
        foreground(LIGHT+YELLOW) + background(MAGENTA), /* marked area attribute (off)        */
        foreground(LIGHT+RED)    + background(MAGENTA), /* marked area attribute (on)         */
        foreground(LIGHT+YELLOW) + background(NONE)     /* work area attribute                */
};

/* ---------------------------------------------------------------------------- */
/* program entry point.                                                         */
/* ---------------------------------------------------------------------------- */
main(argc, argv)
int argc;
char *argv[];
{
        int break_key_handler(), read_config_file();
        int dflt_phys_comm_task(), net_manager_task(), editor_task(), compiler_task(), house_keep_task();
        static char *verbage[] = {
        "Programable Controller Support Software",
        "Beta Release Version 1.09, January 1988", "", "",
        "(c) 1987, 1988  Pertron Controls Corporation",
        "A Subsidiary of Square-D Company",
        NULL_PTR
};
static struct task_def task_list[] = {
        'p', 'c', 'o', 'm', 1024, 64, dflt_phys_comm_task,
```

```
            'n', 'c', 'o', 'm',  1024, 64, net_manager_task,
            'e', 'd', 'T', 'T', 16384,  0, editor_task,
            'c', 'o', 'm', 'p',  1024, 64, compiler_task,
            'k', 'e', 'e', 'p',  4096,  0, house_keep_task,
            'e', 'o', 'T', 'T',   512,  0, NULL_FCN
    };
    extern int dispatch_req, dispatch_defer, dsp_segment;

init_task_exec(task_list, 1, 64 * sizeof(long));
    init_display(KB_EVENT);
    init_mouse(KB_EVENT);
    init_keyboard(KB_EVENT, break_key_handler);
    movmem(dsp_segment == COLOR_SEGMENT ? &color_attr : &mono_attr, &attribute, sizeof(attribute));
    signon(verbage, attribute.work_area[0], attribute.work_area[1], 15, 15);
    set_binary_file_mode();
    init_big_overlay("ladder.bin", "r", "");
    process_overlay("configur", read_config_file, 0);
    handle_command_line(argc, argv);
    init_editor();
    init_compiler();
    init_house_keep();
    allmem();
    dispatch_defer = dispatch_req = 0;
    dispatcher();
}

/* ---------------------------------------------------------------------------------- */
/* default physical communications management task                                     */
/* ---------------------------------------------------------------------------------- */
dflt_phys_comm_task()
{
    wait_time(0);
}
```

/* ............................................................................................. */
/* break key handler. ensure that we are zoomed in, turn the locator on, reset the ladder locator and mode, and jump */
/* to the main edit loop.          */
/* ............................................................................................. */

```
break_key_handler()                    /* -- handler for the break key -- */
{
        extern int edit_loop();

reset_ladder();
        zoom_in();
        clr_error();
        restart_task(EDITOR, edit_loop);
}
```

/* ............................................................................................. */
/* read configuration info from the configuration file   */
/* ............................................................................................. */

```
read_config_file(fp)
FILE *fp;
{ extern int dsp_segment;
extern slow_disp;
int energize;
struct config_def config;

if (!fread((char *)&config, sizeof(struct config_def), 1, fp))
        err_exit("Error reading ladder.bin");
else {
        editor_flags.mouse_int = config.mouse_int_chan;
```

```
editor_flags.p2_port_addr = config.p2_port_addr;
editor_flags.p2_int_chan = config.p2_int_chan;
editor_flags.e3_int_chan = config.e3_int_chan;
editor_flags.e3_dma_chan = config.e3_dma_chan;
energize = foreground(foreground_of(config.energize_attr));
color_attr.status_line = config.status_line_attr;
color_attr.message_line = config.message_line_attr;
color_attr.menu_area = config.menu_area_attr;
color_attr.work_area[0] = config.work_area_attr;
color_attr.work_area[1] = background(background_of(config.work_area_attr)) + energize;
color_attr.work_area[2] = config.work_area_attr;
color_attr.locator[0] = config.locator_attr;
color_attr.locator[1] = background(background_of(config.locator_attr)) + energize;
color_attr.locator[2] = config.work_area_attr;
color_attr.marking_area[0] = config.marked_area_attr;
color_attr.marking_area[1] = background(background_of(config.marked_area_attr)) + energize;
color_attr.marking_area[0] = config.marked_area_attr;
color_attr.marked_area[0] = config.marked_area_attr;
color_attr.marked_area[1] = background(background_of(config.marked_area_attr)) + energize;
color_attr.marked_area[0] = config.marked_area_attr;
if (config.color_dsp || (!config.mono_dsp && dsp_segment == COLOR_SEGMENT))
        movmem(&color_attr, &attribute, sizeof(attribute));
else if (config.mono_dsp)
        movmem(&mono_attr, &attribute, sizeof(attribute));
if (config.slow_dsp)
        slow_disp = TRUE;
else if (config.fast_dsp)
        slow_disp = FALSE;
} return(OK);

}

/* ---------------------------------------------------------------------------
   ------ */
/* handle the command line arguments.
   */
```

```
/* ..............................................................................
...... */ handle_command_line(argc, argv)
int argc;
char *argv[];
{
        int key_time, num_attr, *attr, waste_time();
        extern struct editor_flags_def editor_flags;
        extern int dsp_segment;
        extern slow_disp;

editor_flags.wait_delay = -1;
        *filename = '\0';
        *plc.name = '\0';
        plc.is_attached = FALSE;
        plc.is_fully_attached = FALSE;
        editor_flags.trace = FALSE;
        editor_flags.symbolic = FALSE;
        editor_flags.modified = FALSE;
        editor_flags.ibm_printer = FALSE;
        editor_flags.lines_per_page = 66 - 8;
        editor_flags.net_rev = 2;
        attr = (int *)&attribute;
        num_attr = sizeof(struct attribute_def) / sizeof(int);
        while (--argc)
                if (*++argv == '-') {
                        if (*++*argv) {
                                while (**argv) {
                                        switch (to_upper(*(*argv)++)) {
                                                case 'A' : while (num_attr--) {
                                                        if (**argv && **argv != ',')
                                                                *attr = 0;
                                                        if (**argv == 'T' || **argv == 'L')
                                                                *attr |= LIGHT, ++*argv;
                                                        if (**argv && **argv != ',')
                                                                *attr |= foreground(color(*(*argv)++));
                                                        if (**argv && **argv != ',')
                                                                *attr |= background(color(*(*argv)++));
```

```
                if (num_attr && *(*argv)++ != ',')
                        err_exit("Too few attribute specifications");
                else if (!num_attr && **argv == ',')
                        err_exit("Too many attribute specifications");
                ++attr;
            }
            break;
    case 'C' : movmem(&color_attr, &attribute, sizeof(attribute));
            break;
    case 'D' : if (**argv)
                    editor_flags.e3_dma_chan = *(*argv)++ - '0';
            break;
    case 'F' : slow_disp = FALSE;
            break;
    case 'H' : disable_house_keep();
            break;
    case 'I' : editor_flags.ibm_printer = TRUE;
            break;
    case 'L' : arg_to_num(&editor_flags.lines_per_page, argv);
            editor_flags.lines_per_page -= 8;
            break;
    case 'M' : movmem(&mono_attr, &attribute, sizeof(attribute));
            break;
    case 'N' : arg_to_num(&editor_flags.net_rev, argv);
            if (editor_flags.net_rev != 2 && editor_flags.net_rev != 3)
                    err_exit("Unsupported network revision");
            break;
    case 'P' : if (--argc == 0)
                    err_exit("Illegal keyfile usage");
            arg_to_num(&key_time, argv);
            if (!playback_keys(*++argv, waste_time, key_time))
                    err_exit("Unable to playback keyfile");
            **argv = '\0';
            break;
    case 'Q' : if (**argv)
                    editor_flags.e3_int_chan = *(*argv)++ - '0';
            break;
    case 'R' : if (--argc == 0)
```

```
                    err_exit("Illegal keyfile usage");
                if (!record_keys(*++argv))
                    err_exit("Unable to record keyfile");
                **argv = '\0';
                break;
            case 'S' : slow_disp = TRUE;
                break;
            case 'T' : editor_flags.trace = TRUE;
                break;
            case 'V' : arg_to_num(&editor_flags.wait_delay, argv);
                break;
            case 'Y' : arg_to_num(&editor_flags.p2_port_addr, argv);
                break;
            case 'Z' : arg_to_num(&editor_flags.p2_int_chan, argv);
                break;
            default  : err_exit("Illegal switch");
                break;
            }
        }
      }
     }
    else
        strcpy(filename, *argv);
} color(c)                    /* -- return color given first letter -- */
int c;
{
    switch (c) {
        case 'n' : case 'N' : return(BLACK);
        case 'b' : case 'B' : return(BLUE);
        case 'g' : case 'G' : return(GREEN);
        case 'c' : case 'C' : return(CYAN);
        case 'r' : case 'R' : return(RED);
        case 'm' : case 'M' : return(MAGENTA);
        case 'y' : case 'Y' : return(YELLOW);
```

```c
                case 'w' : case 'W' : return(WHITE);
                default :
                        err_exit("Illegal color specification");
        }
} exit_to_dos()                           /* -- all done, let's go home -- */
{
        extern int dsp_lines;
        extern struct attribute_def attribute;
        extern struct editor_flags_def editor_flags;
        extern struct screen_layout_def screen_layout;

if (is_playback_in_progress()) {
                stop_playback();
                dsp_error("Playback complete");
        }
        else {
                if (editor_flags.modified) {
                        locator_off();
                        clear_menu_area();
                        dspstr(screen_layout.menu_position[0], " EXIT TO DOS ", attribute.menu_area ^ INTENSIFY);
                        if (!confirm(" Exit without saving ladder ? (y/n) ")) {
                                update_menu(FORCE);
                                locator_on();
                                return;
                        }
                }
                disable_house_keep();
                if (plc.is_fully_attached)
                        cmd_detach();
                release_big_overlay();
                clear_dsp(0, dsp_lines, REG_VIDEO);
                putcur(0);
                exit();
        }
```

}

```
err_exit(s)                          /* — something went wrong, let's quit — */
char *s;
{
        extern int dsp_lines, dsp_columns, active_segment, dsp_segment;

disable_house_keep();
        if (plc.is_fully_attached)
                cmd_detach();
        release_big_overlay();
        active_segment = dsp_segment;
        clear_dsp(0, dsp_lines, REG_VIDEO);
        dspstr(0, s, *attribute.work_area);
        putcur(dsp_columns);
        exit();
}
```

```
/* ----------------------------------------------------------------------
------ */
/* define the editor functions table
           */
/* ----------------------------------------------------------------------
------ */
int     dsp_error(),        get_task_no(),      wait_time();
int     fread(),            wait_event(),       restart_task();
int     clr_event(),        process_overlay(),  rlsmem();
int     release_overlay(),  send_msg(),         event_trigger();
int     add_dispdefer(),    chkdispreq(),       dispatcher();
int     proc_clock_rate(),  movmem(),           dflt_phys_comm_task();
int     load_ovr(),         unload_ovr(),       exec_ovr();
int     init_dma(),         setup_dma(),        beg_dma();
int     end_dma(),          cmpmem();
int     int_entry(),        int_exit();
long    overlay_size(),     extra_push(),       extra_pop();
```

```c
char    *receive_msg(),       *getmem(),       *get_psp();
char    *load_overlay();

int (*editor_fcn_tbl[])() = {
        dsp_error,
        get_task_no,
        wait_time,
        wait_event,
        restart_task,
        clr_event,
        process_overlay,
        (int (*)())load_overlay,
        release_overlay,
        send_msg,
        (int (*)())overlay_size,
        rlsmem,
        event_trigger,
        (int (*)())receive_msg,
        fread,
        (int (*)())getmem,
        (int (*)())get_psp,
        add_dispdefer,
        chkdispreq,
        dispatcher,
        proc_clock_rate,
        movmem,
        dflt_phys_comm_task,
        (int (*)())extra_push,
        (int (*)())extra_pop,
        load_ovr,
        unload_ovr,
        exec_ovr,
        init_dma,
        setup_dma,
        beg_dma,
        end_dma,
        cmpmem,
```

```
        int_entry,
        int_exit
};

add_dispdefer(dir)
 int dir;
{
        extern int dispatch_defer;

return(dispatch_defer += dir);
} chkdispreq()
{
        extern int dispatch_req;

return(dispatch_req);
} char *get_psp()
{
        extern char *_psp;

return(_psp);
}
n
```

/*title*/
/* editor.c — ladder editor task (c) 1986 Pertron Controls */ include "stddefs.h"
include "stderrs.h"
include "lddrdefs.h"
include "elemdraw.h"
include "elemacro.h"
include "keyboard.h"
include "display.h"

```c
include "stdio.h"
#include "menu.h"

/* ===================== global definitions ===================== */
extern struct area_def area;

/* --------------------------------------------------------------------------------
---------------- */
/* initialize the editor. loads the mini-editor functions and tables, and sets the 'attached to plc' flag to zero.
   */
/* --------------------------------------------------------------------------------
---------------- */
init_editor()
{
        int load_mini_editors();
        extern int weird_flag;
        extern struct plc_def plc;
        extern struct row_def *blank_row;
        extern struct attribute_def attribute;
        extern struct screen_layout_def screen_layout;

zoom_in();
        area.left.column_number = area.right.column_number = -1;
        plc.is_fully_attached = plc.is_attached = plc.e3_is_healthy = FALSE;
        process_overlay("miniedit", load_mini_editors, 0);
        set_err_area(screen_layout.top_menu_line, screen_layout.menu_area_lines, attribute.menu_area);
        if (!(blank_row = (struct row_def *)getmem(sizeof(struct row_def))))
                err_exit("insufficient memory");
        setmem(blank_row, sizeof(struct row_def), 0);
} load_mini_editors(fp, size)            /* -- load mini-editors from ladder.bin -- */
FILE *fp;
int size;
```

```
{
    typedef struct picture *(*pic_ptr_fcn_ptr)();
    extern pic_ptr_fcn_ptr mini_editor_fcn;
    pic_ptr_fcn_ptr load_overlay();

if (!(mini_editor_fcn = load_overlay(fp, 0)))
            err_exit("Unable to load mini-editors");
    install_element_menus();
    return(NO_ERR);
}
```

```
/* ----------------------------------------------------------------
   ---------------  */
/* editor task main entry point. clear the ladder chain, initialize the locator to on, display the top level command
        */
/* menu, load the default or command line ladder, and call the main editor loop.
        */
/* ----------------------------------------------------------------
   ---------------  */
editor_task()
{
    extern char filename[];
    extern struct locator_def locator;

zoom_in();
    clr_error();
    clear_ladder();
    update_status();
    update_secondary_status();
    update_menu(FORCE);
    if (*filename)
            load_file(FORCE);
    else
            load_default_ladder();
    edit_loop();
}
```

```
/* ----------------------------------------------------------------------------------------------- */
/* main editor loop. entered at power up and reset. clears the error line, and draws the ladder. then calls the loop    */
/* appropriate to the current operating mode. whenever a mode change occurs, we redisplay the status and menu.    */
/* ----------------------------------------------------------------------------------------------- */
edit_loop()
{
        draw_screen(FRESH);
        for (;;) {
                update_secondary_status();
                update_status();
                switch (operating.mode) {
                        case COMMAND_MODE:
                        case ELEMENT_MODE:
                                normal_mode();
                                break;
                        case LINE_MODE:
                                line_mode();
                                break;
                        case DATA_MODE:
                                data_monitor_mode();
                                break;
                }
        }
}

/* ----------------------------------------------------------------------------------------------- */
/* load the default (blank) ladder.                                    */
/* ----------------------------------------------------------------------------------------------- */
load_default_ladder()
```

```
{
        extern struct locator_def locator;
        extern struct row_chain_def row_chain;
        extern struct editor_flags_def editor_flags;
        extern struct screen_layout_def screen_layout;

fetch(LADDER, 0);
        clear_ladder();
        release(LADDER);
        compile(locator.row);
        draw_screen(FRESH);
        editor_flags.modified = FALSE;
}
```

/* ---------------------------------------------------------------------------------------
---------------- */
/* normal mode. this is the main loop for the command and element menus. when     we enter we display the locator, set     */
/* the menu index to the top level, and  display the menu and status. then as long as we are in command or element  */
/* mode we process: mouse keys, mini editor keys, motion keys, menu changing keys and menu option keys. If no keys are  */
/* pending, we refresh the screen. when we exit we turn the locator off.              */
/* ---------------------------------------------------------------------------------------
---------------- */

```
normal_mode()
{
        extern struct editor_flags_def editor_flags;
        extern struct operating_def operating;
        extern struct row_chain_def row_chain;
        extern struct locator_def locator;
        int key, original_mode, key_was_pressed;

original_mode = operating.mode;
        adjust_locator();
```

```c
locator_on_and_scroll();
operating.menu = 0;
update_status();
update_secondary_status();
update_menu(NORMAL);
for (;;) {
        while (operating.mode == original_mode && key_pressed()) {
                key = getkey();
                if (key != MENU_UPDATE)
                        clr_error();
                if (key == MENU_UPDATE) {
                        update_secondary_status();
                        update_menu(FORCE);
                }
                else if (key == SYMBOL_TOGGLE) {
                        editor_flags.symbolic ^= 1;
                        draw_screen(FRESH);
                }
                else if (key == ALT_W) {
                        weird_flag ^= 1;
                        clear_alt_seg(*attribute.work_area);
                        draw_screen(FRESH);
                }
                if (is_mini_editor(key) && !are_marking_area())
                        mini_editor(key);
                else if ((key == INSERT_KEY || key == SHF_INSERT_KEY) &&
!are_marking_area())
                        operating.menu = INSERT_MENU;
                else if ((key == DELETE_KEY || key == SHF_DELETE_KEY) &&
!are_marking_area())
                        operating.menu = DELETE_MENU;
                else if (is_motion(key) || is_mouse(key) || is_rail(key))
                        move_cell_locator(key);
                if (is_page(key))
                        move_rung(key);
                else if (is_zoom(key))
                        change_magnification(key);
```

```c
        else if (is_function(key) || key == ESC_KEY)
                exec_function(key);
        else if (key == ALT_C || key == CTL_C)
                continue_search(key == ALT_C ? FORWARD : BACKWARD);
        else if (key == CTRL_PAGE_UP || key == CTRL_PAGE_DOWN)
                search_for_row(key == CTRL_PAGE_UP ? 1 :
row_chain.number_of_rows);
                update_status();
                key_was_pressed = TRUE;
        }
        update_secondary_status();
        if (key_was_pressed && check_duplicate_coil())
                key_was_pressed = FALSE;
        if (operating.mode == original_mode) {
                update_menu(NORMAL);
                draw_screen(REFRESH);
                wait_for_key();
        }
        else
                break;
    }
}

/* ----------------------------------------------------------------------
---------------- */
/* move cell locator. handle cell locator movment keys.
           */
/* ----------------------------------------------------------------------
---------------- */
move_cell_locator(key)
int key;
{
        int offset;
        extern struct row_chain_def row_chain;
        extern struct screen_layout_def screen_layout;
```

```
switch (key) {
    case CELL_LEFT :
    case MOUSE_LEFT :
        if (locator.column_number > 0) {
            locator_off();
            move_cell_horz(-1);
        }
        break;
    case CELL_RIGHT :
    case MOUSE_RIGHT :
        offset = element_width(locator.cell);
        if (locator.column_number + offset < ROW_WIDTH) {
            locator_off();
            move_cell_horz(offset);
        }
        break;
    case CELL_UP :
    case MOUSE_UP :
        if (locator.row_number > 0) {
            locator_off();
            move_cell_vert(-1);
        }
        break;
    case CELL_DOWN :
    case MOUSE_DOWN :
        offset = element_height(locator.cell);
        if (locator.row_number + offset < row_chain.number_of_rows ||
insert_row_at_end()) {
            locator_off();
            move_cell_vert(offset);
        }
        break;
    case HOME_KEY :
    case SHF_HOME_KEY :
        if (locator.column_number > 0) {
            locator_off();
            locator.column_number = 0;
```

```c
                locator.cell = locator.row->cells;
                adjust_locator();
            }
            break;
        case END_KEY :
        case SHF_END_KEY :
            if (locator.column_number + element_width(locator.cell) < ROW_WIDTH) {
                locator_off();
                locator.column_number = ROW_WIDTH-1;
                locator.cell = &locator.row->cells[ROW_WIDTH-1];
                adjust_locator();
            }
            break;
    }
    locator_on_and_scroll();
} locator_on_and_scroll()
{
    extern struct screen_layout_def screen_layout;

if (screen_layout.zoom == IN) {
        locator_on();
        scroll_if_necessary();
    }
    else {
        scroll_if_necessary();
        locator_on();
    }

}

/* ----------------------------------------------------------------------------
---------------- */
/* move rung. handle rung paging keys. we start out by resetting the locator to column zero, then if upward paging is     */
/* desired we move up to the bottom of the previous rung. If downward paging is desired we move down to the
```

```
top of the           */
/* next rung, then adavnce until the top of that rung is just above the top of the screen, or the top row of the
next        */
/* rung after that rung is on the bottom of the screen. If the second of the above two termination events occurs,
we          */
/* move the locator back to the rung that we are paging down onto. now whether paging up or down we must
move the    */
/* locator to the top of the destination rung, and then turn the cell locator back on if it was enabled.
            */
/* ----------------------------------------------------------------------------------------
---------------- */
move_rung(key)
int key;
{
        extern struct locator_def locator;
        extern struct row_chain_def row_chain;
        extern struct screen_layout_def screen_layout;
        int i, offset, same_rung;

locator_off();
        same_rung = locator.rung_number;
        locator.column_number = 0;
        locator.cell = locator.row->cells;
        adjust_locator();
        if (key == PAGE_UP || key == SHF_PAGE_UP) {
                while (locator.row_number > 0 && locator.rung_number == same_rung)
                        move_cell_vert(-1);
        }
        else {
                offset = element_height(locator.cell);
                while (locator.row_number + offset < row_chain.number_of_rows && locator.rung_number
== same_rung) {
                        move_cell_vert(offset);
                        offset = element_height(locator.cell);
                }
                if (locator.row_number + offset == row_chain.number_of_rows && locator.rung_number ==
same_rung
```

```
                && locator.row->is.occupied && insert_row_at_end()) {
                        move_cell_vert(offset);
                        offset = element_height(locator.cell);
                }
                same_rung = locator.rung_number;
                for (i = 0; locator.row_number + offset < row_chain.number_of_rows
                        && (i += offset) < screen_layout.rows_per_screen && locator.rung_number == same_rung;
        ) {
                        move_cell_vert(offset);
                        scroll_if_necessary();
                        offset = element_height(locator.cell);
                }
                if (locator.rung_number != same_rung)
                        move_cell_vert(-1);
        }
        while (locator.row_number > 0 && !is_top_of_rung(locator.row))
                move_cell_vert(-1);
        scroll_if_necessary();
        locator_on();
}

/* ---------------------------------------------------------------------------
   --------------- */
/* move the cell locator horizontally.
                                */
/* ---------------------------------------------------------------------------
   --------------- */
move_cell_horz(offset)
 int offset;
{
        extern struct locator_def locator;

locator.column_number += offset;
        locator.cell += offset;
        adjust_locator();

}
```

/* ---------------------------------------------------------------------------------- */

/* move the cell locator vertically. this routine increments the locator rung number if a rung change occurs due to */

/* the vertical movment. because we only check to see if we land on a rung boundry, never call this routine with an */

/* offset that might jump over a rung boundry. it can be called safely with an offset equal to the height of the cell */

/* that the locator is on (for downward motion). */

/* ---------------------------------------------------------------------------------- */

```
move_cell_vert(offset)
 int offset;

{
        extern struct locator_def locator;
        int drae;

drae = offset < 0 && !locator.row->next_row && !locator.row->is.occupied && !locator.row->is_vert_shorted;
        locator.screen_row_offset += offset;
        locator.row_number += offset;
        locator.row = add_row(locator.row, offset);
        locator.cell = &locator.row->cells[locator.column_number];
        if (offset > 0 && is_top_of_rung(locator.row))
                ++locator.rung_number;
        else if (offset < 0 && is_bottom_of_rung(locator.row))
                --locator.rung_number;
        adjust_locator();
        if (drae)

}
```

/* ---------------------------------------------------------------------------------- */

/* adjust locator. adjust the locator to the primary cell if we are on a muti cell'ed element. this routine */

/* also re-highlites the marking area if applicable.
*/
/* ................................................................................................
.................... */
adjust_locator()
{
    extern struct locator_def locator;
    extern struct screen_layout_def screen_layout;

if (!locator.cell->is.primary && locator.cell->has.offset) {
        locator.screen_row_offset -= locator.cell->offset.y;
        locator.row_number -= locator.cell->offset.y;
        locator.row = add_row(locator.row, -locator.cell->offset.y);
        locator.column_number -= locator.cell->offset.x;
        locator.cell = &locator.row->cells[locator.column_number];
    }
    if (are_marking_area())
        update_area();
}

/* ................................................................................................
.................... */
/* check the locator to see that it is on the screen, if not then we will scroll the ladder.
*/
/* ................................................................................................
.................... */
scroll_if_necessary()
{
    extern struct locator_def locator;
    extern struct screen_layout_def screen_layout;
    int bottom_row;

if (locator.screen_row_offset < 0)
        scroll_down(-locator.screen_row_offset);
    else {
        bottom_row = locator.screen_row_offset + element_height(locator.cell);
        if (bottom_row > screen_layout.rows_per_screen)
            scroll_up(bottom_row - screen_layout.rows_per_screen);
```

}
}

/* -------------------------------------------------------------------------------- */
/* change magnification. handle the zoom in and zoom out keys. the trick here is that we would like to adavnce the */
/* screen row offset of the locator within the new screen layout by the same amount that it has advanced in the old */
/* layout since the last change magnification call. at power up, we assume that the last screen row offset was six for */
/* the zoomed out mode. this will cause us to place the zoomed in screen in the center of the zoomed out screen. this */
/* whole plan may not always be possible to implement, since we must ensure that the new screen row offset is within */
/* the size of the screen and we must ensure that our new position on the screen would not cause any non existant rows */
/* to also be on the screen. the last check we make is to ensure that the entire cell locator is on the screen. */
/* -------------------------------------------------------------------------------- */

```
change_magnification(key)
int key;
{
        extern struct locator_def locator;
        extern struct row_chain_def row_chain;
        extern struct attribute_def attribute;
        extern struct screen_layout_def screen_layout;
        int temp_screen_row, rows_from_end;
        static int old_screen_row = 6;      /* last screen row from old zoom mode   */
        static int new_screen_row = 0;      /* first screen row from this zoom mode */ if ((key == ZOOM_IN_KEY && screen_layout.zoom != IN) || (key == ZOOM_OUT_KEY && screen_layout.zoom != OUT)) {
                locator_off();
                (key == ZOOM_IN_KEY) ? zoom_in() : zoom_out();
                temp_screen_row = locator.screen_row_offset;
```

```
            rows_from_end = row_chain.number_of_rows - locator.row_number;
            locator.screen_row_offset = old_screen_row + (locator.screen_row_offset -
new_screen_row);
            if (locator.screen_row_offset < 0)
                    locator.screen_row_offset = 0;
            else if (locator.screen_row_offset > screen_layout.rows_per_screen - 1)
                    locator.screen_row_offset = screen_layout.rows_per_screen - 1;
            if (locator.screen_row_offset + rows_from_end < screen_layout.rows_per_screen)
                    locator.screen_row_offset = screen_layout.rows_per_screen - rows_from_end;
            if (locator.screen_row_offset > locator.row_number)
                    locator.screen_row_offset = locator.row_number;
            if (locator.screen_row_offset + element_height(locator.cell) >
screen_layout.rows_per_screen)
                    locator.screen_row_offset = screen_layout.rows_per_screen -
element_height(locator.cell);
            old_screen_row = temp_screen_row;
            new_screen_row = locator.screen_row_offset;
            clear_alt_seg(*attribute.work_area);
            draw_screen(FRESH);
            locator_on();
        }
}

/* ------------------------------------------------------------------------------
---------------  */
/* scroll_up. scroll display upward (move forward in rung chain) by a specified number of rows.  this routine does not    */
/* check to ensure that the screen row offset is within the display.  that must be taken into account by the calling      */
        */
/* function.  we also do not check to see if we run off the end of the row chain here.
        */
/* ------------------------------------------------------------------------------
---------------  */
scroll_up(rows)
int rows;
{
```

```
        struct row_def *r;
        extern struct locator_def locator;
        extern struct attribute_def attribute;
        extern struct screen_layout_def screen_layout;
        extern int active_segment, dsp_segment, alt_segment;

r = add_row(locator.row, screen_layout.rows_per_screen - locator.screen_row_offset);
        active_segment = alt_segment;
        while (r && rows--) {
                --locator.screen_row_offset;
                draw_row(r, screen_layout.rows_per_screen - 1, FORCE);
                r = r->next_row;
                scroll_dsp(SCROLL_UP, screen_layout.top_work_line,
                                screen_layout.bottom_work_line,
                                screen_layout.lines_per_row, *attribute.work_area);
                restore_row(screen_layout.rows_per_screen - 1);
        }
        active_segment = dsp_segment;
}
```

/* ------------------------------------------------------------------------------------------------ */

/* scroll down. scroll display downward (toward the start of the row chain) by a specified number of rows. this */

/* routine does not check to ensure that the screen row offset is within the display. that must be taken into account */

/* by the calling function. we also don't check whether we run off the top of the row chain. */

/* ------------------------------------------------------------------------------------------------ */

```
scroll_down(rows)
int rows;
{
        struct row_def *r;
        int adj_sr_offset;
        extern struct locator_def locator;
```

```c
extern struct attribute_def attribute;
extern struct screen_layout_def screen_layout;
extern int active_segment, dsp_segment, alt_segment;

r = add_row(locator.row, -(locator.screen_row_offset + 1));
if ((adj_sr_offset = sub_row(locator.row, r) - 1) != locator.screen_row_offset) {
        rows -= adj_sr_offset - locator.screen_row_offset;
        locator.screen_row_offset = adj_sr_offset;
}
active_segment = alt_segment;
while (r && rows--) {
        ++locator.screen_row_offset;
        draw_row(r, 0, FORCE);
        r = r->last_row;
        scroll_dsp(SCROLL_DOWN, screen_layout.top_work_line,
                                screen_layout.bottom_work_line,
                                screen_layout.lines_per_row, *attribute.work_area);
        restore_row(0);
}
active_segment = dsp_segment;
}
```

/* ---------------------------------------------------------------------
   --------------- */
/* check for duplicate coil usage. returns true if check was completed sucsessfully, else false.
        */
/* ---------------------------------------------------------------------
   --------------- */
```c
check_duplicate_coil()
{
        extern struct editor_flags_def editor_flags;
        extern struct row_chain_def row_chain;
        extern struct locator_def locator;
        int lc_type, edb_len;
        struct row_def *r;
        long *edb_p.r;
```

```
if (locator.cell->is.primary && locator.cell->is.coil) {
    lc_type = locator.cell->type;
    edb_len = element_width(locator.cell) * sizeof(long);
    edb_ptr = &locator.row->descriptor[locator.column_number];
    for (r = row_chain.first_row; r && !chk_event(KB_EVENT); r = r->next_row)
        if (r->cells[locator.column_number].type == lc_type
            && cmpmem(edb_ptr, &r->descriptor[locator.column_number], edb_len) == NO_DIFF
            && r != locator.row)
                return(editor_flags.duplicate_coil = TRUE);
    if (r)
        return(FALSE);
}
editor_flags.duplicate_coil = FALSE;
return(TRUE);
}

/*title*/
/* line.c -- line mode routines (c) 1986 Pertron Controls */ include "stddefs.h"
include "lddrdefs.h"
include "elemdraw.h"
include "keyboard.h"
include "display.h"
include "menu.h"
```

/* ------------------------------------------------------------------------- */

/* line mode main loop. intitializes the menu index to the top level line mode menu, turns on the line locator, then */

/* enters the key processing loop. in this loop, we handle movment, paging, magnification, and menu keys. when there */

/* is a pause between keystrokes, we update the status areas and refresh the ladder display. before we exit we must */

/* ensure that the locator is in a legal position for modes other than line mode. */

```
/* ----------------------------------------------------------------------
   --------------- */ line_mode()
{
    int key;
    extern struct locator_def locator;
    extern struct operating_def operating;
    extern struct editor_flags_def editor_flags;

operating.menu = MOVE_LINE_MENU;
    locator_on();
    for (;;) {
        while (operating.mode == LINE_MODE && key_pressed()) {
            key = getkey();
            clr_error();
            if (is_cursor(key) || is_motion(key) || is_mouse(key) || is_rail(key))
                move_line_locator(key);
            else if (is_page(key))
                move_rung(key);
            else if (is_zoom(key))
                change_magnification(key);
            else if (is_function(key) || key == ESC_KEY) {
                exec_function(key);
                if (operating.mode == LINE_MODE)
                    locator_on();      /* locator may have changed shape */
            }                          /* so lets redraw it              */
            else if (key == SYMBOL_TOGGLE) {
                editor_flags.symbolic ^= 1;
                draw_screen(FRESH);
            }
        }
        update_status();
        update_secondary_status();
        if (operating.mode == LINE_MODE) {
            update_menu(NORMAL);
            draw_screen(REFRESH);
            wait_for_key();
```

```
                }
            else
                    break;
        }
        if (locator.column_number >= ROW_WIDTH)
                locator.column_number = ROW_WIDTH-1;
    locator.cell = &locator.row->cells[locator.column_number];
}
```

/* ----------------------------------------------------------------------------
   --------------- */

/* move line locator. move the line locator according to the passed key. determines the direction of the move and
         */

/* calls the routine appropriate to our current mode, (move or modify).
                        */

/* ----------------------------------------------------------------------------
   --------------- */

```
move_line_locator(key)
int key;
{
        extern struct locator_def locator;
        extern struct operating_def operating;
        extern struct row_chain_def row_chain;

switch (key) {
            case CUR_LEFT   :
            case CELL_LEFT  :
            case MOUSE_LEFT         : if (locator.column_number > 0)
                                handle_line_horz(-1);
                        break;
            case CUR_RIGHT  :
            case CELL_RIGHT         :
            case MOUSE_RIGHT: if (locator.column_number < ROW_WIDTH - 1)
                                handle_line_horz(1);
                        break;
            case CUR_UP     :
```

```
        case CELL_UP     :
        case MOUSE_UP    : if (locator.row_number > 0)
                               handle_line_vert(-1);
                           break;
        case CUR_DOWN    :
        case CELL_DOWN   :
        case MOUSE_DOWN  : /* we're not sure what the minus one is for in the comparison */
                           /* below, but we think it is to protect some insert delete   */
                           /* function that needs a blank row at the end of the ladder. */
                           if (locator.row_number < row_chain.number_of_rows - 1 ||
                               insert_row_at_end())
                               handle_line_vert(1);
                           break;
        case HOME_KEY    :
        case SHF_HOME_KEY : if (locator.column_number > 0 && operating.menu ==
MOVE_LINE_MENU) {
                               locator_off();
                               locator.column_number = 0;
                               locator.cell = locator.row->cells;
                               locator_on();
                           }
                           break;
        case END_KEY     :
        case SHF_END_KEY: if (locator.column_number < ROW_WIDTH && operating.menu ==
MOVE_LINE_MENU) {
                               locator_off();
                               locator.column_number = ROW_WIDTH;
                               locator.cell = &locator.row->cells[locator.column_number];
                               locator_on();
                           }
                           break;
    }
}

/* ............................................................................
   ................  */
```

/* handle horizontal movement, determine whether we are drawing or just moving around. call the appropriate routine. */
/* ......................................................................................................... */

```c
handle_line_horz(dir)
 int dir;
{
        extern struct operating_def operating;

if (operating.menu == MOVE_LINE_MENU)
                move_line_horz(dir);
        else if (is_ok_to_edit())
                modify_line_horz(dir);
}
```

/* ......................................................................................................... */

/* handle vertical movement, determine whether we are drawing or just moving around. call the appropriate routine. */
/* ......................................................................................................... */

```c
handle_line_vert(dir)
 int dir;
{
        extern struct operating_def operating;
        extern struct locator_def locator;
        struct row_def *old_row;
        int drae;

old_row = locator.row;
        drae = dir < 0 && !locator.row->next_row && !locator.row->is.occupied && !locator.row->is_vert_shorted;
        if (operating.menu == MOVE_LINE_MENU)
                move_line_vert(dir);
        else if (is_ok_to_edit())
                modify_line_vert(dir);
        if (locator.row != old_row && drae)
``` delete_row_at_end();
}

/* ................................................................................................
.................. */
/* move line locator horozontally. ensures that we never land inside of an element.
                  */
/* ................................................................................................
.................. */
move_line_horz(dir)
 int dir;
{
        extern struct locator_def locator;

locator_off();
        do {
                locator.cell += dir;
                locator.column_number += dir;
        } while (0 < locator.column_number && locator.column_number < ROW_WIDTH &&
!is_left_of_element(locator.cell));
        locator_on();
}

/* ................................................................................................
.................. */
/* modify line horz. draw or erase a line in the specified horizontal direction. the first thing we do is calculate
        */
/* the propsed ending column and a pointer to the cell that will actually be modified. next we check to ensure that
        */
/* the ending column is a valid residing place for the line locator and that the cell to be modified does not have an
        */
/* element other than a blank or line already in it. next, if the direction is forward, we insert or remove the   */
/* horizontal at the current locator position, then advance the locator. if the direction is backward, we move the
        */
/* locator before inserting or removing the hoizontal short. finally we end off by turning the locator back on,
        */

```
/* updating the occupied flag of the row, and compiling the row. If we were unable to do the modification we
correct */
/* the locator column, restoring it to it's entry value.
                */
/* ................................................................................................
................ */
modify_line_horz(dir)
 int dir;
{
        union cell_def *c;
        extern struct locator_def locator;
        extern struct operating_def operating;

locator.column_number += dir;
        c = (dir > 0) ? locator.cell : locator.cell + dir;
        if ((locator.column_number == 0 || locator.column_number == ROW_WIDTH ||
is_left_of_element(locator.cell + dir))
                && (c->type == EMPTY || c->type == HORZ_SHORT)) {
                locator_off();
                fetch(LADDER, 0);
                if (dir > 0) {
                        locator.cell->type = (operating.menu == DRAW_LINE_MENU) ? HORZ_SHORT :
EMPTY;
                        draw_element(locator.cell, locator.row, locator.screen_row_offset, BIRTH, 0,
dsp_state());
                        locator.cell += dir;
                }
                else {
                        locator.cell += dir;
                        locator.cell->type = (operating.menu == DRAW_LINE_MENU) ? HORZ_SHORT :
EMPTY;
                        draw_element(locator.cell, locator.row, locator.screen_row_offset, BIRTH, 0,
dsp_state());
                }
                locator_on();
                if (operating.menu == DRAW_LINE_MENU)
                        locator.row->is.occupied = TRUE;
                else
```

```
                check_occupancy(locator.row);
        release(LADDER);
        compile(locator.row);
    }
    else
        locator.column_number -= dir;
}

/* ------------------------------------------------------------------------------------------------ */
/* move the line locator in the specified vertical direction. initially we look for a valid landing spot for the    */
/* locator. that would be any place not inside an element. If we are not sitting on the rails, we must do this in a */
/* loop, keeping track of the number of rows and rungs that we have passed. If we are on the rails we can always move */
/* upward or downward in the ladder by one row, since we are never called upon when the locator is at the start or the */
/* end of the row chain. If we were able to find a place to land we adjust the locator values, perform any necessary  */
/* scrolling, then turn the line locator back on.                                                                     */
/* ------------------------------------------------------------------------------------------------ */
move_line_vert(dir)
int dir;
{
        struct row_def *r;
        union cell_def *c;
        int delta_rung, delta_row;
        extern struct locator_def locator;
        extern struct screen_layout_def screen_layout;

if (0 < locator.column_number && locator.column_number < ROW_WIDTH) {
                r = locator.row;
                delta_rung = delta_row = 0;
                do {
```

```
            if (dir > 0) {
                    ++delta_row;
                    r = r->next_row;
                    if (is_top_of_rung(r))
                            ++delta_rung;
            }
            else {
                    --delta_row;
                    r = r->last_row;
                    if (is_bottom_of_rung(r))
                            --delta_rung;
            }
            c = &r->cells[locator.column_number];
        } while (r->last_row && is_left_of_element(c) && (r->next_row ||
insert_row_at_end()));
        if (dir = is_left_of_element(c) ? delta_row : 0)
                locator.rung_number += delta_rung;

}
    else if (dir > 0 && is_top_of_rung(locator.row->next_row))
            ++locator.rung_number;
    else if (is_bottom_of_rung(locator.row->last_row))
            --locator.rung_number;
    if (dir != 0)
            locator_off();
    locator.screen_row_offset += dir;
    locator.row_number += dir;
    locator.row = add_row(locator.row, dir);
    locator.cell = &locator.row->cells[locator.column_number];
    if (locator.screen_row_offset < 0)
            scroll_down(-locator.screen_row_offset);
    else if (locator.screen_row_offset >= screen_layout.rows_per_screen)
            scroll_up(locator.screen_row_offset - screen_layout.rows_per_screen + 1);
    locator_on();

}

/* -----------------------------------------------------------------------------
```

```
/* ---------------  */
/* modify a line in the vertical direction specified, minus one for backward/upward, one for forward/downward. if we   */
/* are on the rails, we just move the locator. if we are not on the rails we first calculate a pointer to the row that   */
/* must be modified, (that is the current row for upward, the next row for downward), and a pointer to the cell on   */
/* which we anticipate landing. if this is not a suitable location for us, we return right then. otherwise we perform  */
/* the line modification, checking that we are not extending any rung beyond the maximum height. if all is well so   */
/* far and we are moving down, we check whether we have created a new rung below us, (by erasing), if so increment the   */
/* locator rung number since we will land on that new rung. if we are moving up we check whether we have moved into   */
/* what was a different rung. now if we redraw the shorts around the origin and destination cells since the short   */
/* always extends into both. finally we perform any scrolling if necessary and turn the line locator back on.   */
/* -----------------------------------------------------------------------------------
    ---------------  */
modify_line_vert(dir)
 int dir;
{
        struct row_def *r;
        union cell_def *c;
        int prev_row_was_different_rung;
        extern struct locator_def locator;
        extern struct screen_layout_def screen_layout;

if (0 < locator.column_number && locator.column_number < ROW_WIDTH) {
                if (dir > 0) {
                        r = locator.row->next_row;
                        c = &r->cells[locator.column_number];
                }
                else {
                        r = locator.row;
```

```
                c = &r->last_row->cells[locator.column_number];
                prev_row_was_different_rung = is_bottom_of_rung(r->last_row);
        }
        if (!is_left_of_element(c))
                return;
        fetch(LADDER, 0);
        if (operating.menu == DRAW_LINE_MENU) {
                short_up_on_left(r, locator.column_number);
                if (rung_height(r) > MAX_RUNG_HEIGHT) {
                        clear_up_on_left(r, locator.column_number);
                        release(LADDER);
                        return;
                }
        }
        else
                clear_up_on_left(r, locator.column_number);
        release(LADDER);
        if (dir > 0 && is_top_of_rung(r))
                ++locator.rung_number;
        else if (dir == -1 && prev_row_was_different_rung)
                --locator.rung_number;
}
else if (dir > 0 && is_top_of_rung(locator.row->next_row))
        ++locator.rung_number;
else if (is_bottom_of_rung(locator.row->last_row))
        --locator.rung_number;
locator_off();
compile(locator.row);
locator.screen_row_offset += dir;
locator.row_number += dir;
locator.row = add_row(locator.row, dir);
locator.cell = &locator.row->cells[locator.column_number];
locator_on();
compile(locator.row);
if (locator.screen_row_offset < 0)
        scroll_down(-locator.screen_row_offset);
else if (locator.screen_row_offset >= screen_layout.rows_per_screen)
``` scroll_up(locator.screen_row_offset - screen_layout.rows_per_screen + 1);
}

/*title*/

/* idmain.c — insert/delete main routines — (c) 1986 Pertron Controls */

```c
include "stdio.h"
include "stddefs.h"
include "lddrdefs.h"
include "elemdraw.h"
include "elemacro.h"
include "display.h"
include "menu.h"
include "trace.h"
```

/* ============================== global variables
   ============================== */

```c
    int insdel_row_flag;                    /* set whenever a row is ins or del    */
```

/* ============================== entry and exit point routines
   ============================== */

```c
insdel_setup()                      /* — setup to perform an insert or delete function — */
{
        extern struct operating_def operating;
        extern struct editor_flags_def editor_flags;
        extern int active_segment, dsp_segment, alt_segment;

entry_point();
        operating.menu = 0;
        insdel_row_flag = FALSE;
        pause_recording();
        locator_off();
        if (editor_flags.wait_delay < 0)
                active_segment = alt_segment;
        fetch(LADDER, 0);
}
```

```
insdel_cleanup(special_case)            /* -- cleanup after an insert or delete function -- */
int special_case;
{
        extern struct locator_def locator;
        extern struct editor_flags_def editor_flags;
        extern int active_segment, dsp_segment, alt_segment;

release(LADDER);
        compile(locator.row);
        active_segment = dsp_segment;
        if (editor_flags.wait_delay < 0 && (insdel_row_flag || special_case))
                draw_screen(FORCE);
        resume_recording();
        adjust_locator();
        locator_on_and_scroll();
        editor_flags.insert_left = editor_flags.insert_right = FALSE;
        exit_point();
}
/*page*/
/* =================== top level routines offered from menu =================== */ contact_insert(id)            /* -- insert a contact into the ladder -- */
int id;
{
        extern struct locator_def locator;
        extern struct editor_flags_def editor_flags;
        extern struct screen_layout_def screen_layout;
        extern int search_element_id, search_direction;
        struct elem_entry *element;
        struct row_def *push_row, *pull_row, *tr;
        union cell_def *c;
        int left, right, below;
        int delta_height, delta_width;
        int old_height, old_width, move_width;
        int last_column, push_column, pull_column, place_column;

if (editor_flags.search_for_element) {
```

```
                operating.menu = 0;
                editor_flags.search_for_element = FALSE;
                search_element_id = id;
                search(search_direction);
                return;
        }
        if (!is_ok_to_edit())
                return;
        insdel_setup();
        enter("contact_insert(%d)", id, 0, 0, 0);
        element    = &element_tbl[id];
        old_height = element_height(locator.cell);
        old_width  = element_width(locator.cell);
        delta_height = element->height - old_height;
        delta_width  = (editor_flags.insert_left || editor_flags.insert_right) ? element->width : element->width-old_width;
        move_width  = (delta_width > 0) ? element->width : old_width;
        pull_column = locator.column_number + old_width;
        push_column = editor_flags.insert_left ? locator.column_number : locator.column_number + old_width;
        place_column = editor_flags.insert_right ? locator.column_number + old_width : locator.column_number;
        push_row    = add_row(locator.row, old_height);
        pull_row    = add_row(locator.row, element->height);

if (!save_rung(locator.row)) {
                insdel_cleanup(FORCE);
                leave("contact_insert, insufficient working memory", 0);
        }
        within("current rung saved", 0, 0, 0, 0);
        if (delta_width > 0) {
                c = &locator.row->cells[ROW_WIDTH-1];
                last_column = c->is.coil ? (ROW_WIDTH-1 - x_offset(c)) : ROW_WIDTH-1;

if (locator.column_number + delta_width >= last_column) {
                        dsp_error("Rung width exceeded");
                        release_saved_rung();
                        insdel_cleanup(FORCE);
```

```
                leave("contact_insert, rung width exceeded", 0);
        }
        make_room_to_right(locator.row, push_column, delta_width, old_height);
}
if (delta_height > 0)
        make_room_below(push_row, place_column, move_width, delta_height);

if (!is_area_clear(locator.row, place_column, id, (editor_flags.insert_left ||
editor_flags.insert_right))) {
        restore_rung();
        insdel_cleanup(FORCE);
        leave("contact_insert, area not clear", 0);
}
if (!editor_flags.insert_left && !editor_flags.insert_right)
        delete_element_here(locator.row, locator.cell);
else if (editor_flags.insert_right) {
        locator.column_number += old_width;
        locator.cell += old_width;
}
locator.type = CELL_LOCATOR;
place_element(locator.row, locator.column_number, id);
draw_element(locator.cell, locator.row, locator.screen_row_offset, BIRTH, 0, dsp_state());
if (delta_height < 0) {
        /* find left and right extent of compression */
        for (left = place_column, tr = locator.row;
                left && !(is_shorted_up_on_left(tr, left) || is_shorted_down_on_left(tr, left)) &&
                tr->cells[left-1].type == HORZ_SHORT;
                --left);
        for (right = place_column+move_width-1;
                right < ROW_WIDTH-1 &&
                !(is_shorted_up_on_right(tr, right) || is_shorted_down_on_right(tr, right)) &&
                tr->cells[right+1].type == HORZ_SHORT;
                ++right);

/* determine direction to compress */
        if (left > 0)
                while (!(below = is_connectable_on_left(&tr->cells[left])) &&
is_shorted_up_on_left(tr, left))
```

```
                tr = tr->last_row;

else
                below = right >= ROW_WIDTH-1 || !is_shorted_down_on_right(tr, right);

if (below)
                compress_up(pull_row, left, right, -delta_height);
        else
                compress_down(push_row->last_row, left, right, -delta_height);
        }
        if (delta_width < 0)
                compress_left(locator.row, pull_column, -delta_width);
        release_saved_rung();
        insdel_cleanup(delta_height != 0 || delta_width != 0);
        leave("contact_insert", 0);
} coil_insert(id)                          /* -- insert a coil into the ladder -- */
int id;
{
        extern struct locator_def locator;
        extern struct editor_flags_def editor_flags;
        extern struct screen_layout_def screen_layout;
        extern int search_element_id, search_direction;
        struct elem_entry *element;
        struct row_def *push_row, *pull_row;
        union cell_def *c;
        int delta_height, delta_width, move_width;
        int old_height, old_width, old_column;
        int col, i;

if (editor_flags.search_for_element) {
                operating.menu = 0;
                editor_flags.search_for_element = FALSE;
                search_element_id = id;
                search(search_direction);
                return;
```

```
}
if (!is_ok_to_edit())
        return;
insdel_setup();
enter("coil_insert(%d)", id, 0, 0, 0);
element       = &element_tbl[id];
old_height    = element_height(locator.cell);
old_width     = element_width(locator.cell);
old_column    = locator.column_number;
delta_height  = element->height - old_height;
delta_width   = element->width - old_width;
move_width    = (delta_width > 0) ? element->width : old_width;
col           = ROW_WIDTH-element->width;
push_row      = add_row(locator.row, old_height);
pull_row      = add_row(locator.row, element->height);

/* -- check for a clear path to the left for a coil -- */
if (locator.column_number < col) {
        for (i = locator.column_number, c = locator.cell; i < col; ++i, ++c) {
                if (c->type != EMPTY && c->type != HORZ_SHORT && !c->is.coil) {
                        dsp_error("Path not clear");
                        insdel_cleanup(FORCE);
                        leave("coil_insert, path not clear", 0);
                }
        }
} if (delta_height > 0)
        make_room_below(push_row, col, element->width, delta_height);

/* -- check if area is clear -- */
if (!is_area_clear(locator.row, col, id, 0)) {
        if (delta_height > 0)
                compress_up(push_row, col, ROW_WIDTH-1, delta_height);
        insdel_cleanup(FORCE);
        leave("coil_insert, area not clear", 0);
}
```

```c
/* -- delete exiting coil (if one) -- */ c = &locator.row->cells[ROW_WIDTH-1];

if (c->is.coil)

delete_element_here(locator.row, &locator.row->cells[ROW_WIDTH-1 - x_offset(c)]);

if (delta_height < 0)

compress_up(push_row, col, ROW_WIDTH-1, -delta_height);

/* -- draw path to coil -- */ for (; locator.column_number < col; ++locator.column_number, ++locator.cell) { locator.cell->type = HORZ_SHORT;

draw_element(locator.cell, locator.row, locator.screen_row_offset, BIRTH, 0, dsp_state());

}

/* -- draw element -- */ locator.type = CELL_LOCATOR;

place_element(locator.row, col, id);

draw_element(locator.cell, locator.row, locator.screen_row_offset, BIRTH, 0, dsp_state());

if (delta_height < 0)

compress_up(push_row, old_column, ROW_WIDTH-1, -delta_height);

insdel_cleanup(FORCE);

leave("coil_insert", 0);

} short_insert()                              /* -- insert a short into the ladder -- */

{ extern struct locator_def locator;

extern struct editor_flags_def editor_flags;

extern struct screen_layout_def screen_layout;

union cell_def *c;

int old_height, old_width;

int delta_height, delta_width;

int last_column, push_column, place_column;

if (!is_ok_to_edit())

return;

insdel_setup();
```

```
enter("short_insert()", 0, 0, 0, 0);
old_height = element_height(locator.cell);
old_width  = element_width(locator.cell);
delta_height = 0;
delta_width  = (editor_flags.insert_left || editor_flags.insert_right) ? 1 : 0;
push_column = editor_flags.insert_left ? locator.column_number : locator.column_number + old_width;
place_column = editor_flags.insert_right ? locator.column_number + old_width : locator.column_number;

if (!save_rung(locator.row)) {
        insdel_cleanup(FORCE);
        leave("short_insert, insufficient working memory", 0);
}
within("current rung saved", 0, 0, 0, 0);
if (delta_width > 0) {
        c = &locator.row->cells[ROW_WIDTH-1];
        last_column = c->is.coil ? (ROW_WIDTH-1 - x_offset(c)) : ROW_WIDTH-1;

if (locator.column_number + delta_width >= last_column) {
                dsp_error("Rung width exceeded");
                release_saved_rung();
                insdel_cleanup(FORCE);
                leave("short_insert, rung width exceeded", 0);
        }
        make_room_to_right(locator.row, push_column, delta_width, old_height);
} if (!is_area_clear(locator.row, place_column, 0, (editor_flags.insert_left || editor_flags.insert_right))) {
        restore_rung();
        insdel_cleanup(FORCE);
        leave("short_insert, area not clear", 0);
}
if (!editor_flags.insert_left && !editor_flags.insert_right) {
        if (locator.row->cells[locator.column_number].type != EMPTY)
                delete_element_here(locator.row, locator.cell);
        else
```

```
                locator.row->cells[locator.column_number].type = HORZ_SHORT;
        }
        else if (editor_flags.insert_right) {
                locator.column_number += old_width;
                locator.cell += old_width;
        }
        locator.type = CELL_LOCATOR;
        release_saved_rung();
        insdel_cleanup(delta_height != 0 || delta_width != 0);
        leave("short_insert", 0);
} insert_row()                                    /* -- insert a row into the ladder -- */
{
        extern struct locator_def locator;
        extern struct row_chain_def row_chain;
        extern struct screen_layout_def screen_layout;
        struct row_def *r, *sr, *tr;
        int d, i;

if (!is_ok_to_edit())
                return;
        insdel_setup();
        enter("insert_row(): row = r%d", mum(locator.row), 0, 0, 0);
        r = locator.row;
        if (rung_height(r) < MAX_RUNG_HEIGHT) {
                for (sr = r, d = 0; !is_bottom_of_rung(sr); sr = sr->next_row, ++d);
                if ((tr = (struct row_def *)getmem(sizeof(struct row_def))) == NULL_ROW) {
                        dsp_error("Out of memory");
                        leave("insert_row, out of memory", FALSE);
                }
                setmem((char *)tr, sizeof(struct row_def), 0);

if (sr->next_row) {
                        sr->next_row->last_row = tr;
                        tr->next_row = sr->next_row;
                }
```

```
            else
                    row_chain.final_row = tr;
            sr->next_row = tr;
            tr->last_row = sr;
            row_chain.number_of_rows++;

do {
                    for (i = 0; i < ROW_WIDTH; ++i) {
                            if (sr->cells[i].type == HORZ_SHORT
                               || sr->cells[i].is_primary
                               || sr->cells[i].offset.y <= d) {
                                    tr->cells[i].type = sr->cells[i].type;
                                    sr->cells[i].type = EMPTY;
                                    tr->descriptor[i] = sr->descriptor[i];
                                    redraw_element(DOWN, &tr->cells[i], tr);
                            }
                            if (i && is_shorted_up_on_left(sr, i))
                                    short_up_on_left(tr, i);
                            else
                                    clear_up_on_left(tr, i);
                    }
                    check_occupancy(sr);
                    check_occupancy(tr);
                    tr = sr;
                    sr = tr->last_row;
            } while (d--);
    }
    else
            dsp_error("Maximum rung height exceeded");
    insdel_cleanup(FORCE);
    leave("insert_row", 0);
} insert_column()                     /* -- insert a column into the ladder -- */
{
    extern struct locator_def locator;
    extern struct editor_flags_def editor_flags;
```

```
    int height, col = locator.column_number;
    union cell_def *c = locator.cell;
    struct row_def *r;

if (!is_ok_to_edit())
            return;
    insdel_setup();
    enter("insert_column(): column = %d", locator.column_number, 0, 0, 0);
    if (!editor_flags.insert_left)
            col++;
    r = rung_top(locator.row);
    do {
            c = &r->cells[col];
            if (c->is.primary) {
                    height = element_height(c);
                    make_room_to_right(r, col, 1, height);
                    for (--height; height--; r = r->next_row)
                            ;
            }
            else if (!c->is.primary && c->offset.x)
                    ;
            else
                    make_room_to_right(r, col, 1, 1);
            r = r->next_row;
    } while (r && !is_top_of_rung(r));
    insdel_cleanup(FORCE);
    leave("insert_column", 0);
} delete_row()                            /* -- delete a row from the ladder -- */
{
    extern struct locator_def locator;
    union cell_def *c;
    int col, height, right;

if (!is_ok_to_edit())
            return;
```

```c
        insdel_setup();
        enter("delete_row(): row = r%d", mum(locator.row), 0, 0, 0);
        for (col = 0, c = locator.row->cells; col < ROW_WIDTH; c++, col++) {
                if (c->is.primary) {
                        height = element_height(c);
                        right = col+element_width(c)-1;
                        delete_element_here(locator.row, c);
                        col = right;
                        c = &locator.row->cells[col];
                }
        }
        for (col = 0, c = locator.row->cells; col < ROW_WIDTH; c++, col++) {
                if (c->type == HORZ_SHORT)
                        c->type = EMPTY;
        }
        check_occupancy(locator.row);
        if (!locator.row->is.occupied) {
                if (locator.row->last_row && locator.row->next_row &&
                    !(locator.row->last_row->is.occupied || locator.row->last_row->is_vert_shorted))
                        locator.row->next_row->is_vert_shorted = 0;
                delete_row_here(locator.row);
        }
        insdel_cleanup(FORCE);
        leave("delete_row", 0);
} delete_column()                         /* -- delete a column from the ladder -- */
{
        extern struct locator_def locator;
        extern struct editor_flags_def editor_flags;
        struct row_def *r = locator.row, *temp_r;
        union cell_def *c = &r->cells[locator.column_number];
        int col = locator.column_number;

if (!is_ok_to_edit())
                return;
        insdel_setup();
```

```
enter("delete_column(): column = %d", locator.column_number, 0, 0, 0);

temp_r = rung_top(locator.row);

for (r = temp_r; !is_bottom_of_rung(r->last_row);
                                r = r->next_row, c = &r->cells[col]) {
        if (!c->is.primary && c->offset.x)
                ;
        else if (c->type != EMPTY)
                delete_element_here(r, c);
        check_occupancy(r);
} compress_left(temp_r, ++col, 1);

insdel_cleanup(FORCE);

leave("delete_column", 0);
} delete_element()                /* -- delete an element from the ladder -- */
{
        extern struct locator_def locator;
        union cell_def *c;
        struct row_def *r, *tr;
        int width, compress_width, height, left, right, coil, nuke;
        int box_left_up, box_left_down, box_right_up, box_right_down;
        int ul, ur, dl, dr, on, below;
        int i, j;

if (!is_ok_to_edit())
                return;
        insdel_setup();
        r = locator.row;
        c = locator.cell;
        height = element_height(c);
        width = element_width(c);
        i = left = locator.column_number;
        j = right = left+width-1;
        enter("delete_element(): %d X %d element on row %d, column %d", height, width, mum(r), left);

coil = c->is.coil;
```

```
delete_element_here(r, c);

ul = i == 0 || is_shorted_up_on_left(r, i);
dl = i == 0 || is_shorted_down_on_left(r, i);
while ((nuke = (r->cells[i].type == HORZ_SHORT)) && !(ul || dl)) {
        --i;
        ul = i == 0 || is_shorted_up_on_left(r, i);
        dl = i == 0 || is_shorted_down_on_left(r, i);
}
if (nuke) {
        ur = (j >= ROW_WIDTH-1 || is_shorted_up_on_right(r, j)) && ul;
        dr = (j >= ROW_WIDTH-1 || is_shorted_down_on_right(r, j)) && dl;
        while ((nuke = (r->cells[j].type == HORZ_SHORT)) && !(ur || dr)) {
                ++j;
                ur = (j >= ROW_WIDTH-1 || is_shorted_up_on_right(r, j)) && ul;
                dr = (j >= ROW_WIDTH-1 || is_shorted_down_on_right(r, j)) && dl;
        }
        if (nuke) {
                /* if we get here, element was bounded by vertical shorts (or rail) */
                /* now find out if bounded short is boxed in.                        */ nuke = FALSE;
                box_left_up = box_left_down = i == 0;
                box_right_up = box_right_down = j >= ROW_WIDTH-1;

if (ul && ur) {
                        for (tr = r;
                             !(box_right_up || is_top_of_rung(tr)) &&
                                is_shorted_up_on_right(tr, j);
                             box_right_up = is_connectable(&tr->cells[j])
                                tr = tr->last_row;
                        if (box_right_up) {
                                for (tr = r;
                                     !(box_left_up || is_top_of_rung(tr)) &&
                                        is_shorted_up_on_left(tr,i);
                                     box_left_up = is_connectable(&tr->cells[i])
                                        tr = tr->last_row;
                                nuke = box_left_up && box_right_up;
```

```
            }
         }
         if (!nuke && dl && dr) {
            for (tr = r;
                 !(box_right_down || is_bottom_of_rung(tr)) &&
is_shorted_down_on_right(tr,j);
                 box_right_down = is_connectable(&tr->cells[j]))
               tr = tr->next_row;
            if (box_right_down) {
               for (tr = r;
                    !(box_left_down || is_bottom_of_rung(tr)) &&
is_shorted_down_on_left(tr,i);
                    box_left_down = is_connectable(&tr->cells[i]))
                  tr = tr->next_row;
               nuke = box_left_down && box_right_down;
            }
         }
      }
   }
   if (nuke) {
      within("nuking row %d from %d to %d", mum(locator.row), i, j, 0);
      left = i;
      right = j;
      /* determine direction to compress */
      tr = r;
      if (left > 0)
         for (below = FALSE;
              !below && is_shorted_up_on_left(tr, left);
              below = is_connectable_on_left(&tr->cells[left]))
            tr = tr->last_row;

else
         for (below = FALSE;
              !(below || is_top_of_rung(tr));
              below = is_connectable(&tr->cells[left]))
            tr = tr->last_row;

if (below)
```

```
            on = (left > 0 && is_connectable_on_left(&r->cells[left])) ||
                 (left == 0 && is_connectable_on_right(&r->cells[right]));
        else
            on = FALSE;

erase_shorts_right(r, c);
    erase_shorts_left(r, c, 0);
    if (on && !coil) {
        if (ul && ur) {
            compress_down(r, left, right, 1);
            if (height > 1)
                compress_up(r->next_row, left, right, height-1);
        }
        else
            compress_up(r, left, right, height);
    }
    else if ((below && dl && dr) || coil)
        compress_up(r, left, right, height);
    else if (!below && ul && ur)
        compress_down(add_row(r, height-1), left, right, height);
    else {
        check_occupancy(r);
        if (!r->is.occupied)
            delete_row_here(r);
    }
    if (compress_width = width-element_width(c))
        compress_left(r, right+1, compress_width);

}
else {
    if (coil) {
        within("deleteing coil on row %d", mum(locator.row), 0, 0, 0);
        erase_shorts_right(r, c);
        erase_shorts_left(r, c, 1);
    }
    else
        within("deleting element on row %d at column %d", mum(locator.row),
locator.column_number, 0, 0);
```

```
        if (height > 1)
                compress_up(r->next_row, left, right, height-1);

if (!coil)
                compress_left(r, right+1, width);
        }
        check_occupancy(r);
        insdel_cleanup(FORCE);
        leave("delete_element", 0);
}
/*page*/
/* ======================= lower level routines ======================= */ struct row_def * primary_row(r)                          /* -- return pointer to top row shorted to left rail -- */
struct row_def *r;

{
        struct row_def *tr;

while (!is_top_of_rung(r))
                r = r->last_row;

for (tr = r; !(r->cells[0].is_primary || is_bottom_of_rung(r)); r = r->next_row);

return(r->cells[0].is_primary ? r : tr);

} insert_row_here(r)                      /* -- insert row at r (must be clear) -- */
struct row_def *r;
{
        extern struct locator_def locator;
        extern struct attribute_def attribute;
        extern struct screen_layout_def screen_layout;
        extern int active_segment, dsp_segment, alt_segment;
        struct row_def *new_row;
```

```
        char *getmem();
        int scn_row;

enter("insert_row_here(r%d)", mum(r), 0, 0, 0);
        insdel_row_flag = TRUE;
        if ((new_row = (struct row_def *)getmem(sizeof(struct row_def))) == NULL_ROW) {
                dsp_error("Out of memory");
                leave("insert_row_here, out of memory", FALSE);
        }
        setmem((char *)new_row, sizeof(struct row_def), 0);
        link_row(new_row, r);
        check_occupancy(new_row);
        scn_row = locator.screen_row_offset + sub_row(new_row, locator.row);
        if (locator.screen_row_offset > scn_row) {
                ++locator.row_number;
                if (is_on_screen(scn_row))
                        ++locator.screen_row_offset;
        }
        /* -- check if new row is on screen -- */
        if (is_on_screen(scn_row) && active_segment == dsp_segment) {
                active_segment = all_segment;
                draw_row(new_row, scn_row, FORCE);
                if (scn_row < screen_layout.rows_per_screen - 1)
                        scroll_dsp(SCROLL_DOWN, row_line(scn_row),
                                screen_layout.bottom_work_line,
                                screen_layout.lines_per_row,
                                *attribute.work_area);
                restore_row(scn_row);
                active_segment = dsp_segment;
        }
        leave("insert_row_here", TRUE);
} link_row(row1, row2)                    /* -- link parts of row1 above row2 -- */
struct row_def *row1, *row2;

{
        extern struct row_chain_def row_chain;
```

```
enter("link_row(r%d, r%d)", mum(row1), mum(row2), 0, 0);

row1->next_row = row2;

row1->last_row = row2->last_row;

if (row2->last_row) { row2->last_row->next_row = row1;

row1->is_vert_shorted = row2->is_vert_shorted;

} else row_chain.first_row = row1;

row2->last_row = row1;

row_chain.number_of_rows++;

leave("link_row", 0);

} delete_row_here(this_row)                    /* -- delete row at r (must be clear) -- */
struct row_def *this_row;

{ extern struct locator_def locator;

extern struct attribute_def attribute;

extern struct row_chain_def row_chain;

extern struct screen_layout_def screen_layout;

extern int active_segment, dsp_segment, alt_segment;

struct row_def *next_row, *last_row;

int scn_row, used_to_be_bottom, lost_rung;

enter("delete_row_here(r%d)", mum(this_row), 0, 0, 0);

insdel_row_flag = TRUE;

used_to_be_bottom = is_bottom_of_rung(locator.row);

scn_row = locator.screen_row_offset + sub_row(this_row, locator.row);

next_row = this_row->next_row;

last_row = this_row->last_row;

lost_rung = (!next_row || !next_row->is_vert_shorted)
                && (this_row->is_vert_shorted ? (!last_row || (!last_row->is.occupied && !last_row->is_vert_shorted))
                                              : this_row->is.occupied);

within("lost rung = %d", lost_rung, 0, 0, 0);
```

```
if (this_row == locator.row) {
    if (next_row)
        locator.row = next_row;
    else if (last_row) {
        locator.row = last_row;
        locator.screen_row_offset--;
        locator.row_number--;
    }
    else {
        leave("delete_row_here, ladder empty", 0);
        return;
    }
    locator.cell = &locator.row->cells[locator.column_number];
}
else if (locator.screen_row_offset > scn_row) {
    --locator.row_number;
    if (is_on_screen(scn_row))
        --locator.screen_row_offset;
    if (lost_rung) {
        within("decrementing rung_number", 0, 0, 0, 0);
        --locator.rung_number;
    }
}
unlink_row(this_row);
if (used_to_be_bottom && !is_bottom_of_rung(locator.row) && !lost_rung)
    ++locator.rung_number;
if (last_row) compile(last_row);
if (next_row) compile(next_row);

/* check if deleted row was on screen */
if (is_on_screen(scn_row) && active_segment == dsp_segment) {
    active_segment = alt_segment;
    draw_row(add_row(locator.row, screen_layout.rows_per_screen - 1 -
locator.screen_row_offset),
            screen_layout.rows_per_screen - 1, FORCE);
    if (scn_row < screen_layout.rows_per_screen - 1)
        scroll_dsp(SCROLL_UP, row_line(scn_row),
                screen_layout.bottom_work_line,
```

```
                screen_layout.lines_per_row,
                *attribute.work_area);
        restore_row(screen_layout.rows_per_screen - 1);
        active_segment = dsp_segment;
    }
    leave("delete_row_here", 0);
} unlink_row(r)                          /* -- remove row from ladder -- */
struct row_def *r;
{
    extern struct row_chain_def row_chain;
    extern struct screen_layout_def screen_layout;

enter("unlink_row(r%d)", mum(r), 0, 0, 0);
    if (r->last_row)
        r->last_row->next_row = r->next_row;
    else
        row_chain.first_row = r->next_row;
    if (r->next_row)
        r->next_row->last_row = r->last_row;
    else
        row_chain.final_row = r->last_row;
    rlsmem((char*)r, sizeof(struct row_def));
    if (--row_chain.number_of_rows < 1 || !row_chain.first_row || !row_chain.final_row) {
        if (!(row_chain.first_row = row_chain.final_row = (struct row_def *)getmem(sizeof(struct row_def))))
            err_exit("Insufficient memory");
        setmem(row_chain.first_row, sizeof(struct row_def), 0);
        row_chain.number_of_rows = 1;
    }
    leave("unlink_row", 0);
} delete_element_here(r, c)              /* -- remove element at r,c -- */
union cell_def *c;
```

```c
struct row_def *r;
{
        extern struct locator_def locator;
        extern struct screen_layout_def screen_layout;
        extern int active_segment, dsp_segment, alt_segment;
        union cell_def *temp_c;
        struct row_def *temp_r;
        int width, height;
        int i, j, alt_row;
        int old_segment, col;

col = c - r->cells;
        enter("delete_element_here(r%d, %d)", num(r), col, 0, 0);
        if (c->type == EMPTY)
                leave("delete_element_here, cell empty", FALSE);
        else if (c->type == HORZ_SHORT)
                leave("delete_element_here", TRUE);

width = element_width(c);
        height = element_height(c);
        old_segment = active_segment;
        active_segment = alt_segment;
        for (i = 0, temp_r = r; i < height; temp_r = temp_r->next_row, i++) {
                for (j = 0, temp_c = &temp_r->cells[col]; j < width; j++, temp_c++)
                        temp_c->type = EMPTY;
                check_occupancy(temp_r);
        }
        if (col + width <= ROW_WIDTH && is_shortable_on_left(r, c,       col    )
                        && is_shortable_on_right(r, c+width-1, col+width-1)) {
                for (i = col, temp_c = c; i < col + width; i++, temp_c++)
                        temp_c->type = HORZ_SHORT;
                r->is.occupied = TRUE;
        }
        for (i = 0, temp_r = r, alt_row = locator.screen_row_offset; i < height; i++, temp_r = temp_r->next_row, alt_row++)
                draw_row(temp_r, alt_row, FORCE);
        if (old_segment == dsp_segment)
```

```
        restore_dsp(row_position(locator.screen_row_offset),
height*screen_layout.chars_per_row);
        active_segment = old_segment;
        leave("delete_element_here", TRUE);
}
/* ======================= erase shorts routines ======================= */ erase_shorts_left(r, c, coil)          /* -- erase shorts to the left -- */
union cell_def *c;
struct row_def *r;
int coil;
{
        extern struct locator_def locator;
        union cell_def *cr = c;
        int i, o, col, done;

col = c - r->cells;
        enter("erase_shorts_left() row%d, %d", mum(r), col, 0, 0);

c->type = EMPTY;

for (done = FALSE, i = locator.column_number-1, --c;
           (i >= 0) && !done;
           c = &r->cells[i], cr = &r->cells[i+1]) { if ((c->type == HORZ_SHORT) && (cr->type == EMPTY) &&
                    !(is_shorted_up_on_right(r,i) || is_shorted_down_on_right(r,i))) {
                        c->type = EMPTY;
                        check_occupancy(r);
                        --i;
                }
                else if (!is_connectable(c) && !is_connectable(cr) &&
                        is_shorted_up_on_right(r,i) && !is_shorted_down_on_right(r,i)) {
                        clear_up_on_right(r,i);
                        r = r->last_row;
                }
                else if (!is_connectable(c) && !is_connectable(cr) &&
```

```
                is_shorted_down_on_right(r,i) && !is_shorted_up_on_right(r,i)) { clear_down_on_right(r,i);

r = r->next_row;

} else done = TRUE;

} if (coil) { o = sub_row(r, locator.row);

locator.screen_row_offset += o;

locator.row = r;

locator.row_number += o;

locator.column_number = i+1;

locator.cell = cr;

} leave("erase_shorts_left", TRUE);

} erase_shorts_right(r, c)            /* -- erase shorts to the right -- */
union cell_def *c;
struct row_def *r;
{
        extern struct locator_def locator;
        union cell_def *cl = c;
        int i, col, done;

col = c - r->cells;
        enter("erase_shorts_right(r%d, %d)", mum(r), col, 0, 0);

c->type = EMPTY;

for (done = FALSE, i = locator.column_number+1, ++c;
            (i < ROW_WIDTH) && !done;
            c = &r->cells[i], cl = &r->cells[i-1]) { if ((c->type == HORZ_SHORT) && (cl->type == EMPTY) &&
```

```
                is_shorted_up_on_left(r,i) && !is_shorted_down_on_left(r,i)) {
                    c->type = EMPTY;
                    check_occupancy(r);
                    ++i;
            }
            else if (!is_connectable(c) && !is_connectable(cl) &&
                    is_shorted_up_on_left(r,i) && !is_shorted_down_on_left(r,i)) {
                clear_up_on_left(r,i);
                r = r->last_row;
            }
            else if (!is_connectable(c) && !is_connectable(cl) &&
                    is_shorted_down_on_left(r,i) && !is_shorted_up_on_left(r,i)) {
                clear_down_on_left(r,i);
                r = r->next_row;
            }
            else
                done = TRUE;
        }
        leave("erase_shorts_right", TRUE);
}

/* =============== make room and take up room routines =============== */ make_room_below(r, col, width, height)      /* -- move elements below area down to make room for new
element -- */
    struct row_def *r;
    int col;
    int width;
    int height;
{
        enter("make_room_below(r%d, %d, %d, %d)", num(r), col, width, height);
        while (width--)
            if (!push_column_down(r, col++, height))
                break;
        leave("make_room_below", 0);
}
```

```
make_room_to_right(r, col, width, height) /* -- move elements to right of area over to make room for new
element -- */
    struct row_def *r;
    int col;
    int width;
    int height;
{
        enter("make_room_to_right(r%d, %d, %d, %d)", mum(r), col, width, height);
        for (; height--; r = r->next_row)
                if (!push_row_right(r, col, width))
                        break;
        leave("make_room_to_right", 0);
}
```

HOUSEKEEPING TASK 38

/*title*/
/* houskeep.c -- house keeping functions. (c) 1986 Pertron Controls */ include "stddefs.h"
include "kdd-defs.h"
include "display.h"
include "comm.h"

define AV_LIST_BYTES       (256 * sizeof(struct av_def))

/* ------------------------------------------------------------------------- */
/* static globals                                                            */
/* ------------------------------------------------------------------------- */
static struct av_def *rdt, *wdt;
static struct av_def *read_dt_list, *write_dt_list;

```c
static int rdt_num, wdt_num, read_dt_list_num, write_dt_list_num;
static int house_disable_req = 0;
static int house_disable_ack = 0;

/* ....................................................................................
.................. */
/* initialize the house keeping static variables.
            */
/* ....................................................................................
.................. */
void init_house_keep()
{
        extern int *data_table;
        char *getmem(), *getml();
        void clear_dt_lists();

if (!(data_table = (int *)getml(0x10000L))
          || !(rdt = (struct av_def *)getmem(AV_LIST_BYTES))
          || !(wdt = (struct av_def *)getmem(AV_LIST_BYTES))
          || !(read_dt_list = (struct av_def *)getmem(AV_LIST_BYTES))
          || !(write_dt_list = (struct av_def *)getmem(AV_LIST_BYTES)))
                err_exit("Insufficient memory");
        repmem(data_table, "\0\0", 2, 0x8000);
        clear_dt_lists();
}

/* ....................................................................................
.................. */
/* house keeping task entry point. the house keeping task updates the data table if we are attached.
            */
/* ....................................................................................
.................. */
void house_keep_task()
{
        extern int *data_table;
        extern struct plc_def plc;
```

```
extern struct editor_flags_def editor_flags;

struct av_def *avp;

int n;

void clear_dt_lists(), check_for_mode_change();

clear_dt_lists();

for (;;) {
        check_for_mode_change();
        if (house_disable_req && !house_disable_ack) {
                house_disable_ack = TRUE;
                event_trigger(1, HOUSE_DIS_ACK);
        }
        else if (house_disable_ack && !house_disable_req) {
                house_disable_ack = FALSE;
                clear_dt_lists();
        }
        else if (!house_disable_ack && plc.is_attached && plc.is_smart) {
                read_dt(PLC_STAT_WORD);
                fetch(DATA_TABLE, 0);
                if (wdt_num = write_dt_list_num)
                        movmem(write_dt_list, wdt, wdt_num * sizeof(struct av_def));
                if (rdt_num = read_dt_list_num)
                        movmem(read_dt_list, rdt, rdt_num * sizeof(struct av_def));
                setmem(write_dt_list, write_dt_list_num * sizeof(struct av_def),
(write_dt_list_num = 0));
                setmem(read_dt_list, read_dt_list_num * sizeof(struct av_def),
(read_dt_list_num = 0));
                release(DATA_TABLE);
                if (plc.is_attached && wdt_num) {
                        fetch(DATA_TABLE, 0);
                        for (avp = wdt, n = wdt_num; n--; avp++)
                                avp->value = data_table[avp->address];
                        release(DATA_TABLE);
                        cmd_write_dt(wdt, wdt_num);
                }
                if (plc.is_attached && rdt_num && !write_dt_list_num && !cmd_read_dt(rdt,
rdt_num)) {
                        fetch(DATA_TABLE, 0);
```

```
                if (!write_dt_list_num)
                    for (avp = rdt, n = rdt_num; n--; avp++)
                        data_table[avp->address] = avp->value;
                release(DATA_TABLE);
            }
        }
        else if (!plc.is_attached) {
            fetch(DATA_TABLE, 0);
            data_table[PLC_STAT_WORD] = PROGRAM_MODE;
            setmem(write_dt_list, write_dt_list_num * sizeof(struct av_def),
(write_dt_list_num = 0));
            setmem(read_dt_list, read_dt_list_num * sizeof(struct av_def),
(read_dt_list_num = 0));
            release(DATA_TABLE);
        }
    }
}

/* ------------------------------------------------------------------------------
---------------- */
/* this routine is called each pass through the housekeeping loop. it checks for mode changes from all sources and
        */
/* triggers the compiler update event if a switch to program mode occurs. it clears the error line whenever any
mode    */
/* change occurs.
                                */
/* ------------------------------------------------------------------------------
---------------- */
void check_for_mode_change()
{
    extern int *data_table;
    extern struct plc_def plc;
    static int old_ks = KS_PROGRAM;
    static int old_ksm = KSM_HARD_PROGRAM;

if ((old_ksm    == KSM_SOFT_TEST || old_ksm    == KSM_SOFT_RUN)
        && (plc_ks_mode() != KSM_SOFT_TEST && plc_ks_mode() != KSM_SOFT_RUN)) {
        if (!queue_empty(COMPILER)) {
            dsp_error("Update in progress");
```

```c
                event_trigger(1, UPDATE_EVENT);
                do {
                        wait_time(1000 / TICK);
                } while (!queue_empty(COMPILER));
        }
        clr_error();
        clr_event(UPDATE_EVENT);
    }
    if (plc.is_fully_attached && old_ksm != plc_ks_mode())
            clr_error();
    old_ksm = plc_ks_mode();
    old_ks = plc_keyswitch();
} read_dt(addr)
int addr;
{
        extern int *data_table;
        extern struct plc_def plc;

fetch(DATA_TABLE, 0);
        if (plc.is_attached && read_dt_list_num < 255)
                read_dt_list[read_dt_list_num++].address = addr;
        release(DATA_TABLE);
        return(data_table[addr]);
} void write_dt(addr, value)
int addr, value;
{
        extern int *data_table;
        extern struct plc_def plc;
        extern struct editor_flags_def editor_flags;

fetch(DATA_TABLE, 0);
        data_table[addr] = value;
```

```c
        if (!is_in_proc_work_area(addr))
                editor_flags.modified = TRUE;
        if (plc.is_attached && write_dt_list_num < 255)
                write_dt_list[write_dt_list_num++].address = addr;
        release(DATA_TABLE);
} void clear_data_table()
{
        extern struct plc_def plc;
        void disable_house_keep(), enable_house_keep();

disable_house_keep();
        fetch(DATA_TABLE, 0);
        setmem(data_table + 010, ( 0100 - 010) * sizeof(int), 0);
        setmem(data_table + 0110, (0100000 - 0110) * sizeof(int), 0);
        release(DATA_TABLE);
        if (plc.is_attached)
                download_data_tbl();
        enable_house_keep();
} void clear_dt_lists()
{
        fetch(DATA_TABLE, 0);
        read_dt_list_num = write_dt_list_num = 0;
        setmem(write_dt_list, AV_LIST_BYTES, 0);
        setmem(read_dt_list, AV_LIST_BYTES, 0);
        release(DATA_TABLE);
} void disable_house_keep()
{
        clr_event(HOUSE_DIS_ACK);
        house_disable_req++;
```

```
        if (!house_disable_ack)
                wait_event(HOUSE_DIS_ACK, 0);
} void enable_house_keep()
{
        if (house_disable_req)
                --house_disable_req;
}
```

COMMUNICATIONS TASK 47

```
/*title*/
/* plcnet.c — plc network driver (c) 1986-88 Pertron Controls */ include "netdef.h"

/* -------------------------------------------------- plc network driver ------------------------------
--------------     */
/* high level interface :
                                *  /

/*
                                * /
/*      xmt_select(addr, cmd, len, cnt, text, flags)
                         */
/*              transmit the select command of length len at cmd, and text buffers with lengths at cnt and pointers */
/*              at text to addr. if the host bit is set in the flags word, it indicates that the text resides in host */
/*              memory and must be downloaded. if the compress bit is set in the flags word, it indicates that the text */
/*              is to be compressed before it is transmitted. if the multi buffer bit is not set in the flags word, */
/*              there is only one text buffer, and it is pointed to by text, and it's length is in the long word cnt. */
```

```
/*          if the multi buffer bit is set then the list of buffers is terminated by a count of zero. returns */
/*          error status (zero = OK)                                                                         */

/*   xmt_poll(addr, cmd, len, cnt, text, flags)                                                              */
/*          transmit the poll command of length len    at cmd, and fill text buffers with lengths cnt and pointers */
/*          at text from addr. If the host bit is set in the flags word it indicates that text buffers reside in */
/*          host memory and must be filled via an upload. If the compress bit is set in the flags word, it   */
/*          indicates that the text must be uncompressed before it is stuffed into the buffers. If the multi */
/*          buffer bit is not set in the flags word, there is only one text buffer, and it is pointed to by text, */
/*          and it's length is in the long word cnt. If the multi buffer bit is set then the list of buffers is */
/*          terminated by a count of zero. returns error status (zero = OK)                                  */

/*   rcv_cmd(addr, cmd, len)                                                                                 */
/*          receives a command into cmd and sets len to the length thereof and addr to the command originator. */
/*          returns error status (zero = OK)                                                                 */

/*   rej_cmd(addr)                                                                                           */
/*          reject the command received from addr. no returns.                                               */

/*   xmt_msg(addr, cnt, text, flags)                                                                         */
/*          transmit text buffers of lengths cnt and pointers at text to addr. If if the host bit is set in  */
/*          the flags word, it indicates that the text resides in host memory and must be downloaded. If the */
/*          compress bit is set in the flags word, it indicates that the text is to be compressed before it is */
/*          transmitted. If the multi buffer bit is not set in the flags word, there is only one text buffer,
```

```
and         */
/*              it is pointed to by text, and it's length is in the long word cnt. If the multi buffer bit is set then    */
/*              the list of buffers is terminated by a count of zero. returns error status (zero = OK)
                        */
/*      rcv_msg(addr, cnt, text, flags)
                        */
/*              receive a message from addr into buffers with sizes at cnt and pointers at text. if the host bit is    */
/*              set in the flags word it indicates that text buffers reside in host memory and must be filled via an    */
/*              upload. if the compress bit is set in the flags word, it indicates that the text must be uncompressed   */
/*              before it is stuffed into the buffers. If the multi buffer bit is not set in the flags word, there is   */
/*              only one text buffer, and it is pointed to by text, and it's length is in the long word       cnt. if the    */
/*              multi buffer bit is set then the list of buffers is terminated by a count of zero, and the values at    */
/*              cnt are updated to reflect the actual length of the received data. returns error status (zero = OK)    */
/* ------------------------------------------------------------------------------------------------
   ----------------    */

/* ------------------------------------------------------------------------------------------------
   ----------------    */
/* low level interface :
                        */
/*
                        */
/*      CMD_TOUT_TIME, DAT_TOUT_TIME, CMD_MAX_TRIES, DAT_MAX_TRIES
                        */
/*              number of user defined ticks and retries for a command or data frame time out.
                        */
/*      MAX_DATA_LEN, MIN_PHYS_LEN
                        */
```

```
/*         maximum length of frame data, minimum phyiscal length of frame
         */
/*    DAT_HDR_BYTES, CMD_HDR_BYTES, CTL_HDR_BYTES
         */
/*       sizes of respective frame types, not including data
         */
/*    FN_MASK
         */
/*       mask indicating frame counting modulo.
         */
/*    wpl(frame, length), wfl(frame, length), rpl(frame), rfl(frame)
         */
/*       these macros write or read the physical or logical length into/from a frame.
         */
/*    init_data_(frame), init_cmd(frame), init_ctl(frame)
         */
/*       these macros initialize the optional members of the associated frame structures
         */
/*    movaddr(src, dst, cnt), cmpaddr(src, dst, cnt)
         */
/*       these macros are used to move and compare addresses
         */
/*    struct dat_frame_def, cmd_frame_def, ctl_frame_def
         */
/*       data, command, and control frame definition structures, members must include:
         */
/*       item  dst[];           destination address, any alignment or size
         */
/*       item  src[];           source address, same alignment and size as destination address
         */
/*       item  err;             error status
         */
/*       item  fn;      frame number
         */
/*       item  ft;      frame type
         */
/*       item  nu;      not used
         */
```

```
/*         item fd[MAX_DATA_LEN]; frame data buffer
                                      */
/*         these members will only be written/read via the user defined macros wpl, rpl, wtl, rtl
                   */
/*         item plen;              physical length of frame
                                      */
/*         item len;               logical data length
                                      */
/*         the frame may optionaly include other fields that the user must initialize via the init_data,
                   */
/*         init_cmd, and init_ctl macros.
                                      */
/*   sleep(user_ticks)
                   */
/*         put us to sleep for user ticks.
                                      */
/*   upmem(src, dest, cnt)
                                      */
/*         upload memory to dest in host address space from src in our address space. cnt is in bytes and always     */
/*         even.
                                      */
/*   downmem(src, dest, cnt)
                                      */
/*         download memory from src in host address space to dest in our address space. cnt is in bytes and always   */
/*         even.
                                      */
/*   movmem(src, dest, cnt)
                                      */
/*         move cnt (always even) bytes from src to dest in our address space.
                                      */
/*   setmem(src, cnt, value)
                                      */
/*         set cnt bytes at src in our address space to value. cnt is guarenteed to always be even.
           */
/*   xmt_net_frame(fp)
                                      */
```

/*            should transmit the frame at fp after filling in the source field.    */
/*     rtv_net_frame(fp)    */
/*            wait if necessary for the end of transmition of the frame at fp, (called after xmt_net_frame).    */
/*     rcv_net_frame(user_ticks)    */
/*            wait timeout time for a frame to be received and return a pointer thereto. return zero for timeout.    */
/*     rls_net_frame(fp)
/*            release a frame back to the low level driver. this routine must be capable of handling a null pointer.    */
/*                   */
/* ................................................................................................ */

/* --------------------------------------------------- constant definitions ---------------------------------------- */

```c
define DMA_FLAG        0x0001          /* upload/download text bit in flags word */
define COMPRESS_FLAG   0x0002          /* compress/uncompress text bit of flags word */
define MULTI_BUFF_FLAG 0x0004          /* we are passed an array of cnts and text ptrs */
define ESCAPE          0x5a5a
define FILLER          0xa5a5
define minimum(a, b)   (((a) < (b)) ? (a) : (b))
define NULL_DAT_FPTR   (struct dat_frame_def *)0
define NULL_CMD_FPTR   (struct cmd_frame_def *)0
define NULL_CTL_FPTR   (struct ctl_frame_def *)0
define rcv_dat_frame   (struct dat_frame_def *)rcv_net_frame
define rcv_cmd_frame   (struct cmd_frame_def *)rcv_net_frame
define rcv_ctl_frame   (struct ctl_frame_def *)rcv_net_frame
```

/* ---------------------------------------------------- frame type definitions ------------------------------- */

```
define ACK         0x06        /* acknowledge */
define NAK         0x15        /* negative acknowledge (crc error etc) */
define WAK         0x16        /* wait acknoledge (sync, try later) */
define HACK        0x1a        /* halt acknoledge (sub, reject cmd) */
define QUACK       0x1b        /* quit acknoledge (fatal driver error) */
define RINT        0x18        /* reverse interrupt (cancel) */
define DATA        0x02        /* normal data frame (stx) */
define LAST        0x03        /* last data frame (etx) */
define POLL        0x05        /* poll command frame (enq) */
define SELECT      0x01        /* select command frame (soh) */
define POLL_MORE   0x08
define SELECT_MORE 0x04
define TOUT_ERR    0x07        /* error status for timeout */
define NO_ERROR    0x00        /* no error error status */
```

/* ---------------------------------------------- structure definitions ------------------------------- */

```
struct block_info {                 /* blocking/deblocking structure */
    word txt_num;                   /* number of current buffer. */
    word txt_left;                  /* bytes
```

```
                                                            /* pointer
        byte *txt_ptr;
within current buffer    */
};

/*page*/
/* ................................................................................
................  */

/* host transmit select to tributary entry point
                 */
/* ................................................................................
................  */
xmt_select(addr, cmd, length, cnt, text, flags;
 byte *addr;
 byte *cmd;
 word length;
 word *cnt;
 byte **text;
 word flags;
{
        int err;
        word ft, fn, len;
        struct block_info bi;
        struct cmd_frame_def cf;

bi.txt_num = 0;
        bi.txt_left = length;
        bi.txt_ptr = cmd;
        for (fn = 0, err = 0; !err && bi.txt_left; ++fn) {
                len = block(&bi, MAX_DATA_LEN, cf.fd, (word *)0, (byte **)0, 0);
                ft = (bi.txt_left) ? SELECT_MORE : SELECT;
                makecmd(&cf, addr, fn, ft, len);
                err = put_cmd(&cf);
        }
        if (!err)
                err = put_msg(addr, cnt, text, flags);
        return(err);

}
```

/* ................................................................................................ */

/* host transmit poll to tributary entry point                                                      */

/* ................................................................................................ */

```c
xmt_poll(addr, cmd, length, cnt, text, flags)
 byte *addr;
 byte *cmd;
 word length;
 word *cnt;
 byte **text;
 word flags;
{
        int err;
        word ft, fn, len;
        struct block_info bi;
        struct cmd_frame_def cf;

bi.txt_num = 0;
        bi.txt_left = length;
        bi.txt_ptr = cmd;
        for (fn = 0, err = 0; !err && bi.txt_left; ++fn) {
                len = block(&bi, MAX_DATA_LEN, cf.fd, (word *)0, (byte **)0, 0);
                ft = (bi.txt_left) ? POLL_MORE : POLL;
                makecmd(&cf, addr, fn, ft, len);
                err = put_cmd(&cf);
        }
        if (!err)
                err = get_msg(addr, cnt, text, flags);
        return(err);
}
```

/* ................................................................................................ */

/* tributary receive command from host entry point. copies command string to cmd, sets cmd_len, and copies address of                  */
/* command originator to addr.
                                            */

/* ................................................................................................... */

```c
rcv_cmd(addr, cmd, len)
 byte *addr;
 byte *cmd;
 word *len;
{
        int err;
        word more, fn;
        struct block_info bi;
        struct cmd_frame_def *cfp;

bi.txt_num  = 0;
        bi.txt_left = MAX_CMD_LEN;
        bi.txt_ptr  = cmd;
        for (more = 1, fn = 0, err = 0; more && !err; fn++)
                if (!(err = get_cmd(&cfp, addr, fn))) {
                        err = unblock(&bi, rlk(cfp), cfp->fd, (word *)0, (byte **)0, 0) ? RINT : 0;
                        ack_out(addr, fn, (!err) ? ACK : RINT);
                        more = (cfp->ft == POLL_MORE || cfp->ft == SELECT_MORE);
                        rls_net_frame(cfp);
                }
        return(err);
}
```

/* ................................................................................................... */
/* reject a command entry point, just send a reject frame (HACK)
                */
/* ................................................................................................... */

```c
rej_cmd(addr)
 byte *addr;
```

```
{
        ack_out(addr, 0, HACK);
}
```

/* ................................................................ */

/* respond to a select entry point, acknowledge the cmd frame and receive data      */

/* ................................................................ */

```
rcv_msg(addr, cnt, text, flags)
 byte *addr;
 word *cnt;
 byte **text;
 word flags;
{
        ack_out(addr, 0, ACK);
        return(get_msg(addr, cnt, text, flags));
}
```

/* ................................................................ */

/* respond to a poll entry point, acknowledge the cmd frame and transmit data      */

/* ................................................................ */

```
xmt_msg(addr, cnt, text, flags)
 byte *addr;
 word *cnt;
 byte **text;
 word flags;

{
        ack_out(addr, 0, ACK);
        return(put_msg(addr, cnt, text, flags));
}
```

/* ──────────────────────────────────────────────────────────────── */

/* transmit message transfer procedures */

/* returns zero if data was transmitted and accepted successfully, nonzero error status if an error occurred. */

/* ──────────────────────────────────────────────────────────────── */

```c
put_msg(addr, cnt, text, flags)
 byte *addr;
 word *cnt;
 byte **text;
 word flags;
{
        int err;
        word ft, fn, len;
        struct dat_frame_def df;
        struct block_info bi;

bi.txt_num = 0;
        bi.txt_left = (flags & MULTI_BUFF_FLAG) ? *cnt : (word)cnt;
        bi.txt_ptr = (flags & MULTI_BUFF_FLAG) ? *text : (byte *)text;
        for (fn = 1, err = 0; !err && bi.txt_left; ++fn) {
                len = block(&bi, MAX_DATA_LEN, df.fd, cnt, text, flags);
                ft = (bi.txt_left) ? DATA : LAST;
                makedata(&df, addr, fn, ft, len);
                err = put_data(&df, flags);
        }
        return(err);
}
```

/* ──────────────────────────────────────────────────────────────── */

/* block data from user text buffers into buf. block_info structure should be initialized before this call. returns */

/* length of data in buf, which will be the same as size except when we run out of data. */

```
/* ---------------------------------------------------------------------
---------------- */
block(bi, size, buf, cnt, text, flags)
    struct block_info *bi;
    word size;
    byte *buf;
    word *cnt;
    byte **text;
    word flags;
{
        word i, room, delta_i;
        byte *compress_buf, *cb;

for (room = size; bi->txt_left && room;) {
                if (flags & COMPRESS_FLAG) {
                        if (flags & DMA_FLAG) {
                                cb = compress_buf = getmem(2 * size);
                                i = minimum(bi->txt_left, 2 * size);
                                downmem(bi->txt_ptr, compress_buf, i);
                                delta_i = compress(&cb, &buf, &i, &room);
                                bi->txt_left -= delta_i;
                                bi->txt_ptr  += delta_i;
                                rlsmem(compress_buf, 2 * size);
                        }
                        else
                                compress(&bi->txt_ptr, &buf, &bi->txt_left, &room);
                }
                else {
                        i = minimum(bi->txt_left, room);
                        if (flags & DMA_FLAG)
                                downmem(bi->txt_ptr, buf, i);
                        else
                                movmem(bi->txt_ptr, buf, i);
                        room       -= i;
                        buf        += i;
                        bi->txt_left -= i;
                        bi->txt_ptr  += i;
                }
```

```
                if (bi->txt_left && (flags & MULTI_BUFF_FLAG)) {
                        bi->txt_num++;
                        bi->txt_left = *(cnt  + bi->txt_num);
                        bi->txt_ptr  = *(text + bi->txt_num);
                }
        }
        return((int)(size - room));
}
```

/* ............................................................................................
............... */
/* receive message transfer procedures
                                                            */
/* returns zero if data was received and accepted successfully, nonzero error status if an error occurred.
        */
/* ............................................................................................
............... */

```
get_msg(addr, cnt, text, flags)
  byte *addr;
  word *cnt;
  byte **text;
  word flags;
{
        int err;
        word more, fn;
        struct block_info bi;
        struct dat_frame_def *dfp;

bi.txt_num = 0;
        bi.txt_left = (flags & MULTI_BUFF_FLAG) ? *cnt : (word)cnt;
        bi.txt_ptr  = (flags & MULTI_BUFF_FLAG) ? *text : (byte *)text;
        for (more = bi.txt_left, fn = 1, err = 0; more && !err; fn++)
                if (!(err = get_data(&dfp, addr, fn, flags))) {
                        err = unblock(&bi, rl(dfp), dfp->fd, cnt, text, flags) ? RINT : 0;
                        ack_out(addr, fn, (!err) ? ACK : RINT);
```

```
                more = (dfp->ft == DATA);
                rls_net_frame(dfp);
        }
        if (flags & MULTI_BUFF_FLAG)
                while (bi.txt_left) {
                        *(cnt + bi.txt_num) -= bi.txt_left;
                        bi.txt_left = *(cnt + ++bi.txt_num);
                }
        return(err);
}
```

```
/* ------------------------------------------------------------
   --------------- */
/* unblock data from buf into user text buffers. size of buf is in size. returns amount of data left in buf.
        */
/* block_info structure should be initialized before this call.
                        */
/* ------------------------------------------------------------
   --------------- */
unblock(bi, size, buf, cnt, text, flags)
struct block_info *bi;
word size;
byte *buf;
word *cnt;
byte **text;
word flags;
{
        word i, delta_i, left;
        byte *compress_buf, *cb;

for (left = size; bi->txt_left && left; ) {
                if (flags & COMPRESS_FLAG) {
                        if (flags & DMA_FLAG) {
                                cb = compress_buf = getmem(2 * size);
                                i = minimum(bi->txt_left, 2 * size);
                                delta_i = expand(&buf, &cb, &left, &i);
```

```
                        upmem(compress_buf, bi->txt_ptr, delta_i);
                        bi->txt_left -= delta_i;
                        bi->txt_ptr  += delta_i;
                        rlsmem(compress_buf, 2 * size);
                }
                else
                        expand(&buf, &bi->txt_ptr, &left, &bi->txt_left);
        }
        else {
                i = minimum(bi->txt_left, left);
                if (flags & DMA_FLAG)
                        upmem(buf, bi->txt_ptr, i);
                else
                        movmem(buf, bi->txt_ptr, i);
                left         -= i;
                buf          += i;
                bi->txt_left -= i;
                bi->txt_ptr  += i;
        }
        if (!bi->txt_left && (flags & MULTI_BUFF_FLAG)) {
                bi->txt_num++;
                bi->txt_left = *(cnt  + bi->txt_num);
                bi->txt_ptr  = *(text + bi->txt_num);
        }
    }
    return((int)left);
}

/* ......................................................................................
................ */
/* transmit a command frame
                                */
/* returns zero if the command was transmitted and accepted successfully, nonzero error status if an error
occured. */
/* ......................................................................................
................ */
```

```
put_cmd(cfp)
 struct cmd_frame_def *cfp;
{
        int err;
        word try;
        struct ctl_frame_def *infp;

for (try = CMD_MAX_TRIES, infp = NULL_CTL_FPTR; try; rls_net_frame(infp)) {
                xmt_net_frame(cfp);
                rtv_net_frame(cfp);
                while ((infp = rcv_ctl_frame(CMD_TOUT_TIME)) && infp->fn != cfp->fn)
                        rls_net_frame(infp);
                if (!infp)
                        try--, err = TOUT_ERR;
                else if (cmpaddr(infp->src, cfp->dst, sizeof(cfp->dst))) {
                        if (infp->ft != QUACK)
                                ack_out(infp->src, infp->fn, WAK);
                }
                else {
                        switch ((int)(infp->ft)) {
                                case ACK   : try = 0; err = NO_ERROR;         break;
                                case NAK   : try-- ; err = NAK;               break;
                                case QUACK : try = 0; err = QUACK;            break;
                                case HACK  : try = 0; err = HACK;             break;
                                case WAK   : sleep(2 * DAT_TOUT_TIME);        break;
                                default    : try = 0; err = QUACK;
                                             ack_out(infp->src, cfp->fn, QUACK);
                                             break;
                        }
                }
        }
        return(err);
}

/* ----------------------------------------------------------------------------
---------------- */
```

```
/* transmit a data frame
                                */

/* returns zero if the data was transmitted and accepted successfully, nonzero error status if an error occured
                                */
/* ----------------------------------------------------------------------------------------------
---------------   */ put_data(dfp, flags)
 struct dat_frame_def *dfp;
 word flags;

{
        word try;
        int err, tout_time;
        struct ctl_frame_def *infp;

tout_time = (flags & COMPRESS_FLAG) ? 25 * DAT_TOUT_TIME : DAT_TOUT_TIME;
        for (try = DAT_MAX_TRIES, infp = NULL_CTL_FPTR; try; rls_net_frame(infp)) {
                xmt_net_frame(dfp);
                rtv_net_frame(dfp);
                while ((infp = rcv_ctl_frame(tout_time)) && infp->fn != dfp->fn)
                        rls_net_frame(infp);
                if (!infp)
                        try--, err = TOUT_ERR;
                else if (cmpaddr(infp->src, dfp->dst, sizeof(dfp->dst))) {
                        if (infp->ft != QUACK)
                                ack_out(infp->src, infp->fn, WAK);
                }
                else {
                        switch ((int)(infp->ft)) {
                                case NAK   : try-- ; err = NAK;          break;
                                case ACK   : try = 0; err = NO_ERROR;    break;
                                case QUACK : try = 0; err = QUACK;       break;
                                case RINT  : try = 0; err = RINT;        break;
                                default    : try = 0; err = QUACK;
                                        ack_out(infp->src, dfp->fn, QUACK);
                                        break;
                        }
                }
        }
``` return(err);
}

/* ------------------------------------------------------------------------------------------------ */
/* get a command frame                                                       */
/* returns zero if a command was received successfull, else nonzero error status. */
/* ------------------------------------------------------------------------------------------------ */

```
get_cmd(cfpp, src, fn)
 struct cmd_frame_def **cfpp;
 byte *src;
 word fn;
{
        int err;
        word try;
        struct cmd_frame_def *cfp;

for (try = CMD_MAX_TRIES, cfp = NULL_CMD_FPTR; try; rls_net_frame(cfp)) {
                while ((cfp = rcv_cmd_frame(CMD_TOUT_TIME)) && cfp->fn != (fn & FN_MASK))
                        rls_net_frame(cfp);
                if (!fn)
                        movaddr(cfp->src, src, sizeof(cfp->src));
                if (!cfp)
                        try--, err = TOUT_ERR;
                else if (cmpaddr(src, cfp->src, sizeof(cfp->src))) {
                        if (cfp->ft != QUACK)
                                ack_out(cfp->src, cfp->fn, WAK);
                }
                else if (cfp->err) {
                        ack_out(src, fn, NAK);
                        try--, err = NAK;
                }
                else if (cfp->ft == POLL   || cfp->ft == POLL_MORE
```

```
                        || cfp->ft == SELECT || cfp->ft == SELECT_MORE) {
                            try = err = 0;
                            break;
                        }
                    else {
                            ack_out(src, cfp->fn, QUACK);
                            try = 0, err = QUACK;
                        }
                }
            *cfpp = cfp;
            return(err);
}
```

/* ................................................................................................
................ */

/* get a data frame
                                    */

/* wait with timeout for a data frame from src with frame number fn. if we receive a data frame successfully, the caller*/

/* must ack it.    returns a pointer to a data frame if received successfully. if an error was encountered returns a null   */
/* pointer.
                                    */
/* ................................................................................................
................ */

```
get_data(dfpp, src, fn, flags)
 struct dat_frame_def **dfpp;
byte *src;
word fn;
word flags;
{
        word try;
        int err, tout_time;
        struct dat_frame_def *dfp;

tout_time = (flags & COMPRESS_FLAG) ? 25 * DAT_TOUT_TIME : DAT_TOUT_TIME;
```

```
        for (try = DAT_MAX_TRIES, dfp = NULL_DAT_FPTR; try; rls_net_frame(dfp)) {
                while ((dfp = rcv_dat_frame(tout_time)) && dfp->fn != (fn & FN_MASK))
                        rls_net_frame(dfp);
                if (!dfp)
                        try--, err = TOUT_ERR;
                else if (cmpaddr(src, dfp->src, sizeof(dfp->src))) {
                        if (dfp->ft != QUACK)
                                ack_out(dfp->src, dfp->fn, WAK);
                }
                else if (dfp->err) {
                        ack_out(src, fn, NAK);
                        try--, err = NAK;
                }
                else if (dfp->ft == DATA || dfp->ft == LAST) {
                        try = err = 0;
                        break;
                }
                else {
                        ack_out(src, dfp->fn, QUACK);
                        try = 0, err = QUACK;
                }
        }
        *dfpp = dfp;
        return(err);
}

/* ---------------------------------------------------------------------------------
---------------- */
/* make a data frame                                            */
/* ---------------------------------------------------------------------------------
---------------- */
makedata(fp, addr, fn, ft, len)
 struct dat_frame_def *fp;
byte *addr;
word fn, ft, len;
{
```

```
        fp->fn = fn;
        fp->ft = ft;
        fp->err = 0;
        init_data(fp);
        movaddr(addr, fp->dst, sizeof(fp->dst));
        if (wpl(fp, wll(fp, len) + DAT_HDR_BYTES) < MIN_PHYS_LEN) {
                setmem(fp->fd + len, MIN_PHYS_LEN - rpl(fp), 0);
                wpl(fp, MIN_PHYS_LEN);
        }
}
```

/* ........................................................................................................
   ................ */

/* make a command frame
                                           */

/* ........................................................................................................
   ................ */

```
makecmd(fp, addr, fn, ft, len)
 struct cmd_frame_def *fp;
 byte *addr;
 word fn, ft, len;
{
        fp->fn = fn;
        fp->ft = ft;
        fp->err = 0;
        init_cmd(fp);
        movaddr(addr, fp->dst, sizeof(fp->dst));
        if (wpl(fp, wll(fp, len) + CMD_HDR_BYTES) < MIN_PHYS_LEN) {
                setmem(fp->fd + len, MIN_PHYS_LEN - rpl(fp), 0);
                wpl(fp, MIN_PHYS_LEN);
        }
}
```

/* ........................................................................................................
   ................ */

```c
/* make and send an acknowlegment frame                                          */
/* ---------------------------------------------------------------------------
   ---------------- */
ack_out(addr, fn, ft)
 byte *addr;
 word fn, ft;
{
        struct ctl_frame_def af;

af.fn = fn;
        af.ft = ft;
        af.err = 0;
        init_ctl(&af);
        movaddr(addr, af.dst, sizeof(af.dst));
        setmem(af.fd, MIN_PHYS_LEN - CTL_HDR_BYTES, 0);
        wll(&af, 0);
        wpl(&af, MIN_PHYS_LEN);
        xmt_net_frame(&af);
        rtv_net_frame(&af);
}

/* ---------------------------------------------------------------------------
   ---------------- */
/* compress bytes (maximum of *sn) from *s into buffer *d whose size is *dn. returns number of bytes advanced
   in *s.   */
/* ---------------------------------------------------------------------------
   ---------------- */
compress(s, d, sn, dn)
word s, d;
word *sn, *dn;
{
        word c, i, sn0;

sn0 = *sn;
        *sn >>= 1;
        *dn >>= 1;
```

```c
while (*sn && *dn) {
    if (*sn >= 3 && *dn >= 3 && **s == *(*s + 1) && **s == *(*s + 2)) {
        for (c = **s, *s += 3, *sn -= 3, *dn -= 3, i = 3; *sn && *dn && **s == c; ++*s, ++i, --*sn)
            ;
        *(*d)++ = ESCAPE;
        *(*d)++ = i;
        *(*d)++ = c;
    }
    else if (s == ESCAPE || s == FILLER) {
        if (*dn >= 3) {
            *dn -= 3;
            *(*d)++ = ESCAPE;
            if (*sn >= 2 && **s == *(*s + 1)) {
                *(*d)++ = 2;
                *(*d)++ = **s;
                *s += 2;
                *sn -= 2;
            }
            else {
                *(*d)++ = 1;
                *(*d)++ = *(*s)++;
                --*sn;
            }
        }
        else {
            while (dn) {
                *(*d)++ = FILLER;
                --*dn;
            }
        }
    }
    else {
        *(*d)++ = *(*s)++;
        --*dn;
        --*sn;
    }
```

```
            }
            *sn <<= 1;
            *dn <<= 1;
            return((int)(sn0 - *sn));
    }

/* ................................................................................
   ................  */
/* uncompress (maximum of *sn) bytes from *s to (maximum bytes of *dn in) *d. returns advancment in *d.
    */
/* ................................................................................
   ................  */
expand(s, d, sn, dn)
 word s, d;
word *sn, *dn;
{
        word *i, c, dn0;

dn0 = *dn;
        *sn >>= 1;
        *dn >>= 1;
        while (*sn && *dn) {
                if ((**s) == ESCAPE) {
                        ++*s;
                        i = (*s)++;
                        c = *(*s)++;
                        *sn -= 3;
                        while (*i && *dn) {
                                *(*d)++ = c;
                                --*dn;
                                --*i;
                        }
                        if (*i) {
                                *s -= 3;
                                *sn += 3;
                        }
                }
```

```
        else if (**s == FILLER) {
                ++*s;
                --*sn;
        }
        else {
                *(*d)++ = *(*s)++;
                --*sn;
                --*dn;
        }
    }
    *sn <<= 1;
    *dn <<= 1;
    return((int)(dn0 - *dn));
} t

/*title*/
/* comm.h -- communications header 2.00 (c) 1987 Pertron Controls */

/* ---------------------------------------------------------------- */
/* define the comm command id's (s for selects, p for polls)        */
/* ---------------------------------------------------------------- */
define CH_VER_NUM    0x0002  /* comm. header version number              */
define MAX_CMD_LEN   1360    /* maximum length of any command, ever      */
define SELECT        0x8000  /* bit defined for select                   */
define ATT_CTRL_CMD  0x0001  /* p attach command                         */
define DET_CTRL_CMD  0x8002  /* s detach command                         */
define INS_CODE_CMD  0x8003  /* s insert downloaded code command         */
define DEL_CODE_CMD  0x8004  /* s delete downloaded code command         */
define CLR_CODE_CMD  0x8005  /* s clear downloaded code command          */
define LST_CODE_CMD  0x0006  /* p upload downloaded code status          */
define TEX_INIT_CMD  0x8007  /* s restart task executive command         */
define TEX_STAT_CMD  0x0008  /* p upload task executive status           */
define RNG_LINK_CMD  0x8009  /* s download and link rung command         */
define RNG_UPLD_CMD  0x000a  /* p upload rung command                    */
```

```c
define DTB_UPLD_CMD        0x000b  /* p upload data table values command     */
define DTB_DNLD_CMD        0x800c  /* s download data table values command*/
define DTU_BLCK_CMD        0x000d  /* p upload data table block command  */
define DTD_BLCK_CMD        0x800e  /* s download data table block command    */
define TST_SELF_CMD 0x800f  /* s execute self test command             */
define UPL_NAME_CMD        0x0010  /* p upload file name command (beta test) */
define DNL_NAME_CMD        0x8011  /* s download file name command (beta test) */

/* ------------------------------------------------------------- */
/* define attach command equipment flag bits. these defines correspond  */
/* to the definitions in the plc bios header.                      */
/* ------------------------------------------------------------- */
define ATT_EQ_PRO_LANCE    0x0001  /* programming network present    */
define ATT_EQ_RIO_LANCE    0x0002  /* remote i/o network present     */
define ATT_EQ_REAL_TIME_CLK    0x0004  /* real time clock present flag    */
define         ATT_EQ_LOGIC_CO_PROC    0x0008  /* logic co-processor present    */
define ATT_EQ_SMARTS       0x0010  /* downloaded code present flag   */

/* ------------------------------------------------------------- */
/* define the plcnet interface                              */
/* ------------------------------------------------------------- */ define DMA_FLAG        0x0001  /* data must be dma'ed to/from plcnet    */
define COMPRESS_FLAG   0x0002  /* data will be compressed/expanded */
define MULTI_BUFF_FLAG 0x0004  /* multiple buffer are passed.          */

/* ------------------------------------------------------------- */
/* macro definitions                                        */
/* ------------------------------------------------------------- */
define swap_lword(n)   (((n >> 16) & 0x0000ffffL) | ((n << 16) & 0xffff0000L))

/* ------------------------------------------------------------- */
/* define the various commands that make up the comm protocol    */
/* note: we are only defining the commands here, not the data content.  */
/* ------------------------------------------------------------- */
```

```c
struct av_def {              /* -- address and value table entry -- */
    word address;            /* this is a sub-structure of the      */
    word value;              /* read and write data table commands  */
};                           /* and read data table response        */ struct att_ctrl_cmd {        /* -------- attach command --------- */
    word cmd_id;             /* command identification            */
    word sw_version;         /* software version number           */
    word ch_version;         /* communication header version number */
    struct rtc_def today;    /* todays date and time              */
};

struct att_ctrl_rsp {        /* ----- attach command response ---- */
    word fw_version;         /* firmware version number           */
    word ch_version;         /* communication header version number */
    lword equipment;         /* equipment flag                    */
    lword main_ram_words;    /* total main ram space              */
    lword main_ram_free;     /* unused main ram space             */
    lword ctrl_str_words;    /* total control store space         */
    lword ctrl_str_free;     /* unused control store space        */
    lword data_tbl_words;    /* total operand store space         */
    lword data_tbl_free;     /* unused operand store space        */
    struct rtc_def lst_att;  /* date and time of last attachment  */
    struct rtc_def lst_mod;  /* date and time of last modification */
};

struct det_ctrl_cmd {        /* -------- detach command --------- */
    word cmd_id;             /* command identification            */
};                           /* no data portion                   */ struct ins_code_hdr {        /* -- raw (uninserted) code header -- */
    char name[16];           /* id and version of downloaded code */
    word check_sum;          /* check sum of code space           */
    word num_entry_pts;      /* number of entry points            */
    word cb_spare;           /* spare word for motorola linker    */
    word code_bytes;         /* bytes in code space               */
    word sb_spare;           /* spare word for motorola linker    */
```

```c
    word static_bytes;      /* bytes in code and static data space */
    word tb_spare;          /* spare word for motorola linker     */
    word total_bytes;       /* total number of bytes for module   */
};

struct ins_code_cmd {                /* -- insert download code command --   */
    word cmd_id;                     /* command identification               */
    struct ins_code_hdr hdr;         /* raw code header as defined above     */
};                                   /* data is just binary code             */ struct del_code_cmd {                /* -- delete download code command --   */
    word cmd_id;                     /* command identification               */
    char name[16];                   /* id and version of downloaded code    */
};                                   /* no data portion                      */ struct clr_code_cmd {                /* -- clear download code command --    */
    word cmd_id;                     /* command identification               */
};                                   /* no data portion                      */ struct lst_code_cmd {                /* -- list download code command --     */
    word cmd_id;                     /* command identification               */
    word max_code_hdrs;              /* maximum number of code headers       */
};

struct lst_code_rsp {                /* -- list download code response --    */
    char name[16];                   /* id and version of downloaded code    */
    word check_sum;                  /* check sum of code space              */
    word num_entry_pts;              /* number of entry points               */
    word code_words;                 /* number of words of code space        */
    word static_words;               /* number of words of static space      */
    word data_words;                 /* number of words of non-static data   */
    word total_words;                /* number of words for entire module    */
    word *code_addr;                 /* address of code space                */
};                                   /* (rsp is actually an array of these)  */ struct tex_init_cmd {                /* ----- task exec init command -----   */
    word cmd_id;                     /* command identification               */
    word number_of_tasks;            /* maximum number of code headers       */
```

```c
};                              /* data is task info table        */ struct tex_stat_cmd {           /* ---- task exec stat command ---- */
        word cmd_id;            /* command identification          */
};                              /* data is task info table         */ struct rng_link_cmd {           /* -------- link rung command -------- */
        word cmd_id;            /* command identification           */
        hword last_serial;      /* serial number of previous rung   */
        hword this_serial;      /* serial number for this rung      */
        hword next_serial;      /* serial number of next rung       */
        word source_bytes;      /* length of source code in link_data */
        word object_bytes;      /* length of object code in link_data */
        word reloc_bytes;       /* length of reloc table in link_data */
        word scan_ok;           /* ok to scan (compiler que empty) flag */
};                              /* data portion is src, obj then rel */ struct rng_upld_cmd {           /* ------ upload rung command ------ */
        word cmd_id;            /* command identification           */
        word first_rung;        /* flag gimme first (zero = next) rung */
};

struct rng_upld_rsp {           /* ------ upload rung response ------ */
        word source_bytes;      /* bytes of rung                    */
        long serial_number;     /* serial number of rung            */
};                              /* followed by lots of source code  */ struct beg_scan_cmd {           /* ------ start scanner command ------ */
        word cmd_id;            /* command identification           */
};                              /* no data portion                  */ struct dtb_upld_cmd {           /* ----- read data table command ----- */
        word cmd_id;            /* command identification           */
        word num;               /* number of data table words requested */
        struct av_def av[256];  /* addresses for whom we need values */
};                              /* response is an av_def array      */
```

```c
struct dtb_dnld_cmd {           /* ---- write data table command ---- */
        word cmd_id;            /* command identification        */
        word num;               /* number of address & value pairs */
};                              /* data portion is an av_def array */ struct dtu_blck_cmd {           /* -- read data table block command -- */
        word cmd_id;            /* command identification        */
        word word_cnt;          /* number of dt words requested   */
        word start_at;          /* word offset into data table    */
};                              /* response is lots of words      */ struct dtd_blck_cmd {           /* -- write data table block command -- */
        word cmd_id;            /* command identification        */
        word word_cnt;          /* number of dt words being sent  */
        word start_at;          /* word offset into data table    */
};                              /* data portion is lots of words  */
struct tst_self_cmd {           /* ----- self test command ------- */
        word cmd_id;            /* command identification        */
};                              /* data portion is null           */ struct upl_name_cmd {           /* ----- upload name command ------ */  /* beta test */
        word cmd_id;            /* command identification        */
};                              /* data portion is filename (64 bytes) */ struct dnl_name_cmd {           /* ----- download name command ----  */  /* beta test */
        word cmd_id;            /* command identification        */
};                              /* data portion is filename (64 bytes) */
/*title*/
/* commtask.c -- the real thing for the plc     */ include "plcbios.h"
include "comm.h"
undef handle_to_vec define first_entry(ed)     ((struct phys_entry_def **)virt_vector_tbl)[ed->vector_number]
define is_chained(ed,vn)   (ed->branch_always == BRA && ed->vector_number == vn)
define release_handle(vn)  (virt_handle_tbl[vn] = 0)
```

```
/* -------------------------------------------------------------- */
/* comm_task. the rom resident comm_task simply waits for a command and sends */
/* it to the cmd_handler.                                          */
/* -------------------------------------------------------------- */
dflt_comm_task()
{
    word len;
    word src[3], cmd[MAX_CMD_LEN/2];
    extern word pertron_base_addr[];

code_chain ? set_misc_out(LED_MEMORY) : clr_misc_out(LED_MEMORY);
    movwords(pertron_base_addr, prolan.physical_addr, wordsof(prolan.physical_addr));
    prolan.physical_addr[0] += PRO_BASE_ADDR + ((misc_in & DIPSWITCH) << 1);
    setwords(prolan.logical_filter, wordsof(prolan.logical_filter), 0);
    prolan.rcv.buffer_bytes = bytesof(struct frame_def);
    prolan.rcv.ring_entries = 4;
    prolan.xmt.ring_entries = 2;
    init_lance(&prolan);
    start_lance(&prolan, 0, 0);

for (;;)
        if (rcv_cmd(src, cmd, &len) == NO_ERROR
        || rcv_cmd(src, cmd, &len) == NO_ERROR
        || rcv_cmd(src, cmd, &len) == NO_ERROR) {
            cmd_handler(src, cmd, len);
            if (*cmd & SELECT)
                read_rtc(&last_modified);
        }
        else
            attached = FALSE;
}

/* -------------------------------------------------------------- */
/* cmd_handler. the default command handler handles the attach/detach commands,*/
/* remote management of the downloaded code chain, and the task executive.  */
/* -------------------------------------------------------------- */
```

```
dflt_cmd_handler(src, cmd, len)
byte *src;
word *cmd;
word len;
{
        if (!attached || cmpwords(src, our_owner, 3) == NO_DIFF)
                switch (*cmd) {
                        case ATT_CTRL_CMD: return(attach(src, cmd));
                        case DET_CTRL_CMD: return(detach(src, cmd));
                        case CLR_CODE_CMD: return(clr_code(src, cmd));
                        case INS_CODE_CMD: return(ins_code(src, cmd));
                        case LST_CODE_CMD: return(lst_code(src, cmd));
                        case DEL_CODE_CMD: return(del_code(src, cmd));
                        case TEX_INIT_CMD: return(taskexec_init(src, cmd));
                        case TEX_STAT_CMD: return(taskexec_stat(src, cmd));
                }
        return(rej_cmd(src));
}

/* -------------------------------------------------------------------- */
/* attach command. establish the originator of this command as our owner  */
/* -------------------------------------------------------------------- */
attach(src, ac)
byte *src;
 struct att_ctrl_cmd *ac;
{
        struct att_ctrl_rsp ar;

attached = TRUE;
        movwords(src, our_owner, 3);
        swapwords(&last_attached, &ar.lst_att, wordsof(struct rtc_def));
        swapwords(&last_modified, &ar.lst_mod, wordsof(struct rtc_def));
        swapwords(&ac->today,    &last_attached, wordsof(struct rtc_def));
        write_rtc(&last_attached);
        ar.fw_version = FW_VER_NUM;
        ar.ch_version = CH_VER_NUM;
        ar.equipment = swap_lword(equip_flag);
```

```
        ar.main_ram_words = swap_lword(4*ram_quads);
        ar.main_ram_free  = swap_lword(4*quadsleft(ram_pool));
        ar.ctrl_str_words = swap_lword(4*ctrl_str_quads);
        ar.ctrl_str_free  = ctrl_str_quads ? swap_lword(4*quadsleft(ctrl_str_pool)) : 0;
        ar.data_tbl_words = swap_lword(4*op_str_quads);
        ar.data_tbl_free  = swap_lword(4*op_str_quads);
        xmt_msg(src, bytesof(ar), &ar, 0);
}

/* ---------------------------------------------------------------- */
/* detach command. free us from our owner.                          */
/* ---------------------------------------------------------------- */
detach(src, dc)
 byte *src;
 struct det_ctrl_cmd *dc;
{
        attached = FALSE;
        rcv_msg(src, 0, 0, 0);
}

/* ---------------------------------------------------------------- */
/* insert a multiply vectored chunk of code into the code chain. each vector is */
/* linked into it's associated chain of vector entries. vector number zero is   */
/* executed.                                                                    */
/* ---------------------------------------------------------------- */
ins_code(src, ic)
 byte *src;
 struct ins_code_cmd *ic;
{
        word word_cnt;
        struct code_hdr *new_code;
        struct phys_entry_def *ed;

fetch(CODE_CHAIN, 0);
        word_cnt = ic->hdr.total_bytes >> 1;
        if (new_code = (struct code_hdr *)get_non_volatile_words(word_cnt)) {
                if (rcv_msg(src, ic->hdr.code_bytes-bytesof(struct code_hdr), new_code + 1, 0) ==
```

```
NO_ERROR) {
                movwords(ic->hdr.name, new_code->name, wordsof(new_code->name));
                new_code->num_entry_pts = ic->hdr.num_entry_pts;
                new_code->code_words = ic->hdr.code_bytes >> 1;
                new_code->data_offset = ic->hdr.static_bytes >> 1;
                new_code->data_words = (ic->hdr.total_bytes - ic->hdr.static_bytes) >> 1;
                new_code->total_words = word_cnt;
                ed = (struct phys_entry_def *)(new_code + 1);
                for (;ic->hdr.num_entry_pts-- ; ed++) {
                        ed->branch_always = BRA;
                        ed->offset -= byte_offset(&ed->offset, new_code);
                        ed->vector_number = handle_to_vec(((struct entry_def *)ed)->vector_handle);

if (ed->vector_number == CONSTRUCTOR)
                                execute(ed)();
                        else if (ed->vector_number != DESTRUCTOR)
                                link_a_vector(ed);
                }
                new_code->next_code = code_chain;
                new_code->check_sum -= sumwords(new_code, new_code->code_words);
                virt_vec_chk_sum -= sumwords(virt_vector_tbl, 2*VEC_TBL_WORDS);
                code_chain = new_code;
                equip_flag |= EQ_SMARTS;
        }
        else
                rls_non_volatile_words(new_code, word_cnt);
    }
    else
        rej_cmd(src);
    release(CODE_CHAIN);
}

/* ---------------------------------------------------------------- */
/* del_code. delete a chunk of code from the code chain. the code is   */
/* identified by it's id and version number.                           */
/* ---------------------------------------------------------------- */
```

```
del_code(src, dc)
byte *src;
struct del_code_cmd *dc;
{
        struct code_hdr *ch, *lh;

fetch(CODE_CHAIN, 0);
        for (lh = NULL, ch = code_chain; ch; lh = ch, ch = ch->next_code)
                if (cmpwords(dc->name, ch->name, wordsof(dc->name)) == NO_DIFF) {
                        if (lh) {
                                lh->next_code = ch->next_code;
                                lh->check_sum -= sumwords(ch, ch->code_words);
                        }
                        else
                                code_chain = ch->next_code;
                        unlink_all_vectors(ch);
                        virt_vec_chk_sum -= sumwords(virt_vector_tbl, 2*VEC_TBL_WORDS);
                        break;
                }
        (ch) ? rcv_msg(src, 0, 0, 0) : rej_cmd(src);
        if (!code_chain)
                equip_flag &= ~EQ_SMARTS;
        release(CODE_CHAIN);
}
/* -------------------------------------------------------------------- */
/* clear the downloaded code chain. unlinks all the vectors of all the  */
/* downloaded code modules, and executes the destructor routine before  */
/* releasing the downloaded code memory.                                */
/* -------------------------------------------------------------------- */
clr_code(src, cc)
byte *src;
struct clr_code_cmd *cc;
{
        struct code_hdr *nh;

fetch(CODE_CHAIN, 0);
        for (; (nh = code_chain->next_code), code_chain; code_chain = nh)
```

```
        unlink_all_vectors(code_chain);
        virt_vec_chk_sum -= sumwords(virt_vector_tbl, 2*VEC_TBL_WORDS);
        rcv_msg(src, 0, 0, 0);
        release(CODE_CHAIN);
}
```

```
/* -------------------------------------------------------------------- */
/* lst_code.  send code chain status.   status consists of all code id's and   */
/* version numbers followed by an id and version number of all zero's          */
/* -------------------------------------------------------------------- */
lst_code(src, sc)
 byte *src;
 struct lst_code_cmd *sc;
{
        int word_cnt;
        struct code_hdr *ch;
        struct lst_code_rsp *code_list, *cs;

fetch(CODE_CHAIN, 0);
        word_cnt = sc->max_code_hdrs * wordsof(struct lst_code_rsp);
        if (code_list = (struct lst_code_rsp *)get_volatile_words(word_cnt)) {
                for (ch = code_chain, cs = code_list; --sc->max_code_hdrs > 0 ; ch = ch->next_code, cs++) {
                        movwords(ch, cs, wordsof(struct lst_code_rsp));
                        cs->code_addr = (word *)ch;
                }
                if (sc->max_code_hdrs > 0)
                        setwords(cs, wordsof(struct lst_code_rsp), 0);
                xmt_msg(src, word_cnt << 1, code_list, 0);
                rls_volatile_words(code_list);
        }
        else
                rej_cmd(src);
        release(CODE_CHAIN);
}
```

```
/* -------------------------------------------------------------------- */
/* re-initialize the task executive.                                           */
/* -------------------------------------------------------------------- */
```

```
taskexec_init(src, ti)
byte *src;
struct tex_init_cmd *ti;
{
        struct task_info_def *tip;
        int word_cnt;

word_cnt = (ti->number_of_tasks + 1)*wordsof(struct task_info_def);
        if (tip = get_non_volatile_words(word_cnt)) {
                if (rcv_msg(src, word_cnt << 1, tip, 0) == NO_ERROR) {
                        rls_non_volatile_words(task_info_tbl, (num_tasks() + 1)*wordsof(struct
task_info_def));
                        for (task_info_tbl = tip; ti->number_of_tasks--; ++tip)
                                tip->entry_pt = virt_vector_tbl[handle_to_vec(((struct
task_handle_def *)tip)->handle)];
                        warm_boot(task_info_tbl);
                }
                else
                        rls_non_volatile_words(tip, word_cnt);
        }
        else
                rej_cmd(src);
}

/* -------------------------------------------------------------------- */
/* upload the current task info table.                                  */
/* -------------------------------------------------------------------- */
taskexec_stat(src, ts)
 byte *src;
 struct tex_stat_cmd *ts;
{
        xmt_msg(src, (num_tasks() + 1)*bytesof(struct task_info_def), task_info_tbl, 0);
}

/* -------------------------------------------------------------------- */
/* link a vector into an entry def chain.                               */
/* -------------------------------------------------------------------- */
```

```c
link_a_vector(ed)
 struct phys_entry_def *ed;
{
        struct phys_entry_def *t;

dis_int();
        t = first_entry(ed);
        first_entry(ed) = ed;
        ed->last_entry_pt = NULL;
        ed->next_entry_pt = t;
        if (is_chained(t, ed->vector_number))
                t->last_entry_pt = ed;
        ed->check_sum = sumwords(ed, wordsof(struct entry_def));
        enb_int();
}

/* ---------------------------------------------------------------- */
/* unlink all the vectors of a hunk of code, and release the memory occupied */
/* by that code. the destructor routine is executed if it exists.            */
/* ---------------------------------------------------------------- */
unlink_all_vectors(ch)
 struct code_hdr *ch;
{
        int cnt;
        struct phys_entry_def *ed;

dis_int();
        ed = (struct phys_entry_def *)(ch + 1);
        for (cnt = ch->num_entry_pts; cnt--; ed++)
                if (ed->vector_number == DESTRUCTOR)
                        execute(ed)();
                else if (ed->vector_number != CONSTRUCTOR)
                        unlink_a_vector(ed);
        enb_int();
        rls_non_volatile_words(ch, ch->total_words);
}
```

```c
/* -------------------------------------------------------------- */
/* unlink one vector from an entry def chain                      */
/* -------------------------------------------------------------- */
unlink_a_vector(ed)
 struct phys_entry_def *ed;
{
        extern void unassigned_vec();

if (ed->last_entry_pt) {
                ed->last_entry_pt->next_entry_pt = ed->next_entry_pt;
                ed->last_entry_pt->check_sum -= sumwords(ed->last_entry_pt, wordsof(struct entry_def));
        }
        else
                first_entry(ed) = ed->next_entry_pt;
        if (is_chained(ed->next_entry_pt, ed->vector_number)) {
                ed->next_entry_pt->last_entry_pt = ed->last_entry_pt;
                ed->next_entry_pt->check_sum -= sumwords(ed->next_entry_pt, wordsof(struct entry_def));
        }
        if (first_entry(ed) == (struct phys_entry_def *)unassigned_vec)
                release_handle(ed->vector_number);
}

/* -------------------------------------------------------------- */
/* convert a virtual vector handle to vector number. If the handle is less */
/* 256 it is assumed to be an absolute vector number. If the handle is not */
/* found in the table, a free vector is found and assigned.        */
/* -------------------------------------------------------------- */
static char construct_handle[] = "init";
static char destruct_handle[] = "kill";

handle_to_vec(handle)
 hword *handle;
{
        hword *h, n;
```

```c
        if (*handle == *(lword *)construct_handle)
                n = CONSTRUCTOR;
        else if (*handle == *(lword *)destruct_handle)
                n = DESTRUCTOR;
        else if (*handle > 255) {
                for (h = virt_handle_tbl, n = 0; n < 256 && *h != *handle; ++n, ++h)
                        ;
                if (n == 256) {
                        while (--n > 0 && *--h != 0)
                                ;
                        *h = *handle;
                }
        }
        else
                n = *handle;
        return(n);
}
```

/*title*/
/* auxcmd.c - plc auxiliary command handler (c) 1986 Pertron Controls */ include "plcbios.h"
include "plcdnl.h"
include "comm.h"
include "target.h"

define data_tbl_mask()        (4*op_str_quads - 1)

/* ========================== global data area ========================== */

| | |
|---|---|
| extern struct tbl_ptr_list operating; | /* operating image table pointer list */ |
| extern struct rung_def *very_first_rung; | /* start of linked list of rungs */ |
| extern struct rung_def *very_last_rung; | /* end of linked list of rungs */ |
| extern struct rung_def *upload_rung; | /* pointer to next rung to be uploaded */ |
| extern word source_checksum; | /* check sum of all ladder source code */ |
| extern char filename[]; | /* filename associated with this ladder */ |
| extern char test_handle[]; | /* handle for self test vector */ |
| extern char force_label[]; | /* 'I/O FORCING RUNG' spelled sideways */ |
| extern struct entry_def plc_entry_pts[]; | |
| extern struct task_info_def self_test_info_tbl[]; | |

/* ═══════════════════════════════════ code area ═══════════════════════════════════ */

```c
aux_cmd_handler(src, cmd, len)
 byte *src;
 word *cmd;
 word len;
{
        if (attached && cmpwords(src, our_owner, 3) == NO_DIFF)
                switch (*cmd) {
                        case RNG_LINK_CMD: return(link_rung(src, cmd));
                        case RNG_UPLD_CMD: return(rung_upld(src, cmd));
                        case DTB_UPLD_CMD: return(read_data_tbl(src, cmd));
                        case DTB_DNLD_CMD: return(write_data_tbl(src, cmd));
                        case DTU_BLCK_CMD: return(block_read_data_tbl(src, cmd));
                        case DTD_BLCK_CMD: return(block_write_data_tbl(src, cmd));
                        case TST_SELF_CMD: return(run_self_test(src,cmd));
                        case UPL_NAME_CMD: return(upload_filename(src, cmd));
                        case DNL_NAME_CMD: return(download_filename(src, cmd));
                        case DET_CTRL_CMD: remove_forces();
                                        break;
                }
        else if (!attached && *cmd == ATT_CTRL_CMD)
                remove_forces();
        return(execute(plc_entry_pts[ETI_AUXCOMMAND].next_entry_pt)(src, cmd, len));
}
```

/*..................................................................................*/

/* remove forces. remove all i/o forcing rungs. called whenever someone detaches or attaches (in case some one  */
/* disconnected without detaching.)
      */
/*..................................................................................*/

```c
remove_forces()
{
        struct rung_def *r, *nr, *b4r, *unlink_rung();
```

```
fetch_scanner();
r = very_first_rung->next_rung;
if (r->source_words == 16 && cmpwords(force_label, r + 1, 8) == NO_DIFF)
        unlink_rung(very_first_rung->serial_number, r->next_rung->serial_number);
for (b4r = r = nr = very_first_rung; nr && nr != very_last_rung; b4r = r, r = nr, nr = nr->next_rung)
        ;
if (r->source_words == 16 && cmpwords(force_label, r + 1, 8) == NO_DIFF)
        unlink_rung(b4r->serial_number, very_last_rung->serial_number);
release_scanner();
}
```

/*-------------------------------------------------------------------------------
------- */
/* find a rung with a given serial number. start serching at the passed rung.            */
/* returns null if desired rung cannot be found. the caller of this routine should own the logic scanner resource    */
/*-------------------------------------------------------------------------------
------- */

```
struct rung_def *find_rung(r, s)
 struct rung_def *r;
lword s;
{
        while (r && r->serial_number != s)
                r = r->next_rung;
        return(r);
}
```

/*-------------------------------------------------------------------------------
------- */
/* find the next rung that contains object code and return a pointer thereto.
 */
/* the caller of this routine should own the logic scanner resource.
 */
/*-------------------------------------------------------------------------------
------- */

```
struct rung_def *find_next_code(r)
 struct rung_def *r;
{
        for (r = r->next_rung; r && r != very_last_rung && !r->object_size; r = r->next_rung)
                ;
        return(r);
}
```

/*----------------------------------------------------------------------------
-------- */
/* find the last rung that contains object code and return a pointer to it's rung definition structure.
        */
/* the caller of this routine should own the logic scanner resource.
        */
/*----------------------------------------------------------------------------
-------- */

```
struct rung_def *find_last_code(before_this_rung)
 struct rung_def *before_this_rung;
{
        struct rung_def *r, *last_rung_with_code;

for (r = last_rung_with_code = very_first_rung; r && r != before_this_rung; r = r->next_rung)
                if (r->object_size)
                        last_rung_with_code = r;
        return(last_rung_with_code);
}
```

/* ------------------------------------------------------------------------ */
/* upload rung to programmer task (poll)                                    */
/* ------------------------------------------------------------------------ */
```
rung_upld(src, cmd)
 byte *src;
 struct mg_upld_cmd *cmd;
{
        byte *buff[3];
```

```
        word count[3];
        hword serial, ialser;
        struct rng_upld_rsp rur;
        struct rung_def *r, *find_rung();

fetch_scanner();
        if (cmd->first_rung) {
                for (r = very_first_rung->next_rung, serial = 1; r != very_last_rung; r = r->next_rung, serial++) {
                        ialser = swap_hword(serial);
                        update_src_long(r->serial_number, ialser);
                }
                upload_rung = very_first_rung->next_rung;
        }
        else
                upload_rung = upload_rung->next_rung;
        buff[0] = (byte *)&rur;
        buff[1] = (byte *)(upload_rung + 1);
        buff[2] = (byte *)0;
        count[0] = bytesof(struct rng_upld_rsp);
        count[1] = rur.source_bytes = (upload_rung->source_words - wordsof(struct rung_def)) << 1;
        count[2] = 0;
        rur.serial_number = upload_rung->serial_number;
        xmt_msg(src, count, buff, MULTI_BUFF_FLAG);
        release_scanner();
}

/* -------------------------------------------------------------------------- */
/* read data table values task (poll)                                         */
/* -------------------------------------------------------------------------- */
read_data_tbl(src, cmd)
 byte *src;
 struct dtb_upld_cmd *cmd;
{
        int n;
        struct av_def dtb_upld_rsp[256], *cav, *rav;

fetch_scanner();
```

```c
        for (cav = cmd->av, rav = dtb_upld_rsp, n = cmd->num; n--; cav++, rav++)
                rav->value = operating_base[rav->address = cav->address & data_tbl_mask()];
        release_scanner();
        xmt_msg(src, cmd->num * bytesof(struct av_def), dtb_upld_rsp, 0);
}

/* -------------------------------------------------------------------------- */
/* write data table values task (select)                                      */
/* -------------------------------------------------------------------------- */
write_data_tbl(src, cmd)
 byte *src;
 struct dtb_dnld_cmd *cmd;
{
        int dirty;
        struct av_def dtb_dnld_data[256], *aav;

if (rcv_msg(src, bytesof(dtb_dnld_data), dtb_dnld_data, 0) == NO_ERROR) {
                fetch_scanner();
                dirty = operating.upper_work_area->plc_stat_word & DIRTY;
                for (aav = dtb_dnld_data; cmd->num--; aav++)
                        operating_base[aav->address & data_tbl_mask()] = aav->value;
                dirty ? (operating.upper_work_area->plc_stat_word |= DIRTY)
                      : (operating.upper_work_area->plc_stat_word &= ~DIRTY);
                release_scanner();
        }
}

/* -------------------------------------------------------------------------- */
/* read data table block (poll)                                               */
/* -------------------------------------------------------------------------- */
block_read_data_tbl(src, cmd)
 byte *src;
 struct dtu_blck_cmd *cmd;
{
        word *buffer;
```

```
        if (buffer = get_volatile_words(cmd->word_cnt)) {
                fetch_scanner();
                movwords(operating_base + (cmd->start_at & data_tbl_mask()), buffer, cmd->word_cnt);
                release_scanner();
                xmt_msg(src, cmd->word_cnt * sizeof(word), buffer, 0);
                rls_volatile_words(buffer);
        }
        else
                rej_cmd(src);
}
```

```
/* -------------------------------------------------------------------------- */
/* write data table block (select)                                            */
/* -------------------------------------------------------------------------- */
block_write_data_tbl(src, cmd)
byte *src;
struct dtd_blck_cmd *cmd;
{
        word *buffer;
        int dirty;

if (buffer = get_volatile_words(cmd->word_cnt)) {
                if (rcv_msg(src, cmd->word_cnt * sizeof(word), buffer, 0) == NO_ERROR) {
                        fetch_scanner();
                        dirty = operating.upper_work_area->plc_stat_word & DIRTY;
                        movwords(buffer, operating_base + (cmd->start_at & data_tbl_mask()), cmd->word_cnt);
                        dirty ? (operating.upper_work_area->plc_stat_word |= DIRTY)
                              : (operating.upper_work_area->plc_stat_word &= ~DIRTY);
                        release_scanner();
                }
                rls_volatile_words(buffer);
        }
        else
                rej_cmd(src);
}
```

```
/* -------------------------------------------------------------------- */
/* run self test (select)  note: plc will halt all activity and not respond to any commands */
/*                         for approximately 15 seconds.                */
/* -------------------------------------------------------------------- */
run_self_test(src, cmd)
 byte *src;
 struct tst_self_cmd *cmd;
{
        rcv_msg(src, 0, 0, 0);
        fetch_scanner();
        warm_boot(self_test_info_tbl);
}

/* -------------------------------------------------------------------- */
/* upload filename command.  upload filename associated with this ladder */
/* -------------------------------------------------------------------- */
upload_filename(src, cmd)
 byte *src;
 struct upl_name_cmd *cmd;
{
        xmt_msg(src, 64, filename, 0);
}

/* -------------------------------------------------------------------- */
/* download filename command.  download filename associated with this ladder */
/* -------------------------------------------------------------------- */
download_filename(src, cmd)
 byte *src;
 struct dnl_name_cmd *cmd;
{
        rcv_msg(src, 64, filename, 0);
}

/* -------------------------------------------------------------------- */
```

```c
/* temporary patch to replace add_blk_xfer routine in rom.  remove after next rom revision.    */
/* ---------------------------------------------------------------------------- */
undef add_blk_xfer struct blk_xfer_def *add_blk_xfer(bx_lst, module_addr, file_ptr, file_size, aux_ptr)
 struct blk_xfer_hdr *bx_lst;
 int module_addr, file_size;
 word *aux_ptr, *file_ptr;
{
        struct blk_xfer_def *bx;

if (!(file_size &= 0x3f))
                file_size = 64;
        if (bx = (struct blk_xfer_def *)get_non_volatile_words(wordsof(struct blk_xfer_def) + (file_ptr ? 0 : file_size))) {
                bx->module_addr = (module_addr ^ 1) - 020;
                bx->file_ptr    = file_ptr ? file_ptr : (bx + 1);
                bx->aux_ptr     = aux_ptr;
                bx->file_size   = file_size;
                bx->enables     = 0;
                bx->next_ref    = bx_lst->first_ref;
                bx_lst->first_ref = bx;
                bx_lst->checksum -= sumwords(bx, 7) + sumwords(&bx, 2) - sumwords(&bx->next_ref, 2);
        }
        return(bx);
}

/* ---------------------------------------------------------------------------- */
/* temporary patch to replace service_blk_xfer routine in rom.  remove after next rom revision.   */
/* ---------------------------------------------------------------------------- */
undef service_blk_xfer service_blk_xfer(slot, ctrl, stat, bx_lst)        /* --- service block transfer request --- */
 byte *slot, *ctrl, *stat;
 struct blk_xfer_hdr *bx_lst;
{
        struct blk_xfer_def *bx;
```

```
word module_addr, count;
byte cs, *fp;

if (!(count = (*stat = *slot) & 0x3f))
        count = 64;
module_addr = slot - rack;
delay_us(25);
if ((*ctrl & BLK_XFER_RD) && (*stat & BLK_XFER_RD)) {
        for (bx = bx_lst->first_ref; bx; bx = bx->next_ref)
                if (bx->module_addr == module_addr && (bx->enables & BLK_XFER_RD) && count <= bx->file_size) {
                        for (fp = bx->file_ptr, cs = 0; count--; fp += 2) {
                                fp[1] = *slot;    cs += fp[1];    delay_us(40);    keep_alive();
                                fp[0] = *slot;    cs += fp[0];    delay_us(40);    keep_alive();
                        }
                        if (cs != (~*slot & 0xff))
                                *stat = 0;
                        return;
                }

}
else if ((*ctrl & BLK_XFER_WR) && (*stat & BLK_XFER_WR)) {
        for (bx = bx_lst->first_ref; bx; bx = bx->next_ref)
                if (bx->module_addr == module_addr && (bx->enables & BLK_XFER_WR) && count <= bx->file_size) {
                        for (fp = bx->file_ptr, cs = 0; count--; fp += 2) {
                                *slot = fp[1];    cs += fp[1];    delay_us(40);    keep_alive();
                                *slot = fp[0];    cs += fp[0];    delay_us(40);    keep_alive();
                        }
                        *slot = ~cs;
                        delay_us(50);
                        if (cs != (~*slot & 0xff))
                                *stat = 0;
                        return;
                }

}
}
```

LADDER LOGIC CONTROL TASK 49

PARALLEL LOGIC

I/O CONTROL TASK 53

/*title*/

/* scanloop.c - model 50wc scan loop code (c) 1986 Pertron Controls */ include "weldbios.h"
include "globals.h"
include "vecmac.h"
include "blkxfer.h"
include "plcdnl.h"
include "target.h"
include "downdefs.h"

/* ========================= constant & macro defintions ========================= */ define SOLID_RUN              0x0008
define SOLID_HALT             0x0004
define FLASH_RUN              0x0002
define FLASH_HALT             0x0001
define update_watch_dog()     (watch_dog_tmr = 10000/TICK)
define get_scan_stat()        (0x8000 | scan_mode | leds | (operating.upper_work_area->plc_stat_word & DIRTY))

/* ========================= data area ========================= */ extern struct tbl_ptr_list interface;    /* interface image table pointer list */
extern struct tbl_ptr_list operating;    /* operating image table pointer list */
extern struct blk_xfer_hdr blk_xfers;    /* linked list of blk xfer references */
extern word lscn_error;                  /* logic scanner error flag */
extern word update_ok;                   /* update leds and keyswitch flag */
extern word watch_dog_tmr;               /* watch dog timer for scan loop */
extern word scan_mode;                   /* current mode */
extern word leds;                        /* current led pattern */
extern word flash_ctr;                   /* flash counter */
extern struct entry_def plc_entry_pts[];

```
/* ============================ code area ============================ */ scan_loop()                              /* -- perform i/o and logic scan -- */
{
    scan_mode = operating.upper_work_area->plc_stat_word & MODE;
    leds = (scan_mode & PROGRAM_MODE) ? FLASH_HALT : SOLID_RUN;
    update_ok = TRUE;
    init_time_base();
    for (;;) {
        fetch_scanner();
        chk_scan_mode();
        update_watch_dog();
        while(operating.upper_work_area->plc_stat_word & DIRTY) {
            release_scanner();
            update_watch_dog();
            wait_time(2);
            fetch_scanner();
        }
        operating.lower_work_area->scan_ctrl_word |= (MCR_FORCE + MCR_OFF);
        start_logic_scan();
        if (!wait_event(LSCN_DONE_EVENT, 100/TICK))
            proc_error(LTIM_ERROR);
        operating.lower_work_area->scan_ctrl_word &= ~(MCR_FORCE + MCR_OFF);
        setwords(&interface.lower_work_area->time_base, wordsof(struct time_base_def), 0);
        setwords(&operating.lower_work_area->time_base, wordsof(struct time_base_def), 0);
        release_scanner();
        update_watch_dog();
        scan_mode == PROGRAM_MODE ? prog_loop() : run_loop();
    }
} prog_loop()                              /* -- scan loop while in prgram mode -- */
{
    while (scan_mode == PROGRAM_MODE) {
        update_watch_dog();
```

```
        fetch_scanner();
        chk_scan_mode();
        release_scanner();
        wait_time(30/TICK);
    }
} run_loop()                          /* -- scan loop while in test/run mode -- */
{
    int last_scan_mode, num_racks;

last_scan_mode = scan_mode;
    fetch_scanner();
    stop_logic_scan();
    integrity_test();
    clr_event(LSCN_DONE_EVENT);
    clr_event(SCAN_DONE_EVENT);
    operating.upper_work_area->err_stat_word = 0;
    num_racks = operating.lower_work_area->scan_ctrl_word & 7;
    scan_racks(interface.outputs, interface.inputs, num_racks, &blk_xfers);
    scan_racks(interface.outputs, interface.inputs, num_racks, &blk_xfers);
    leds &= ~(SOLID_HALT + FLASH_HALT);
    if (scan_mode == RUN_MODE) {
        leds |= SOLID_RUN;
        set_misc_out(ENBL_OUTPUTS);
    }
    else
        leds |= FLASH_RUN;
    while (scan_mode != PROGRAM_MODE && scan_mode == last_scan_mode) {
        update_watch_dog();
        chk_scan_mode();
        operating.lower_work_area->scan_ctrl_word &= ~(MCR_FORCE + MCR_OFF);
        num_racks = operating.lower_work_area->scan_ctrl_word & 7;
        interface.lower_work_area->scan_set_time = operating.lower_work_area->scan_set_time;
        if (!(operating.upper_work_area->plc_stat_word & DIRTY)) {
```

```
        start_logic_scan();
        scan_racks(interface.outputs, interface.inputs, num_racks, &blk_xfers);
        if (!wait_event(LSCN_DONE_EVENT, 100/TICK))
                proc_error(LTIM_ERROR);
    }
    release_scanner();
    if (clr_event(SCAN_DONE_EVENT) || !operating.lower_work_area->scan_set_time)
            wait_sponge(2);
    else if (!wait_event(SCAN_DONE_EVENT, 100/TICK))
            proc_error(TTIM_ERROR);
    fetch_scanner();
    if (!(operating.upper_work_area->plc_stat_word & DIRTY)) {
            operating.lower_work_area->scan_stat_time = interface.lower_work_area->time_base.timer_1ms;
            dis_int();
            movwords(&interface.lower_work_area->time_base,
                    &operating.lower_work_area->time_base, wordsof(struct time_base_def));
            setwords(&interface.lower_work_area->time_base, wordsof(struct time_base_def), 0);
            enb_int();
        }
    }
    clr_misc_out(ENBL_OUTPUTS);
    leds &= ~(SOLID_RUN + FLASH_RUN);
    release_scanner();
} proc_error(err_type)            /* -- run time processor error handler -- */
int err_type;
{
    clr_misc_out(LED_RUN);
    stop_logic_scan();
    dis_int();
    leds &= ~(SOLID_RUN + FLASH_RUN);
    leds |= FLASH_HALT;
```

```
        scan_mode = PROGRAM_MODE;

enb_int();

operating.upper_work_area->plc_stat_word = interface.upper_work_area->plc_stat_word =
get_scan_stat();

operating.upper_work_area->err_stat_word <<= 4;

operating.upper_work_area->err_stat_word |= err_type;
} integrity_test()                    /* --- check integrity of memory structures --- */
{
        update_watch_dog();

fetch(CODE_CHAIN, 0);

if (sumwords(virt_vector_tbl, VEC_TBL_WORDS) != 0

|| quad_alloc_sum(ram_pool)         != 0

|| code_chain_sum(code_chain)       != 0

|| rung_chain_sum()                 != 0) { clr_misc_out(LED_RUN);

clr_misc_out(NOT_LED_HALT);

cold_boot();
        } release(CODE_CHAIN);

update_watch_dog();
} chk_scan_mode()                    /* --- check and possibly update logical scan mode --- */
{
        if (operating.upper_work_area->plc_stat_word != interface.upper_work_area->plc_stat_word) { dis_int();

scan_mode = operating.upper_work_area->plc_stat_word & MODE;

leds = (scan_mode & PROGRAM_MODE) ? FLASH_HALT : SOLID_RUN;

enb_int();
        } operating.upper_work_area->plc_stat_word = interface.upper_work_area->plc_stat_word =
get_scan_stat();
```

```c
keyled_update()                    /* -- debounce and update keyswitch and leds -- */
{
        int t;

if (update_ok) {
                if (watch_dog_tmr && !--watch_dog_tmr)
                        proc_error(WDOG_ERROR);
                mmisc_out &= ~LED_RUN;
                mmisc_out |= NOT_LED_HALT;
                if (leds & SOLID_RUN) mmisc_out |= LED_RUN;
                if (leds & SOLID_HALT) mmisc_out &= ~NOT_LED_HALT;
                if (++flash_ctr & 0x40) {
                        if (leds & FLASH_RUN) mmisc_out |= LED_RUN;
                        if (leds & FLASH_HALT) mmisc_out &= ~NOT_LED_HALT;
                }
                t = time_base_handler();
                if (interface.lower_work_area->scan_set_time &&      (int)(interface.lower_work_area->scan_set_time -= t) <= 0) {
                        interface.lower_work_area->scan_set_time = 0;
                        event_trigger(SCAN_DONE_EVENT);
                }
        }
        return(execute(plc_entry_pts[ETI_KEYLED_UPDATE].nxt_entry_pt()));
}
```

LINKER TASK 51

/*title*/
/* linker.c - pc497 linking loader (c) 1986 Pertron Controls */ include "plcbios.h"
include "plcdnl.h"
include "comm.h"
include "afl.h"
include "target.h"

```c
/* ============================== global data area ==============================
 */
    extern struct tbl_ptr_list operating;           /* operating image table pointer list  */
    extern struct rung_def *very_first_rung;        /* start of linked list of rungs       */
    extern struct rung_def *very_last_rung;         /* end of linked list of rungs         */
    extern struct rung_def *upload_rung;            /* pointer to next rung to be uploaded */
    extern struct blk_xfer_hdr blk_xfers;           /* linked list of blk xfer references  */
    extern struct ref_hdr labels;                   /* linked list of label references     */
    extern struct ref_hdr jumps;                    /* linked list of jump references      */
    extern word source_checksum;                    /* check sum of all ladder source code */
    extern char filename[];                         /* filename associated with this ladder */
    extern char test_handle[];                      /* handle for self test vector        */
    extern char force_label[];                      /* 'I/O FORCING RUNG' spelled sideways */
    extern struct afl_def initial_rung[];
    extern struct entry_def plc_entry_pts[];
    extern struct task_info_def self_test_info_tbl[];

/*----------------------------------------------------------------------------
-----------------*/
/* source/object code linker                                       */
/* receive and execute a link command.                             */
/*----------------------------------------------------------------------------
-----------------*/
link_rung(src, lc)
byte *src;
struct mg_link_cmd *lc;
{
    byte *buffers[2];
    struct rung_def *r, *lr;
    struct rung_def *construct_rung(), *unlink_rung(), *release_rung(), *find_last_code();

fetch_scanner();
    lc->scan_ok ? (operating.upper_work_area->plc_stat_word &= ~DIRTY) :
                  (operating.upper_work_area->plc_stat_word |= DIRTY) ;
```

```
if (r = construct_rung(lc, buffers)) {
    if (lr = unlink_rung(lc->last_serial, lc->next_serial)) {
        if (rcv_msg(src, &lc->source_bytes, buffers, MULTI_BUFF_FLAG) ==
NO_ERROR) {
            r->next_rung = lr->next_rung;
            source_checksum += sumwords(r, r->source_words);
            update_src_long(lr->next_rung, r);
            ctrl_str_chk_sum -= sumlongs(r->object_code, r->object_quads << 1);
            if (resolve_inter(r) && resolve_inter_to(r) && resolve_blk_xfers(r)) {
                resolve_endof(find_last_code(r));
                resolve_endof(r);
                resolve_intra(r);
                resolve_next_zcl(r);
            }
            else {
                unlink_rung(lc->last_serial, lc->next_serial);
                /* programmer will be unaware of this failure */
            }
        }
        else
            release_rung(r);
    }
    else {
        release_rung(r);
        rej_cmd(src);
    }
}
else
    rej_cmd(src);
operating.upper_work_area->src_quads_left = quadsleft(ram_pool);
operating.upper_work_area->obj_quads_left = quadsleft(ctrl_str_pool);
release_scanner();
}
```

/*----------------------------------------------------------------------
---------------- */

/* this routine makes room for a new rung into our linked list. the previous rung is patched to the rung following
*/

/* the new one, and it's branches should be re-resolved after the new rung's object code has been installed.
*/

/* therefore, we return a pointer to the previous rung. if we cannot unlink the list, a null pointer is returned.   */
/* the caller of this routine should own the logic scanner resource.
               */
/*----------------------------------------------------------------------------------
---------------- */
```c
struct rung_def *unlink_rung(l_serial, n_serial)
lword l_serial, n_serial;
{
        int len, dst, lbl, file_size, module_addr;
        struct afl_def *c;
        struct rung_def *r, *last_r, *next_r;
        struct ref_def *ref, *dup, *id_to_ref();
        struct rung_def *find_rung(), *release_rung(), *find_last_code(), *find_next_code();

if (!(last_r = find_rung(very_first_rung, l_serial)))
                return(NO_RUNG);
        if (!(next_r = find_rung(last_r->next_rung, n_serial)))
                return(NO_RUNG);
        for (r = last_r->next_rung; r != next_r; r = release_rung(r))
                for (len = r->object_quads, c = r->object_code; len--; c++) {
                        if (c->linkage_info == LABEL_DEST) {
                                remove_ref(&labels, (lbl = c->operand_a), r->object_code,
wordsof(struct ref_def));
                                dst = (dup = id_to_ref(labels, lbl)) ? dup->afl_offset
                                                                     : very_last_rung->object_code
- control_store;
                                for (ref = &jumps; ref=id_to_ref(ref,lbl); update_branch(ref->afl_offset+control_store,dst))
                                        ;
                        }
                        else if (c->linkage_info == BLK_XFER)
                                remove_blk_xfer(&blk_xfers, c);
                        else if (c->linkage_info == INTER_RUNG)
                                remove_ref(&jumps, c->operand_a, c, wordsof(struct ref_def));
```

```
        }
        update_src_long(last_r->next_rung, next_r);
        resolve_endof(find_last_code(next_r));
        return(last_r);
}
```

/*--------------------------------------------------------------------------------
----------------- */
/* make a rung structure out of a link command.  this includes getting memory for the rung structure (to which
we      */
/* will return a pointer), getting memory for the source, and object code, (into which we will stuff the rung
        */
/* structure with pointers), and setting the source and object lengths of the rung structure.  also set the serial
        */
/* number.  if we are unable to get sufficient memory, a null pointer is returned.  the caller of this routine should
        */
/* own the logic scanner resource.
                        */
/*--------------------------------------------------------------------------------
----------------- */

```
struct rung_def *construct_rung(lc, buff)
 struct mg_link_cmd *lc;
 byte *buff[];
{
        struct rung_def *r;
        word src_words, obj_quads;

if (r = (struct rung_def *)get_non_volatile_words(src_words = wordsof(struct rung_def)+(lc-
>source_bytes+1 >> 1))) {
                if (r->object_code = get_ctrl_str_ram(obj_quads = lc->object_bytes / bytesof(struct
afi_def))) {
                        r->source_words = src_words;
                        r->object_quads = obj_quads;
                        r->serial_number = lc->this_serial;
                        buff[0] = (byte *)(r + 1);
                        buff[1] = (byte *)r->object_code;
                        return(r);
```

```
            }
            else {
                    rls_non_volatile_words(r, src_words);
                    return(NO_RUNG);
            }
    }
    else
            return(NO_RUNG);
}
```

/* ---------------------------------------------------------------- */
/* release all memory used by a rung. return the address of the next rung.        */
/* the caller of this routine should own the logic scanner resource.
            */
/* ---------------------------------------------------------------- */
```
struct rung_def *release_rung(r)
 struct rung_def *r;
{
        struct rung_def *nr;

nr = r->next_rung;
        ctrl_str_chk_sum += sumlongs(r->object_code, r->object_quads << 1);
        rls_ctrl_str_ram(r->object_code, r->object_quads);
        source_checksum -= sumwords(r, r->source_words);
        rls_non_volatile_words(r, r->source_words);
        return(nr);
}
```

/* ---------------------------------------------------------------- */
/* resolve all 'end of rung' jumps of a rung.                        */
/* the caller of this routine should own the logic scanner resource.
            */
/* ---------------------------------------------------------------- */

```
resolve_endof(r)
 struct rung_def *r;
{
        struct afi_def *c;
        int len, next_code;
        struct rung_def *find_next_code();

next_code = find_next_code(r)->object_code - control_store;
        for (len = r->object_quads, c = r->object_code; len--; c++)
                if (c->linkage_info == NEXT_RUNG)
                        update_branch(c, next_code);
}
```

```
/* ................................................................................
 ................ */
/* resolve all jumps within a rung. note: this routine can only be called once for each rung.     */
/* the caller of this routine should own the logic scanner resource.
                    */
/* ................................................................................
 ................ */
resolve_intra(r)
 struct rung_def *r;
{
        int len;
        struct afi_def *c;

for (len = r->object_quads, c = r->object_code; len--; c++)
                if (c->linkage_info == INTRA_RUNG || c->linkage_info == LABEL_DEST)
                        update_branch(c, c->operand_b + r->object_code - control_store);
}
```

```
/* ................................................................................
 ................ */
/* resolve any jumps within this rung to labels that may exist in other rungs. if we are unable to aquire suffient
    */
```

/* memory, we return zero, else non zero. the caller of this routine should own the logic scanner resource. note that  */
/* if we are unable to find a jump destination, we jump to the final rung. this is safe because the final rung will  */
/* never move.  */
/* ----------------------------------------------------------------------------------------- */

```c
resolve_inter(r)
 struct rung_def *r;
{
        int len;
        struct afl_def *c;
        struct rung_def *find_next_code();
        struct ref_def *ref, *add_ref(), *id_to_ref();

for (len = r->object_quads, c = r->object_code; len--; c++)
                if (c->linkage_info == INTER_RUNG) {
                        if (add_ref(&jumps, c->operand_a, c, wordsof(struct ref_def))) {
                                if (ref = id_to_ref(&labels, c->operand_a))
                                        update_branch(c, ref->afl_offset);
                                else
                                        update_branch(c, very_last_rung->object_code - control_store);
                        }
                        else
                                return(FALSE);
                }
        return(TRUE);
}
```

/* ----------------------------------------------------------------------------------------- */
/* resolve all inter rung jumps to labels that label this rung. the caller of this routine should own the logic  */
/* scanner resource. if available memory is insufficient for extension of the label reference list, zero is returned  */
/* ----------------------------------------------------------------------------------------- */

```
resolve_inter_to(r)
 struct rung_def *r;
{
        int len, lbl, dst;
        struct afi_def *c;
        struct ref_def *ref, *add_ref(), *id_to_ref();

for (len = r->object_quads, c = r->object_code; len--; c++)
                if (c->linkage_info == LABEL_DEST) {
                        if (add_ref(&labels, c->operand_a, r->object_code, wordsof(struct ref_def))) {
                                lbl = c->operand_a;
                                dst = r->object_code - control_store;
                                for (ref = &jumps; ref=id_to_ref(ref,lbl); update_branch(ref->afi_offset+control_store,dst))
                                        ;
                        }
                        else
                                return(FALSE);
                }
        return(TRUE);
}

/*----------------------------------------------------------------------------------
----------------- */
/* resolve all 'next zcl' jumps of a rung.                                        */
/* the caller of this routine should own the logic scanner resource.
                */
/*----------------------------------------------------------------------------------
----------------- */
resolve_next_zcl(r)
 struct rung_def *r;
{
        struct afi_def *c, *cn;
        struct rung_def *nr;
        int len, len_n;
```

```
for (len = r->object_quads, c = r->object_code; len--; c++)
        if (c->linkage_info == NEXT_ZCL) {
                for (nr = r->next_rung; nr && nr != very_last_rung; nr = nr->next_rung) {
                        for (len_n = nr->object_quads, cn = nr->object_code; len_n--; cn++)
                                if (cn->linkage_info == NEXT_ZCL)
                                        break;
                        if (cn->linkage_info == NEXT_ZCL)
                                break;
                }
                update_branch(c, nr->object_code - control_store);
        }
}
```

```
/*--------------------------------------------------------------------------------
---------------- */
/* resolve all 'block transfer' occurences.                                    */
/* the caller of this routine should own the logic scanner resource.
            */
/*--------------------------------------------------------------------------------
---------------- */
resolve_blk_xfers(r)
 struct rung_def *r;
{
        struct afl_def .*c;
        struct blk_xfer_ref *bx;
        int len, file_size, module_addr;

for (len = r->object_quads, c = r->object_code; len--; c++)
                if (c->linkage_info == BLK_XFER) {
                        module_addr = c->operand_b;
                        file_size = (c+2)->operand_b;
                        if (!add_blk_xfer(&blk_xfers, module_addr, 0, file_size, c))
                                return(FALSE);
                }
        return(TRUE);
}
```

```
/* ------------------------------------------------------------------- */
/* test the check sum of the entire rung chain. return 0 for success, non-zero for failure */
/* this may be called from someone other than the commtask, whoever calls this should first */
/* own the logic scanner resource.                                     */
/* ------------------------------------------------------------------- */
rung_chain_sum()
{
        struct rung_def *r;
        word sum;

for (sum = source_checksum, r = very_first_rung; r; r = r->next_rung)
                sum -= sumwords(r, r->source_words);
        return(sum + ref_sum(&jumps) + ref_sum(&labels) + checksum_blk_xfer(&blk_xfers));
}
```

```
/* ============================================ reference linked list manager
   ============================================ */

/* ------------------------------------------------------------------- */
/* search a linked list of label reference structures for the reference assiciated with the passed label id. If no */
/* reference is found a null pointer is returned.                      */
/* ------------------------------------------------------------------- */
struct ref_def *id_to_ref(ref, id)
 struct ref_def *ref;
int id;
{
        while ((ref = ref->next_ref) && ref->label_id != id)
                ;
        return(ref);
}
```

/* ---------------------------------------------------------------------------------
   ---------------- */
/* add to a linked list of label reference structures for the reference assiciated with the passed label id and code   */
/* address.  returns pointer to newly added reference.
                                  */
/* ---------------------------------------------------------------------------------
   ---------------- */

```c
struct ref_def *add_ref(ref_list, id, afl, ref_words)
 struct ref_hdr *ref_list;
 int id, ref_words;
 struct afl_def *afl;
{
        struct ref_def *ref;

if (ref = (struct ref_def *)get_non_volatile_words(ref_words)) {
                ref->label_id = id;
                ref->afl_offset = afl - control_store;
                ref->next_ref = ref_list->first_ref;
                ref_list->first_ref = ref;
                ref_list->checksum -= ((lword *)ref)[0] + (lword)ref;
        }
        return(ref);
}
```

/* ---------------------------------------------------------------------------------
   ---------------- */
/* search a linked list of label reference structures for the reference assiciated with the passed label id and code   */
/* address.  when it is found, remove it from the linked list.
                                  */
/* ---------------------------------------------------------------------------------
   ---------------- */

```c
remove_ref(ref_list, id, afl, ref_words)
 struct ref_hdr *ref_list;
 int id, ref_words;
 struct afl_def *afl;
```

```
{
        int offset;
        struct ref_def *last, *ref;

offset = afl - control_store;
        last = (struct ref_def *)ref_list;
        ref  = ref_list->first_ref;
        while (ref && (ref->label_id != id || ref->afl_offset != offset)) {
                last = ref;
                ref = ref->next_ref;
        }
        if (ref) {
                ref_list->checksum += ((lword *)ref)[0] + (lword)ref;
                last->next_ref = ref->next_ref;
                rls_non_volatile_words(ref, ref_words);
        }
}
```

/* ................................................................................................ */
/* release all members of a linked list of label reference structures     */
/* ................................................................................................ */

```
release_all_refs(ref_list)
 struct ref_hdr *ref_list;
{
        struct ref_def *ref, *nxt_ref;

for (ref = ref_list->first_ref; ref; ref = nxt_ref) {
                nxt_ref = ref->next_ref;
                rls_non_volatile_words(ref, wordsof(struct ref_def));
        }
}
```

```
/* ------------------------------------------------------------------------
   --------------- */
/* checksum a linked list of label reference structures
                           */
/* ------------------------------------------------------------------------
   --------------- */
ref_sum(ref)
 struct ref_def *ref;
{
        lword sum;

for (sum = 0; ref; ref = ref->next_ref)
                sum += ((lword *)ref)[0] + ((lword *)ref)[1];
        return(sum);
}
```

INCLUDES

```
/*title*/
/* afl.h -- afl code header (c) 1986 Pertron Controls */ define afls_of(obj)          (sizeof(obj)/sizeof(struct  afl_def))
define null_template         (struct  afl_def *)0 struct afl_def {   /* ------ high speed scanner code definition ------ */
        unsigned data_size        : 1;  /* alu instruction word              */
        unsigned quad             : 2;  /* includes alu operation and        */
        unsigned inst_field_a     : 4;        /* bit number.                 */
        unsigned inst_field_b     : 4;
        unsigned inst_field_c     : 5;
        unsigned halt             : 1;  /* control word                      */
        unsigned indirect_jump    : 1;        /* specifies branch conditions */
        unsigned conditional_branch: 1;       /* and read and write source   */
        unsigned condition_sense  : 1;        /* and destination. (op-store  */
        unsigned condition_select : 4;        /* or operand_a or operand_b)  */
        unsigned source           : 2;
```

```c
        unsigned write_enable      : 1;
        unsigned indexed_access    : 1;
        unsigned status_reg_disable: 1;
        unsigned linkage_info      : 3;
        word operand_a;                    /* operand_a, op_store addresss */
    word operand_b;                        /* operand_b, jump destination  */
};

define TRUE_SENSE    0x0000         /* execute coil true/false flag */
define FALSE_SENSE   0x8000         /* set in hi bit of element id  */

/* ------------------- alu  data  size  definitions ----------------- */
define WORD          1              /* word data size */
define BYTE          0              /* byte data size */

/* ------------------ alu  instruction  type  definitons ------------- */
define SOR           2              /* single operand, ram */
/*title*/
/* display.h -- glorious editor screen definitions (c) 1986 Pertron Controls */

/* --------------------- screen  layout  definitions ------------------------ */
define MENU_LINES              3    /* number of menu lines on screen      */
define ZI_LINES_PER_ROW        4    /* lines per row when zoomed in        */
define ZI_CHARS_PER_COLUMN     6    /* chars per column when zoomed in     */
define ROW_LOOKUP_OFFSET       5    /* offset to add before using row table */
define MAX_ELEMENT_HEIGHT      5    /* maximum height of any single element */
define MAX_COL_LOOKUP_SIZE    15    /* maximum size of cell lookup table   */
define MAX_ROW_LOOKUP_SIZE    60    /* maximum size of row lookup table    */ define LINE_MOVE_LOCATOR       1    /* line move locator enable value      */
define LINE_DRAW_LOCATOR       2    /* line draw locator enable value      */
define LINE_ERASE_LOCATOR      3    /* line erase locator enable value     */
define CELL_LOCATOR            4    /* cell locator enable value           */
define LINE_LOCATOR            3    /* bit mask for line locator enable values */
define DRAW_LOCATOR_CHAR     'Œ'    /* draw line locator symbol (flashing cross hairs) */
define ERASE_LOCATOR_CHAR    '.'    /* erase line locator symbol (flashing box) */
```

```c
/* ==================== structure definitions ==================== */
struct attribute_def {            /* -------- attribute definition structure -------- */
    int status_line;                  /* status line attribute          */
    int message_line;                 /* message line attribute         */
    int menu_area;                    /* menu area attribute            */
    int work_area[3];                 /* work area attribute            */
    int locator[3];                   /* locator attribute              */
    int marking_area[3];              /* marking area attribute         */
    int marked_area[3];               /* marked area attribute          */
};

struct locator_def {              /* -------- locator positioning definitons -------- */
    int type;                         /* cell locator type and enable flag */
    int row_number;                   /* current editor row number      */
    int rung_number;                  /* current rung being edited      */
    int column_number;                /* current editor column          */
    int screen_row_offset;            /* current offset of loc from scn top */
    struct row_def *row;              /* current row pointer            */
    union cell_def *cell;             /* current cell pointer           */
};

struct screen_layout_def { /* ----------- screen layout definitions ----------- */
    int status_line;                  /* offset in lines to status line */
    int top_work_line;                /* offset in lines to top of work area */
    int bottom_work_line;             /* offset in lines to bot of work area */
    int message_line;                 /* offset in lines to message line */
    int top_menu_line;                /* offset in lines to top of menu area */
    int bottom_menu_line;             /* offset in lines to bot of menu area */
    int status_position;              /* offset in chars to status line */
    int work_position;                /* offset in chars to top of work area */
    int last_work_position;           /* offset in chars to bot of work area */
    int msg1_position;                /* offset in chars to message 1 line */
    int msg2_position;                /* offset in chars to msg 2 line  */
    int menu_position[MENU_LINES];    /* offset in chars to menu lines  */
    int big_locator_position;         /* offset in chars to big locator */
    int work_area_lines;              /* length in lines of work area   */
    int menu_area_lines;              /* length in lines of menu area   */
```

```c
    int menu_area_size;                         /* length in chars of work area       */
    int work_area_size;                         /* length in chars of menu area       */
    int msg1_length;                            /* length in chars of message 1 line  */
    int msg2_length;                            /* length in chars of message 1 line  */
    int zoom;                                   /* current state of zoom (in/out)     */
    int lines_per_row;                          /* current cell height setting        */
    int rows_per_screen;                        /* current screen height setting      */
    int chars_per_column;                       /* current cell width setting         */
    int chars_per_row;                          /* current cell height*dsp_columns    */
    int cell_axis_line;                         /* current cell axis setting          */
    int cell_axis_position;                     /* current cell axis*dsp_columns      */
    int row_lookup[MAX_ROW_LOOKUP_SIZE];        /* lookup table, row offset to pos.   */
    int col_lookup[MAX_COL_LOOKUP_SIZE];        /* lookup table, column offset to pos.*/
    int height_lookup[MAX_ELEMENT_HEIGHT];      /* lookup table, cell hite to line hite*/
};

struct area_marker_def {   /* ---------- area marker definition ------------- */
    int row_number;                             /* marked row number      */
    int column_number;                          /* marked column          */
    struct row_def *row;                        /* marked row pointer     */
};

struct area_def {          /* ---------- area layout definitions ----------- */
    struct area_marker_def first_marked;        /* first marked location  */
    struct area_marker_def last_marked;         /* last marked location   */
    struct area_marker_def left;                /* area left marker       */
    struct area_marker_def right;               /* area right marker      */
    struct area_marker_def upper;               /* area upper marker      */
    struct area_marker_def lower;               /* area lower marker      */
    int *attribute;                             /* current area attribute */
};

struct editor_flags_def {  /* --------- miscellanious editor flags --------- */
    int trace;                                  /* trace flag (insert/delete)     */
    int net_rev;                                /* 2 = pemet II, 3 = pemet III    */
    int modified;                               /* ladder has been modified flag  */
    int symbolic;                               /* editor is in symbolic mode flag */
```

```c
    int wait_delay;             /* element insert timer              */
    int mouse_int;              /* interrupt channel for the mouse   */
    int e3_int_chan;            /* threecom interrupt channel        */
    int e3_dma_chan;            /* threecom dma channel              */
    int p2_int_chan;            /* pernet II interrupt channel       */
    int p2_port_addr;           /* pernet II port address            */
    int insert_left;            /* insert on left flag               */
    int ibm_printer;            /* ibm printer or compatible flag    */
    int insert_right;           /* insert on right flag              */
    int duplicate_coil;         /* output already used flag          */
    int lines_per_page;         /* lines per page used for printing  */
    int undefined_symbol;       /* undefined symbol flag             */
    int search_for_element;     /* search for element flag           */
};

struct operating_def {
    int mode;                   /* current editor mode               */
    int menu;                   /* index into menus for current mode */
};

/* ---------------- externs for macro definitions ---------------- */
ifndef MAIN
extern struct locator_def locator;
extern struct operating_def operating;
extern struct attribute_def attribute;
extern struct screen_layout_def screen_layout;
endif
extern int dsp_segment, alt_segment, dsp_columns, dsp_lines;

/* ---------------- screen macro definitions ---------------- */
define awa        attribute.work_area
define aml        attribute.message_line
define alc        attribute.locator
define rpl        locator.row
define cpl        locator.cell
define rnl        locator.row_number
define cnl        locator.column_number
define srol       locator.screen_row_offset
```

```c
define are_marking_area()      (operating.mode == COMMAND_MODE && operating.menu == MARK_AREA_MENU)
define cell_locator_on()       draw_element(cpl, rpl, srol, BEGIN_EDIT,    0, dsp_state())
define mini_editor(key)        draw_element(cpl, rpl, srol, CONTINUE_EDIT, key, dsp_state())
define cell_locator_off()      draw_element(cpl, rpl, srol, FINISH_EDIT,   0, dsp_state())
define dsp_stat_msg(s, a)      dspmsg(screen_layout.msg2_position, screen_layout.msg2_length, aml, 5, s, aml + a)
define clr_stat_msg()          clrmsg(screen_layout.msg2_position, screen_layout.msg2_length, aml)
define save_dsp(p, l)          dspcopy((p), dsp_segment, (p), alt_segment, (l))
define restore_dsp(p, l)       dspcopy((p), alt_segment, (p), dsp_segment, (l))
define save_work_area()        save_dsp(screen_layout.work_position, screen_layout.work_area_size)
define restore_work_area()     restore_dsp(screen_layout.work_position, screen_layout.work_area_size)
define save_menu_area()        save_dsp(screen_layout.menu_position[0], screen_layout.menu_area_size)
define restore_menu_area()     restore_dsp(screen_layout.menu_position[0], screen_layout.menu_area_size)
define clear_dsp(t, b, a)      scroll_dsp(SCROLL_UP, (t), (b), 0, (a))
define clear_menu_area()       clear_dsp(screen_layout.top_menu_line, screen_layout.bottom_menu_line, attribute.menu_area)
define update_status()         dsp_status(locator.rung_number, locator.row_number, locator.column_number);
define row_line(s)             (screen_layout.top_work_line + (s) * screen_layout.lines_per_row)
define row_position(s)         screen_layout.row_lookup[s + ROW_LOOKUP_OFFSET]
define column_position(c)      screen_layout.col_lookup[c]
define screen_position(s, c)   (row_position(s) + column_position(c))
define locator_position()      screen_position(locator.screen_row_offset, locator.column_number)
define line_locator_position() (locator_position(srol, cnl) + screen_layout.cell_axis_position)
define line_height(h)          screen_layout.height_lookup[h]
define restore_row(s)          restore_dsp(row_position(s), screen_layout.chars_per_row)
define is_in_work_area(p)      (screen_layout.work_position <= p && p < screen_layout.last_work_position)
define is_on_screen(s)         (0 <= s && s < screen_layout.rows_per_screen)
define might_be_on_screen(s)   (-ROW_LOOKUP_OFFSET < s && s < screen_layout.rows_per_screen)
define big_loc_horz_offset(w)  ((5 - (w)) * (ZI_CHARS_PER_COLUMN/2))
define big_loc_vert_offset(h)  ((5 - (h)) * (ZI_LINES_PER_ROW/2) * DSP_COLUMNS)
define big_locator_pos(h,w)    (screen_layout.big_locator_position + big_loc_vert_offset(h) + big_loc_horz_offset(w))

/*title*/

/* elemacro.h -- element macros header 3.00  (c) 1986 Pertron Controls */

/* --------------------------- macro definitions --------------------------- */
```

```c
extern struct elem_entry *element_tbl;
extern struct picture *(*mini_editor_fcn)();

define element_editor(i,e,f,k,d)   (struct picture *)(*mini_editor_fcn)(i,e,f,k,d)
define element_monitor(i,e,f,k,d)  (struct monitor_info_def *)(*mini_editor_fcn)(i,e,f,k,d)
define element_width(c)            ((c)->is.primary ? element_tbl[(c)->element.id].width       : 1)
define element_height(c)           ((c)->is.primary ? element_tbl[(c)->element.id].height      : 1)
define element_inputs(c)           ((c)->is.primary ? element_tbl[(c)->element.id].input_legs  : (c)->has.leg)
define element_outputs(c)          ((c)->is.primary ? element_tbl[(c)->element.id].output_legs : (c)->has.leg)
define element_desc_map(c)         ((c)->is.primary ? element_tbl[(c)->element.id].descriptor_map : "")
define element_has_monitor(c)      ((c)->is.primary ? element_tbl[(c)->element.id].has_monitor : 0)
define coil_element(c)             ((c)->is.primary ? element_tbl[(c)->element.id].is_coil    : 0)
define has_leg(c)                  ((c)->is.primary ? 1 : (c)->has.leg)
/*title*/
/* elemdraw.h -- element drawing header 3.00  (c) 1986 Pertron Controls */ struct picture {            /* ----- response returned from element handler ----- */
    char x_cursor;          /* x cursor coordinate       */
    char y_cursor;          /* y cursor coordinate       */
    char **display_lines;   /* pointer to display        */
    char **attribute_lines; /* pointer to attribute flags */
};

struct elem_entry {         /* ------ element definition table entry ---------- */
    char is_coil;           /* coil flag                          */
    char height;            /* height of element in cells         */
    char width;             /* width of element in cells          */
    char input_legs;        /* bit map of input legs              */
    char output_legs;       /* bit map of output legs             */
    char has_monitor;       /* data monitor capability flag       */
    char *descriptor_map;   /* character map of desciptor contents */
};
```

```c
struct monitor_info_def {      /* ------ data monitor information structure ------ */
    int num_files;                      /* number of files to be displayed    */
    int file_addr[3];                   /* addresses of files                 */
    int file_size[3];                   /* sizes of files                     */
    int max_size;                       /* maximum file size                  */
    int columns;                        /* number of columns (if num_files = 1) */
    char not_used, mode;                /* monitor mode, radix if numeric mode */
    char *heading[3];
};

struct mocator_def {           /* -- universal monitor locator definition -- */
    int file;                           /* current file number                */
    int pos;                            /* current position within the file   */
    int bit;                            /* current bit within the position    */
};

struct bit_symbol_def {        /* -------- entry in the bit symbol table ------ */
    int word;                           /* word value of symbol               */
    int bit;                            /* bit value of symbol                */
    char name[10];                      /* space for 2 words, name[0] & name[5] */
    struct bit_symbol_def *next_bit_sym; /* pointer to next symbol            */
};

struct word_symbol_def {       /* --------- entry in the word symbol table ------ */
    int word;                           /* word value of symbol               */
    char name[10];                      /* space for 2 words, name[0] & name[5] */
    struct word_symbol_def *next_word_sym; /* pointer to next symbol          */
};

/* ---------------------- element handler function codes ---------------------- */
define BIRTH          0x10        /* initialize element (first insertion)  */
define BEGIN_EDIT     0x11        /* initialize element for editing        */
define CONTINUE_EDIT  0x12        /* continue editing                      */
define FINISH_EDIT    0x13        /* finish editing                        */
```

```c
define DISPLAY              0x04       /* display element               */
define EDIT                 0x10       /* edit (cursor enable) bit      */
define BEGIN_MONITOR        0x20       /* return data monitor info      */
define FINISH_MONITOR       0x21       /* restore data monitor info     */

/* ---------------------- display state bit definitions ---------------------- */
define ZOOMED_IN_FLAG       0x01       /* display mode is zoomed in            */
define SYMBOLIC_FLAG        0x02       /* display mode has symbols enabled     */
define POWER_FLOW_FLAG      0x04       /* display mode has power flow enabled  */

/* ---------------------- contact/coil flags ---------------------- */
define CONTACT              0          /* contact flag                  */
define COIL                 1          /* coil flag                     */
define NULL_PICTURE         ((struct picture *)0)
/*title*/
/* keyboard.h -- glorious editor keyboard definitions (c) 1986 Pertron Controls */

/* ---------------------- keyboard scancode definitions ---------------------- */
define MENU_UPDATE          0x0132     /* menu update key               */
define ZOOM_IN_KEY          0x4e00     /* zoom in key                   */
define ZOOM_OUT_KEY         0x4a00     /* zoom out key                  */
define SYMBOL_TOGGLE        0x002a     /* symbol/number toggle key      */
define FORCE_ON_KEY         0x02ff     /* force an io point on          */
define FORCE_OFF_KEY        0x02fe     /* force an io point off         */
define UNFORCE_KEY          0x02fd     /* un-force an io point          */
define WHITE_SPACE          ' '        /* white space constant          */
define OCTAL                8          /* octal character constant      */
define DECIMAL              10         /* decimal character constant    */
define UNCLASSIFIED         0          /* who cares what the character was */

/* ---------------------- shift status masks ---------------------- */
define SHIFT_MASK           0x0f       /* mask for shift, ctrl, and alt keys */
define NUM_LOCK             0x20       /* mask for num lock state       */
```

/* ---------------------- keyboard related macros ---------------------- */

```c
define is_page(key)          ((key)==PAGE_UP || (key)==PAGE_DOWN ||
                               (key)==SHF_PAGE_UP || (key)==SHF_PAGE_DOWN)
define is_cursor(key)        ((key)==CUR_LEFT || (key)==CUR_RIGHT || (key)==CUR_UP ||
                               (key)==CUR_DOWN)
define is_motion(key)        ((key)==CELL_LEFT || (key)==CELL_RIGHT || (key)==CELL_UP ||
                               (key)==CELL_DOWN)
define is_mouse(key)         ((key)==MOUSE_LEFT || (key)==MOUSE_RIGHT ||
                               (key)==MOUSE_UP || (key)==MOUSE_DOWN)
define is_rail(key)          ((key)==HOME_KEY || (key)==END_KEY ||
                               (key)==SHF_HOME_KEY || (key)==SHF_END_KEY)
define is_edit(key)          ((key)=='\r' || (key)=='\b' || (key)=='\t' ||
                               (key)==BACK_TAB)
define is_force(key)         ((key)==UNFORCE_KEY|| (key)==FORCE_ON_KEY||
                               (key)==FORCE_OFF_KEY)
define is_upper(key)         ('A' <= (key) && (key) <= 'Z')
define is_lower(key)         ('a' <= (key) && (key) <= 'z')
define is_number(key)        ('0' <= (key) && (key) <= '9')
define is_octal(key)         ('0' <= (key) && (key) <= '7')
define is_uprhex(key)        ('A' <= (key) && (key) <= 'F')
define is_lwrhex(key)        ('a' <= (key) && (key) <= 'f')
define is_change(key)        (is_upper(key) || is_lower(key) || is_number(key) || (key)==' ')
define is_alnum(key)         (is_upper(key) || is_lower(key) || is_number(key))
define is_hex(key)           (is_uprhex(key) || is_lwrhex(key) || is_number(key))
define is_mini_editor(key)   (is_change(key) || is_edit(key) || is_cursor(key))
define is_reg_fcn(key)       (F1_KEY <= (key) && (key) <= F10_KEY )
define is_sft_fcn(key)       (SHFT_F1 <= (key) && (key) <= SHFT_F10)
define is_ctl_fcn(key)       (CTRL_F1 <= (key) && (key) <= CTRL_F10)
define is_alt_fcn(key)       (ALT_F1 <= (key) && (key) <= ALT_F10 )
define is_function(key)      (is_reg_fcn(key) || (SHFT_F1 <= (key) && (key) <= ALT_F10))
define is_zoom(key)          ((key) == ZOOM_IN_KEY || (key) == ZOOM_OUT_KEY)

define to_upper(key)         (key & ~0x20)
define to_lower(key)         (key | 0x20)
```

/*title*/

/* lddrdefs.h -- ladder editor header  (c) 1986 Pertron Controls */

```c
define LDDPDEFS

/* ------------------------ task numbers (priorities) ---------------------- */ define PHYSCOMMTASK    0           /* communications hardware manager  */
define NETMANTASK      1           /* another communications manager task */
define EDITOR          2           /* editor task                      */
define COMPILER        3           /* compiler task                    */
define HOUSE_KEEP      4           /* house keeping task               */

/* ------------------------ resource definitions ------------------------- */ define LADDER          0           /* ladder resource id               */
define LINKER          1           /* plc linker                       */
define DATA_TABLE      2           /* data table and update lists      */

/* ------------------------ event definitions ---------------------------- */ define WAKEPHYSCOMTASK   0         /* wake the threecom manager task   */
define WAKENETMANTASK    1         /* wake the network manager task    */
define WAKEEDITOR        2         /* wake up the editor task          */
define WAKECOMPILER      3         /* wake up the compiler task        */
define WAKEHOUSE_KEEP    4         /* wake up the house keeping task   */
define KB_EVENT          5         /* keyboard/mouse event             */
define COMM_EVENT        6         /* three com response event         */
define AUX_COMM_EVENT    7         /* loopernet uses two com events    */
define UPDATE_EVENT      8         /* compiler update event / mode change */
define HOUSE_DIS_ACK     9         /* house keep disable acknowledge event */

/* ------------------------ change mode definitions --------------------- */ define MANUAL_UPDATE   0           /* chgs in run are made manually    */
define AUTO_UPDATE     1           /* chgs in run are make automatically */

/* ------------------------ plc status word definitions ---------------- */ define PLC_STAT_WORD         0107  /* location in data table of status word */
define PLC_LEDS              0x000f /* plc processor leds              */
define LED_BATTERY           0x0001 /* battery led                     */
define LED_MEMORY            0x0002 /* memory corrupt led              */
define LED_PROC              0x0004 /* processor fault led             */
define LED_RUN               0x0008 /* run led                         */
```

```
define  PLC_MODE              0x0070  /* plc logical mode              */
define  PROGRAM_MODE          0x0010  /* program                       */
define  TEST_MODE             0x0020  /* test                          */
define  RUN_MODE              0x0040  /* run                           */
define  DIRTY                 0x0080  /* control store update in progress */
define  PLC_KEYSWITCH         0xf000  /* plc keyswitch position        */
define  KS_PROGRAM            0x1000  /* program                       */
define  KS_TEST               0x2000  /* test                          */
define  KS_RUN                0x4000  /* run                           */
define  KS_RUN_PROGRAM        0x8000  /* run/program                   */
define  PLC_KS_MODE           0xf070  /* plc keyswitch and mode        */
define  KSM_HARD_PROGRAM      0x1010  /* key switch program            */
define  KSM_HARD_TEST         0x2020  /* key switch test               */
define  KSM_HARD_RUN          0x4040  /* key switch run                */
define  KSM_SOFT_PROGRAM      0x8010  /* remote program                */
define  KSM_SOFT_TEST         0x8020  /* remote test                   */
define  KSM_SOFT_RUN          0x8040  /* remote run                    */

/* ------------------------- plc  macro  definitions ------------------------- */
ifndef MAIN
extern int *data_table;
endif
define  update_plc_mode(n)    write_dt(PLC_STAT_WORD, (data_table[PLC_STAT_WORD] &
                               ~PLC_MODE) | (n))
define  plc_mode()            (data_table[PLC_STAT_WORD] & PLC_MODE)
define  plc_keyswitch()       (data_table[PLC_STAT_WORD] & PLC_KEYSWITCH)
define  plc_ks_mode()         (data_table[PLC_STAT_WORD] & PLC_KS_MODE)
define  is_in_proc_work_area(a)  ((0 <= a && a <= 010) || (0100 <= a && a <= 0110))

/* ------------------------- misc ladder definitions ------------------------- */
define  SW_VER_NUM            0x1000  /* software version number       */
define  EMPTY                 0x0000  /* empty cell descriptor         */
define  HORZ_SHORT            0x2000  /* horizontal short descriptor   */
define  STRADDLE              0x8000  /* multicell element occupation bit */
define  ROW_WIDTH             13      /* row width in cells            */
define  MAX_RUNG_HEIGHT       10      /* maximum rung height in rows   */
```

```c
define MAX_BLANK_HEIGHT        30       /* maximum blanks associated with rung    */
define MIN_ROWS                20       /* minimum number of rows in ladder       */
define END_SERIAL_NUMBER       0L
define START_SERIAL_NUMBER     -1L
define MCR_TEST_CHAR           (0x100 * 'C' + 'M')
define RAILS                   ((1 << ROW_WIDTH) | 1)
define NULL_ROW                ((struct row_def *)0)
define NULL_CELL               ((union cell_def *)0)
define MAX_BLANK_N_RUNG_HEIGHT (MAX_BLANK_HEIGHT + MAX_RUNG_HEIGHT)
define COMPILE_BUFFER_SIZE     (MAX_BLANK_N_RUNG_HEIGHT * sizeof(struct row_def))
define IO_TABLE_WORDS          (128)
define IO_TABLE_SIZE           (IO_TABLE_WORDS * sizeof(int))

/* ----------------------- structure definitons ---------------------- */
union cell_def {    /* ----------- cell definition structure ----------- */
    struct {
        unsigned primary    : 1;    /* primary cell flag        */
        unsigned coil       : 1;    /* coil element flag        */
        unsigned leg        : 1;    /* leg flag                 */
        unsigned spare      : 5;    /* spare bits               */
        unsigned offset     : 8;    /* don't use this reference */
    } is;
    struct {
        unsigned descriptor : 1;    /* pointer flag             */
        unsigned coil       : 1;    /* coil flag                */
        unsigned leg        : 1;    /* i/o leg flag             */
        unsigned no_use     : 5;    /* unused bits              */
        unsigned offset     : 8;    /* offset flag              */
    } has;
    struct {
        unsigned aint_one   : 8;    /* don't use this reference */
        unsigned y          : 4;    /* y offset to primary cell */
        unsigned x          : 4;    /* x offset to primary cell */
    } offset;
    struct {
        unsigned aint_one   : 8;    /* don't use this reference */
        unsigned id         : 8;    /* element id               */
```

```c
        } element;
        int type;                       /* the whole thing as an int    */
};

struct row_flags {          /* --------------- row flags definition --------------- */
        unsigned occupied    : 1;       /* occupied flag              */
        unsigned too_complex : 1;       /* too complex flag           */
        unsigned in_area     : 1;       /* in marked area flag        */
};

struct row_def {  /* ----------- row definition structure --------------- */
        long serial_number;             /* rung serial number         */
        struct row_def *last_row;       /* pointer to row before      */
        struct row_def *next_row;       /* pointer to row after       */
        struct row_flags is;            /* misc flags                 */
        int is_vert_shorted;            /* vertical short flags       */
        union cell_def cells[ROW_WIDTH]; /* cell descriptors          */
        long descriptor[ROW_WIDTH];     /* element descriptors        */
};

struct compact_row {      /* ------------ compressed row structure ------------ */
        int length;                     /* length of compressed row   */
        int is_vert_shorted;            /* vertical shorts bit map    */
        int is_horz_shorted;            /* horizontal shorts bit map  */
        int is_occupied;                /* occupied bit map           */
        union cell_def cells[ROW_WIDTH]; /* occupied cells            */
        long descriptor[ROW_WIDTH];     /* occupied descriptors       */
};

struct row_chain_def {
        struct row_def *first_row;  /* first row pointer              */
        struct row_def *final_row;  /* final row pointer              */
        int number_of_rows;             /* last occupied row          */
};

struct plc_def {
        char name[64];                  /* current active control name */
```

```
    char addr[6];              /* eithernet adr. of active controller  */
    int comm_id;               /* id of active controller              */
    int model_no;              /* plc model number 497/418/50/etc      */
    int is_smart;              /* set by attach to a smart controller  */
    int is_attached;           /* attached to controller flag          */
    int is_fully_attached;     /* attached and ladders match flag      */
    int is_attaching;          /* we're going through the processes    */
    int is_having_problems;    /* network is retrying                  */
    int update_mode;           /* selects how changes are made in run  */
    int data_table_mask;       /* mask for significant word offsets    */
    int e3_is_healthy;         /* threecom is alright flag             */
};

char *getmem(), *getml();
struct row_def *add_row(), *rung_top();

/* ---------------------- ladder macro definitions ---------------------- */
define ths(r)                  (r)
define lst(r)                  (r)->last_row
define nxt(r)                  (r)->next_row
define ths_ioc(r)              ths(r)->is.occupied
define lst_ioc(r)              lst(r)->is.occupied
define nxt_ioc(r)              nxt(r)->is.occupied
define ths_ivs(r)              ths(r)->is_vert_shorted
define lst_ivs(r)              lst(r)->is_vert_shorted
define nxt_ivs(r)              nxt(r)->is_vert_shorted
define ox(c)                   (c)->offset.x
define oy(c)                   (c)->offset.y define is_top_of_rung(r)       (!lst(r) || ((lst_ioc(r) || lst_ivs(r)) && !ths_ivs(r)))
define is_bottom_of_rung(r)    (!nxt(r) || ((ths_ioc(r) || ths_ivs(r)) && !nxt_ivs(r)))
define is_top_of_element(c)    ((c)->is.primary || !(c)->offset.y)
define is_left_of_element(c)   ((c)->is.primary || !(c)->offset.x)
define is_top_left_of_element(c) ((c)->is.primary || !(c)->has.offset)
define was_attached_on_bottom(r,c)  (nxt(r) && !nxt(r)->cells[c].is.primary && nxt(r)->cells[c].offset.y != 0)
```

```
define primary_cell(r,c)            ((c)->is.primary ? (c) : &add_row(r, -oy(c))->cells[c - (r)->cells - ox(c)])
define x_offset(c)                  ((c)->is.primary ? 0  : (c)->offset.x)
define y_offset(c)                  ((c)->is.primary ? 0  : (c)->offset.y)

define are_shorts_up(r,c1,c2)       (    (r)->is_vert_shorted &    ((1 << (c2+1)) - (1 << (c1))))
define are_shorts_down(r,c1,c2)     (nxt(r)->is_vert_shorted &     ((1 << (c2+1)) - (1 << (c1))))
define clear_shorts_up(r,c1,c2)     (    (r)->is_vert_shorted &= ~((1 << (c2+1)) - (1 << (c1))))
define clear_shorts_down(r,c1,c2)   (nxt(r)->is_vert_shorted &= ~((1 << (c2+1)) - (1 << (c1))))

define is_connectable(c)            (  (c)->is.primary ||   (c)->has.leg)
define is_connectable_on_left(c)    ((c-1)->is.primary || (c-1)->has.leg)
define is_connectable_on_right(c)   ((c+1)->is.primary || (c+1)->has.leg)
define is_connected_on_left(c)      (is_connectable(c) && is_connectable_on_left(c))
define is_connected_on_right(c)     (is_connectable(c) && is_connectable_on_right(c))

define is_shorted_up_on_left(r,c)    (lst(r) && (    (r)->is_vert_shorted >> (c)   & 1))
define is_shorted_up_on_right(r,c)   (lst(r) && (    (r)->is_vert_shorted >> (c)+1 & 1))
define is_shorted_down_on_left(r,c)  (nxt(r) && (nxt(r)->is_vert_shorted >> (c)    & 1))
define is_shorted_down_on_right(r,c) (nxt(r) && (nxt(r)->is_vert_shorted >> (c)+1 & 1))

define short_up_on_left(r,c)        (    (r)->is_vert_shorted |= 1 << (c))
define short_up_on_right(r,c)       (    (r)->is_vert_shorted |= 1 << (c) + 1)
define short_down_on_left(r,c)      (nxt(r)->is_vert_shorted |= 1 << (c))
define short_down_on_right(r,c)     (nxt(r)->is_vert_shorted |= 1 << (c) + 1)

define clear_up_on_left(r,c)        (    (r)->is_vert_shorted &= ~(1 << (c)))
define clear_up_on_right(r,c)       (    (r)->is_vert_shorted &= ~(1 << (c) + 1))
define clear_down_on_left(r,c)      (nxt(r)->is_vert_shorted &= ~(1 << (c)))
define clear_down_on_right(r,c)     (nxt(r)->is_vert_shorted &= ~(1 << (c) + 1))

define clear_straddle(r)            ((r)->is_vert_shorted &= ~STRADDLE)
define set_straddle(r)              ((r)->is_vert_shorted |=  STRADDLE)
define is_straddle(r)               ((r)->is_vert_shorted &   STRADDLE)
define short_is_in_area(r,c)        ((r)->is.in_area && area.left.column_number <  c && c <=
                                      area.right.column_number)
define element_is_in_area(r,c)      ((r)->is.in_area && area.left.column_number <= c && c <=
                                      area.right.column_number)
``` a

```c
/*title*/
/* menu.h -- ladder menus 1.00 -- (c) 1985 Pertron Controls    */

/* ---------------------- ladder mode indices ---------------------- */
define COMMAND_MODE      0          /* command mode                */
define ELEMENT_MODE      1          /* element mode                */
define LINE_MODE         2          /* line drawing mode           */
define DATA_MODE         3          /* data monitor mode           */
define SYMBOL_MODE       4          /* symbol table mode           */

/* ---------------------- command menu indices ---------------------- */
define FILE_MENU         0          /* dos file type commands menu         */
define REMOTE_MENU       1          /* remote commands menu                */
define FINDPRINT_MENU    2          /* find and print type commands menu   */
define AREA_MENU         3          /* area type commands menu             */
define INSERT_MENU       4          /* insert commands menu                */
define DELETE_MENU       5          /* delete commands menu                */
define ATTACH_MENU       6          /* attach selection menu               */
define MARK_AREA_MENU    7          /* mark area selection menu            */
define FIND_ELEM_MENU    8          /* find element selection menu         */
define FIND_WORD_MENU    9          /* find word/bit selection menu        */
define FIND_COIL_MENU    10         /* find coil selection menu            */
define RPLC_WORD_MENU    11         /* replace word/bit selection menu     */

/* ---------------------- line menu indices ---------------------- */
define MOVE_LINE_MENU    0          /* non-draw/non-erase commands menu    */
define DRAW_LINE_MENU    1          /* draw line commands menu             */
define ERASE_LINE_MENU   2          /* erase line commands menu            */

/* ---------------------- symbol mode indices ---------------------- */
define BIT_MAP           0          /* bit map symbol mode                 */
define WORD_MAP          1          /* word map symbol mode                */

/* ---------------------- miscellanious definitions ---------------------- */
define NULL_MENU     ((struct menu_def *)0)
```

```c
/* ----------------------- function declarations -------------------------- */
define NULL_FUNC       0           /* number for do nothing operation      */
define CHG_MODE        1           /* number for mode change operation     */
define CHG_MENU        2           /* number for menu change operation     */
define CONTACT_INSERT  3           /* number for contact insert operation  */
define COIL_INSERT     4           /* number for coil insert operation     */
define SHORT_INSERT    5           /* number for short insert operation    */

/* ------------------------ structure definitions ------------------------- */
struct menu_def {                   /* -------- menu table structure ------ */
        char *verbage[3];           /* menu script for bottom three lines   */
        int base_scan_code;         /* base scan code for function keys     */
        struct key_rsp {            /* how we respond to each menu option   */
                int (*fcn)();       /* response data (function pointer)     */
                int index;          /* response data (integer index)        */
        } response[10];
};

/*title*/
/* plcbios.h - plc rom bios header (c) 1986 Pertron Controls */
/* --------------------------------------------------------------------- */
/*      this is the plc rom bios c file header. it defines all of the    */
/*  global data used by the plc, and is intended to be included in all   */
/*  of the plc rom and downloded code c files. for the rom c files, it   */
/*  would suffice to declare the globals simply, since those files are   */
/*  compiled with absoulute data addressing. however, because the down-  */
/*  loaded code c files must use pc relative data addressing for their   */
/*  internal globals, the public globals of this header are defined as   */
/*  absoulute memory addresses cast into variables.                      */
/* --------------------------------------------------------------------- */ typedef unsigned char  byte;
typedef unsigned short word;
typedef unsigned int   lword;

/* ================================== 68010 memory map
```

```
/* name           address range    device   special considerations     */
/*----------      -------------    ------   ----------------------     */
define prom       ((word *)0x000000) /*-0x03ffff 2x27256                     */
define ram        ((word *)0x040000) /*-0x07ffff 9x55257  (parity checked)   */
define bios_ram   ((word *)0x040000) /*-0x040fff          (used for bios variable storage)*/
define top_of_bios_ram ((word *)0x041000) /*                                 */
define ram_pool   ((word *)0x041000) /*-0x07ffff          (used for memory allocation)  */
define ctrl_str   ((lword *)0x080000) /*-0x0bffff 9x55257 (word access only, parity chk) */
define op_str     ((word *)0x0c0000) /*-0x0cffff 2x55257 (word access only)  */
define int_ack    ((word *)0xffffff0) /*-0xffffff         (interrupt acknowledge space) */

/* --- 68010 memory region sizes --- */
define PROM_WORDS          0x008000L         /* words of prom      ( 64K bytes)    */
define MAX_RAM_WORDS       0x020000L         /* words of ram                 (256K bytes) */
define BIOS_RAM_WORDS      0x000800L         /* words of bios ram  ( 4K bytes)    */
define MAX_RAM_POOL_WORDS  0x01f800L         /* words of ram pool            (252K bytes) */
define MAX_CTRL_STR_LONGS  0x010000L         /* longs of control store (256K bytes) */
define MAX_OP_STR_WORDS    0x008000L         /* words of operand store ( 64K bytes) */

/* =============================== 68010 i/o map
   =============================== */
/*
/* name           address    device   special considerations       */
/*-------         -------    ------   ----------------------       */
define misc_in    (*(word *)0xa00000) /* 2 x 74hct240  (read only)     */
define misc_out   (*(word *)0xa00000) /* 1 x 74hct273  (write only)    */
define rack_enb   (*(word *)0xa30000) /* 1 x 74hct74                   */
define rack       ((byte *)0xa20000) /* rack         (byte access only, parity chk) */
define command    (*(struct lsn_cmd *)0xa10000) /* logic scanner         */
define pro_lance  (*(struct lan_chp *)0xa40000) /* 1 x AM7990            */
define rio_lance  (*(struct lan_chp *)0xa50000) /* 1 x AM7990            */
define clock      (*(struct clk_chp *)0xa60000) /* 1 x MM58274           */
```

```c
/* ============================ equipment flag bit definitions ============================ */ define EQ_PRO_LANCE        0x0001    /* programming local area network present flag */
define EQ_RIO_LANCE        0x0002    /* remote i/o local area network present flag  */
define EQ_REAL_TIME_CLK    0x0004    /* real time clock present flag                */
define EQ_LOGIC_CO_PROC    0x0008    /* logic co-processor present flag             */
define EQ_SMARTS           0x0010    /* downloaded code present flag                */

/* ============================ miscellaneous input/ouput bit definitions ============================ */

/* -------- input bit definitions -------- */
define KEY_SWITCH          0xf000    /* keyswitch bit positions        */
define KS_RUN_PRGM         0x8000    /* run/program switch position    */
define KS_RUN              0x4000    /* run switch position            */
define KS_TEST             0x2000    /* test switch position           */
define KS_PROGRAM          0x1000    /* program switch position        */
define BATTERY_OK          0x0800    /* battery ok bit                 */
define TIME_OUT_D          0x0400    /* keep alive counter msb         */
define RACK_ENABLED        0x0200    /* rack enabled bit               */
define POWER_CYCLE         0x0100    /* power cycled bit               */
define FAIL_SELECT         0x0080    /* rack failure mode select       */
define DOUBLE_DENSITY      0x0040    /* double density i/o select switch */
define DIPSWITCH           0x003f    /* 6 lsb from dipswitch           */

/* -------- output bit definitions -------- */
define POWER_UP_DONE       0x0080    /* power up complete bit          */
define RACK_NOT_CLEAR      0x0040    /* rack clear control (0 = clear) */
define DOWN_CNT            0x0020    /* keep alive cntr dir control    */
define SIA_LOOPBACK        0x0010    /* sia (DP8391) loopback control  */
define LEDS                0x000f    /* led bit positions              */
define LED_RUN             0x0008    /* run led       (green, top)     */
define LED_PROC            0x0004    /* processor led (red)            */
define LED_MEMORY          0x0002    /* memory led    (red)            */
define LED_BATTERY         0x0001    /* battery led   (red, bottom)    */

/*page*/
/* ============================ logic scanner definitions ============================ */
```

```c
struct lsn_cmd {                /* ------ logic scanner command definitions ------ */
    word run;                   /* write = go at [d15:d0], read = resume         */
    word rst_int;               /* read = reset interrupt                        */
    word halt;                  /* read = halt logic scanner                     */
};

define initial_branch              &ctrl_str[0]
define final_halt                  &ctrl_str[2]
define test_ladder                 &ctrl_str[4]
define ctrl_str_chk_sum            ctrl_str[6]
define ctrl_str_pool               &ctrl_str[8]
define INITIAL_BRANCH_ADDR         0x0000
define FINAL_HALT_ADDR             0x0001
define TEST_LDDR_ADDR              0x0002
define CTRL_STR_RESERVED_LONGS     8

/* ========================= clock register bit definitions ========================= */ struct clk_bcd {                /* ---- real time clock bcd register defintions ---- */
    word units, tens;           /* units followed by tens                        */
};

struct clk_chp {                /* -------- real time clock definitions -------- */
    word control_reg;           /*    clock control register                     */
    word seconds_tenths;        /* (0:9) tenths of seconds, read only            */
    struct clk_bcd seconds;     /* (0:9) seconds (0:5) tens of seconds           */
    struct clk_bcd minutes;     /* (0:9) minutes (0:5) tens of minutes           */
    struct clk_bcd hours;       /* (0:9) hours   (0:2) tens of hours             */
    struct clk_bcd days;        /* (0:9) days    (0:3) tens of days              */
    struct clk_bcd months;      /* (0:9) months  (0:1) tens of months            */
    struct clk_bcd years;       /* (0:9) years   (0:9) tens of years             */
    word week_day;              /* (1:7) day of the week                         */
    word setting_reg;           /*    clock setting/interrupt register           */
};

/* ---- clock control register bit definitons ---- */
```

```c
define DATA_CHG_FLAG       0x0008      /* data changed flag (read)              */
define TEST_MODE           0x0008      /* test mode select (write)              */
define CLOCK_STOP          0x0004      /* clock stop bit   (write)              */
define INTERRUPT_REG       0x0002      /* interrupt control (write)             */
define INTERRUPT_STOP      0x0001      /* interrupt stop    (write)             */

/* ---- clock setting register bit definitions ---- */
define LEAP_YEAR_CNTR      0x000c      /* leap year counter (0 = leap year)     */
define PM_FLAG             0x0002      /* pm indicator bit (1 = PM, 0 = AM)     */
define SET_24_HOUR         0x0001      /* 12/24 hour select (1 = 24, 0 = 12)    */ struct rtc_def {                        /* ---- real time clock routine return definitions ---- */
    unsigned years_thousands : 4;       /* (1,2) thousands of years              */
    unsigned years_hundreds  : 4;       /* (9,0) hundreds of years               */
    unsigned years_tens      : 4;       /* (0:9) tens of years                   */
    unsigned years_units     : 4;       /* (0:9) years                           */
    unsigned month_tens      : 4;       /* (0:1) tens of months                  */
    unsigned month_units     : 4;       /* (0:9) months                          */
    unsigned days_tens       : 4;       /* (0:3) tens of days                    */
    unsigned days_units      : 4;       /* (0:9) days                            */
    unsigned hours_tens      : 4;       /* (0:2) tens of hours                   */
    unsigned hours_units     : 4;       /* (0:9) hours                           */
    unsigned minutes_tens    : 4;       /* (0:5) tens of minutes                 */
    unsigned minutes_units   : 4;       /* (0:9) minutes                         */
    unsigned seconds_tens    : 4;       /* (0:5) tens of seconds                 */
    unsigned seconds_units   : 4;       /* (0:9) seconds                         */
    unsigned seconds_tenths  : 4;       /* (0:9) tenths of seconds               */
    unsigned week_day        : 4;       /* (1:7) day of the week                 */
};

/*page*/
/* ========================== lance register and bit definitions ========================== */ struct lan_chp {                        /* ---------- lance register definitons ---------- */
    word rdp;                           /* register data port                    */
    word rap;                           /* register address port                 */
};
```

```
/* ---------- lance register definitions ---------- */
define CSR0    0       /* control/status register 0        */
define CSR1    1       /* control/status register 1        */
define CSR2    2       /* control/status register 2        */
define CSR3    3       /* control/status register 3        */

/* --- control/status register 0 bit definitions --- */
define ERR     0x8000  /* error                            */
define BABL    0x4000  /* babble                           */
define CERR    0x2000  /* collision error                  */
define MISS    0x1000  /* missed frame                     */
define MERR    0x0800  /* memory error                     */
define RINT    0x0400  /* receiver interrupt               */
define TINT    0x0200  /* transmitter interrupt            */
define IDON    0x0100  /* initialization done              */
define INTR    0x0080  /* interrupt flag                   */
define INEA    0x0040  /* interrupt enable                 */
define RXON    0x0020  /* receiver on                      */
define TXON    0x0010  /* transmitter on                   */
define TDMD    0x0008  /* transmit demand                  */
define STOP    0x0004  /* stop                             */
define STRT    0x0002  /* start                            */
define INIT    0x0001  /* initialize                       */

/* --- control/status register 3 bit definitions --- */
define BCON    0x0001  /* byte control                     */
define ACON    0x0002  /* ale control                      */
define BSWP    0x0004  /* byte swap                        */

/* ================== lance initialization block definitions ================== */ struct iblk_def {               /* ------- initialization block definition ------- */
    word mode;                  /* mode register                            */
    word padr[3];               /* physical address                         */
    word ladrf[4];              /* logical address filter                   */
    word rdra_low;              /* receive descriptor ring address (low 16 bits) */
    byte rlen;                  /* receive ring length                      */
```

```
        byte rdra_high;         /* receive descriptor ring address (high 8 bits)  */
        word tdra_low;          /* transmit descriptor ring address (low 16 bits) */
        byte tlen;              /* transmit ring length                           */
        word tdra_high;         /* transmit descriptor ring address (high 8 bits) */
};

/* --------- mode register bit definitions ---------- */ define PROM    0x8000          /* promiscuous mode enable                        */
define INTL    0x0040          /* internal loopback (use in loopback)            */
define DRTY    0x0020          /* retry disable                                  */
define COLL    0x0010          /* force collision (use in loopback)              */
define DTCR    0x0008          /* transmit crc disable                           */
define LOOP    0x0004          /* loopback enable                                */
define DTX     0x0002          /* transmitter disable                            */
define DRX     0x0001          /* receiver disable                               */

/* ============================ lance descriptor ring definitions ============================ */ struct ring_entry {             /* ------------- descriptor ring entry --------------- */
        word badr_low;          /* buffer address bits (15:00)                    */
        byte stat1;             /* status byte 1                                  */
        byte badr_high;         /* buffer address bits (23:16)                    */
        word bcnt;              /* buffer count                                   */
        word stat2;             /* status word 2 (message count for receive)      */
};
                                /* ------- universal status bit definitions --------- */
define OWN     0x0080          /* ownership (0=host, 1=chip)                     */
define PERR    0x0040          /* frame error                                    */
define STP     0x0002          /* start of frame                                 */
define ENP     0x0001          /* end of frame                                   */

/* ---------- rstat bit assignments --------------- */
define FRAM    0x0020          /* framing error                                  */
define OFLO    0x0010          /* overflow error                                 */
define CRC     0x0008          /* crc error                                      */
define RBUFF   0x0004          /* buffer error                                   */
/*page*/
```

```c
/* ---------- tstat1 bit definitions ---------- */
define MORE      0x0010      /* more than one retry indicator            */
define ONE       0x0008      /* exactly one retry indicator              */
define DEF       0x0004      /* frame deferred indicator                 */

/* ---------- tstat2 bit definitions ---------- */
define TBUFF     0x8000      /* buffer error                             */
define UFLO      0x4000      /* underflow error                          */
define LCOL      0x1000      /* late collision error                     */
define LCAR      0x0800      /* loss of carrier                          */
define RTRY      0x0400      /* retry error                              */
define TDR       0x03ff      /* time domain reflectometer                */

/* ================= high level lance structure definitions ================= */
define PRO_BASE_ADDR    0x0000    /* lower 16 bits of base address for programming lan */
define RIO_BASE_ADDR    0x0080    /* lower 16 bits of base address for remote i/o lan  */
define TST_BASE_ADDR    0x0100    /* lower 16 bits of base address for self test       */ struct desc_ring {                     /* ---------- descriptor ring structure ---------- */
    lword ring_entries;                /* number of entries in ring (power of 2, 1 - 128) */
    struct ring_entry *ring_beg;       /* pointer to first ring entry                     */
    struct ring_entry *ring_ptr;       /* pointer to current ring entry                   */
    struct ring_entry *ring_end;       /* pointer to one past last ring entry             */
    lword counter;                     /* free running frame counter                      */
    byte **buffer_beg;                 /* pointer to array of buffer pointers             */
    byte **buffer_ptr;                 /* pointer to current buffer pointer               */
    lword buffer_bytes;                /* bytes in each buffer in array                   */
};

struct lance_desc {                    /* ------ lance control descriptor structure ------ */
    struct lan_chip *lance_addr;       /* pointer to lance chip itself                    */
    struct iblk_def *init_blk_ptr;     /* pointer to initialization block for lance       */
    lword event_base;                  /* base event number for this lance                */
    word cerr_cntr;                    /* collision error counter                         */
    word miss_cntr;                    /* missed frame error counter                      */
    word csr3_copy;                    /* copy of ctrl/stat reg 3                         */
    word physical_addr[3];             /* physical address base for this network          */
    word logical_filter[4];            /* logical address hash filter for this node       */
    struct desc_ring xmt;              /* transmit descriptor ring                        */
```

```
        struct desc_ring rcv;              /* receive descriptor ring                          */
};

struct phys_hdr_def {                      /* -- physical frame header definition for lance -- */
        word dst_addr[3];                  /* destination address (48 bits)                    */
        word src_addr[3];                  /* source address (48 bits)                         */
        word phys_len;                     /* physical length of frame (including header info) */
        word error;                        /* error status for frame                           */
        lword time_stamp;                  /* time stamp for receive frame in milliseconds     */
        lword number;                      /* free running frame counter                       */
};

struct log_hdr_def {                       /* --- logical frame header definition for lance -- */
        word num;                          /* logical block number for frame                   */
        word type;                         /* frame type for frame                             */
        word log_len;                      /* logical length of data portion of frame          */
        word cmd;                          /* command in control frame                         */
};

struct frame_def {                         /* ---------- frame definition for lance ---------- */
        struct phys_hdr_def phys_hdr;      /* physical header information                      */
        struct log_hdr_def log_hdr;        /* logical header information                       */
        byte data[1360];                   /* data array                                       */
        word crc[2];                       /* crc for frame                                    */
};

struct mini_frame {                        /* ---------- mini frame used for testing --------- */
        word dst_addr[3];                  /* destination address (48 bits)                    */
        word src_addr[3];                  /* source address (48 bits)                         */
        word phys_len;                     /* physical length of frame (including header info) */
        word error;                        /* error status for frame                           */
        byte mini_data[12];                /* data for frame                                   */
        word crc[2];                       /* crc for frame                                    */
};

/*page*/
/* ========================= task executive definitions ========================= */
```

```c
struct task_info_def {                /* ---------- task information structure ---------- */
    byte id[4];                       /* 4 character task name (identifier)    */
    hword (*entry_pt)();              /* pointer to entry point                */
    hword stack_bytes;                /* desired stack size (in bytes) for task */
    hword queue_entries;              /* desired queue size (in entries) for task */
};

struct task_handle_def {              /* ---------- task information structure ---------- */
    byte id[4];                       /* 4 character task name (identifier)    */
    byte handle[4];                   /* 4 character handle of entry point     */
    hword stack_bytes;                /* desired stack size (in bytes) for task */
    hword queue_entries;              /* desired queue size (in entries) for task */
};

struct tcb_template {                 /* ---------- task control block structure ---------- */
    word suspend_flags;               /* suspension flags and info             */
    word timer;                       /* timeout timer                         */
    byte task_id[4];                  /* task id                               */
    byte *stack_top;                  /* stack pointer when task was started   */
    byte *stack;                      /* stack pointer when task was disabled  */
    byte **old_msg_que;               /* oldest message queue entry            */
    byte **new_msg_que;               /* newest message queue entry            */
    byte **beg_msg_que;               /* start of queue                        */
    byte **end_msg_que;               /* end of queue                          */
};

/* ---------- task executive definitions ---------- */
define TICK              10          /* task tick time (10 ms)                */
                                      /* events                                */
define IDON_EVENT        0           /* offset for lance initialization done event */
define RINT_EVENT        1           /* offset for lance receive event        */
define TINT_EVENT        2           /* offset for lance transmit event       */
define RIO_EVENT_BASE    0           /* base event number for remote i/o lance events */
define PRO_EVENT_BASE    3           /* base event number for programming lance events */
define LSCN_DONE_EVENT   6           /* event number for logic scan complete event */
                                      /* resources                             */
define LOGIC_SCANNER     0           /* logic scanner hardware resource       */
define CODE_CHAIN        1           /* code chain resource number            */
```

```c
define RAM_POOL_ALLOC    2           /* ram pool memory allocation resource    */
define CTRL_STR_ALLOC    3           /* control store memory allocation resource */
define REAL_TIME_CLOCK   4           /* real time clock resource               */

/* ========================= bios time base definitions ========================= */ struct bios_tmr_def {                 /* --- bios timers used to call user tick routines --- */
    word ms_units;                    /* millisecond counter    (counts down from 10 to 0) */
    word ms_tens;                     /* 10s of milliseconds    (counts down from 10 to 0) */
    word ms_hundreds;                 /* 100s of milliseconds   (counts down from 10 to 0) */
    word sec_units;                   /* seconds counter        (counts down from 10 to 0) */
};

/* ========================= downloaded code definitons ========================= */ define CONSTRUCTOR   0x0000          /* vector for constructor code (executed when inserted) */
define DESTRUCTOR    0xffff          /* vector for destructor code  (executed when deleted)  */ struct code_hdr {                     /* --- header for block of downloaded 68010 code --- */
    char name[16];                    /* id and version of downloaded code      */
    word check_sum;                   /* check sum of code space                */
    word num_entry_pts;               /* number of entry points                 */
    word code_words;                  /* number of words of code space          */
    word data_offset;                 /* number of words of static data space   */
    word data_words;                  /* number of words of non-static data space */
    word total_words;                 /* number of words for entire module      */
    struct code_hdr *next_code;       /* pointer to next block of code          */
};

struct raw_code_hdr {                 /* -- raw header for yet to be downloaded 68010 code -- */
    char name[16];                    /* id and version of downloaded code      */
```

```c
        word check_sum;                 /* check sum of code space                              */
        word num_entry_pts;             /* number of entry points                               */
        lword static_offset;            /* offset in bytes to end of code space                 */
        lword data_offset;              /* offset in bytes to end of static data space          */
        lword end_offset;               /* offset in bytes to end of non-static data space      */
};

struct entry_def {                      /* ---- entry point definition array structure ----     */
        void (*function)();             /* pointer to function                                  */
        char vector_handle[4];          /* vector handle this entry is associated with          */
        struct entry_def *last_entry_pt;/* ptr to last entry pt in linked list for this vector  */
        struct entry_def *next_entry_pt;/* ptr to next entry pt in linked list for this vector  */
};

struct phys_entry_def {                 /* ---- physical entry point array structure ----       */
        word branch_always;             /* branch always instruction                            */
        word offset;                    /* branch always offset                                 */
        word vector_number;             /* vector number this entry is associated with          */
        word check_sum;                 /* checksum of entry point header                       */
        struct phys_entry_def *last_entry_pt;/* ptr to last entry pt in linked list for this vec*/
        struct phys_entry_def *next_entry_pt;/* ptr to next entry pt in linked list for this vec*/
};

/* ============================== block transfer definitons ============================== */

/* ---- block transfer enable/done bit masks ------- */
define BLK_XFER_RD     0x0080          /* blk xfer read byte mask                              */
define BLK_XFER_WR     0x0040          /* blk xfer write byte mask                             */ struct blk_xfer_def {                   /* ---- block transfer linked list member ----          */
        word *aux_ptr;                  /* pointer to auxiliary data for blk xfer (unique)      */
        struct blk_xfer_def *next_ref;  /* pointer to next ref in list                          */
        word *file_ptr;                 /* address of file for blk xfer                         */
        word module_addr;               /* address of blk xfer module                           */
        byte file_size;                 /* maximum file size in words                           */
        byte enables;                   /* read/write enable flags                              */
};
```

```c
struct blk_xfer_hdr {                   /* ------ block transfer linked list header ------- */
    lword checksum;                     /* checksum of linked list                          */
    struct blk_xfer_def *first_ref;     /* pointer to first ref in list                     */
};
```

/* =========================================== miscellaneous definitons =========================================== */

```c
define bytesof(obj)           (sizeof(obj)/sizeof(byte))
define wordsof(obj)           (sizeof(obj)/sizeof(word))
define longsof(obj)           (sizeof(obj)/sizeof(long))
define quadsof(obj)           (sizeof(obj)/(4*sizeof(word)))
define byte_offset(p1,p2)     ((byte *)(p1) - (byte *)(p2))
define word_offset(p1,p2)     ((word *)(p1) - (word *)(p2))
define long_offset(p1,p2)     ((long *)(p1) - (long *)(p2))
define execute(fp)            *(void (*)())(fp)
define msw(n)                 (((word *)&n)[0])
define lsw(n)                 (((word *)&n)[1])
define msb(n)                 (((byte *)&n)[0])
define lsb(n)                 (((byte *)&n)[1])
define not_byte(n)            ((n)^0x00ff)
define not_word(n)            ((n)^0xffff)
define not_long(n)            (~(n))
define BRA                    0x6000
define NULL                   ((void *)0)
define TRUE                   1
define FALSE                  0
define NO_DIFF                0
define NO_ERROR               0
```

/*
============================================================================
=========== */

/* plc bios entry point definitions                                         */

/*
============================================================================
=========== */

```c
define virt_fcn(vector, type)    (*((type(**)())0x040000)[vector])
define frame                     struct frame_def
```

```
define bx_ptr                  struct blk_xfer_def *
define fcn_ptr                 void (*)()

define usr_ticks               &virt_fcn(64, fcn_ptr)
define usr_tick_1ms            virt_fcn(64, fcn_ptr)
define usr_tick_10ms           virt_fcn(65, fcn_ptr)
define usr_tick_100ms          virt_fcn(66, fcn_ptr)
define usr_tick_1sec           virt_fcn(67, fcn_ptr)
define usr_tick_10sec          virt_fcn(68, fcn_ptr)
define cold_boot               virt_fcn(69, void  )
define warm_boot               virt_fcn(70, void  )
define code_chain_sum          virt_fcn(71, word  )
define clr_code_data           virt_fcn(72, void  )
define self_test               virt_fcn(73, void  )
define handle_to_vec           virt_fcn(74, hword )
define init_task_exec          virt_fcn(75, void  )
define dispatcher              virt_fcn(76, void  )
define chk_event               virt_fcn(77, hword )
define chk_last_msg            virt_fcn(78, byte *)
define chk_next_msg            virt_fcn(79, byte *)
define chk_owner               virt_fcn(80, hword )
define clr_event               virt_fcn(81, hword )
define event_trigger           virt_fcn(82, void  )
define fetch                   virt_fcn(83, hword )
define queue_empty             virt_fcn(84, hword )
define queue_full              virt_fcn(85, hword )
define receive_msg             virt_fcn(86, byte *)
define release                 virt_fcn(87, void  )
define restart_task            virt_fcn(88, void  )
define send_msg                virt_fcn(89, hword )
define suspend_task            virt_fcn(90, void  )
define wait_event              virt_fcn(91, hword )
define wait_msg                virt_fcn(92, hword )
define wait_time               virt_fcn(93, hword )
define wait_sponge             virt_fcn(94, hword )
define wake_task               virt_fcn(95, void  )
define init_quad_alloc         virt_fcn(96, hword )
define quad_alloc_sum          virt_fcn(97, hword )
```

```
define getquads1            virt_fcn(98, byte * )
define rlsquads1            virt_fcn(99, hword )
define rstquads1            virt_fcn(100, hword )
define getquads2            virt_fcn(101, byte * )
define rlsquads2            virt_fcn(102, hword )
define rstquads2            virt_fcn(103, hword )
define quadsleft            virt_fcn(104, hword )
define rio_monitor          virt_fcn(105, void )
define pro_monitor          virt_fcn(106, void )
define comm_task            virt_fcn(107, void )
define cmd_handler          virt_fcn(108, hword )
define xmt_select           virt_fcn(109, hword )
define xmt_poll             virt_fcn(110, hword )
define rcv_cmd              virt_fcn(111, hword )
define rej_cmd              virt_fcn(112, void )
define xmt_msg              virt_fcn(113, hword )
define rcv_msg              virt_fcn(114, hword )
define init_lance           virt_fcn(115, hword )
define kill_lance           virt_fcn(116, hword )
define start_lance          virt_fcn(117, hword )
define stop_lance           virt_fcn(118, hword )
define xmt_frame            virt_fcn(119, hword )
define rtv_frame            virt_fcn(120, hword )
define rcv_frame            virt_fcn(121, frame *)
define rls_frame            virt_fcn(122, hword )
define read_rtc             virt_fcn(123, void )
define write_rtc            virt_fcn(124, void )
define scan_racks           virt_fcn(125, void )
define service_blk_xfer     virt_fcn(126, void )
define add_blk_xfer         virt_fcn(127, bx_ptr )
define remove_blk_xfer      virt_fcn(128, void )
define checksum_blk_xfer    virt_fcn(129, hword )
define set_misc_out         virt_fcn(130, hword )
define clr_misc_out         virt_fcn(131, hword )
define get_misc_out         virt_fcn(132, hword )
define keep_alive           virt_fcn(133, void )
define dis_int              virt_fcn(134, void )
define enb_int              virt_fcn(135, void )
```

```
define setbytes        virt_fcn(136, hword )
define movbytes        virt_fcn(137, hword )
define repbytes        virt_fcn(138, hword )
define cmpbytes        virt_fcn(139, int   )
define sumbytes        virt_fcn(140, hword )
define setwords        virt_fcn(141, hword )
define movwords        virt_fcn(142, hword )
define repwords        virt_fcn(143, hword )
define cmpwords        virt_fcn(144, int   )
define sumwords        virt_fcn(145, hword )
define swapwords       virt_fcn(146, hword )
define setlongs        virt_fcn(147, hword )
define movlongs        virt_fcn(148, hword )
define replongs        virt_fcn(149, hword )
define cmplongs        virt_fcn(150, int   )
define sumlongs        virt_fcn(151, hword )
define atoi            virt_fcn(152, int   )
define atof            virt_fcn(153, double )
define itoa            virt_fcn(154, int   )
define itostr          virt_fcn(155, int   )
define strlen          virt_fcn(156, int   )
define strcat          virt_fcn(157, char * )
define strchr          virt_fcn(158, char * )
define strcmp          virt_fcn(159, int   )
define strcpy          virt_fcn(160, char * )
define strspn          virt_fcn(161, int   )
define strtok          virt_fcn(162, char * )
define strtol          virt_fcn(163, long  )
define strncat         virt_fcn(164, char * )
define strrchr         virt_fcn(165, char * )
define strncmp         virt_fcn(166, int   )
define strncpy         virt_fcn(167, char * )
define strcspn         virt_fcn(168, int   )
define strpbrk         virt_fcn(169, char * )
define swab            virt_fcn(170, void  )
define abs             virt_fcn(171, int   )
define fabs            virt_fcn(172, double )
define sin             virt_fcn(173, double )
```

```
define cos          virt_fcn(174, double )
define tan          virt_fcn(175, double )
define asin         virt_fcn(176, double )
define acos         virt_fcn(177, double )
define atan         virt_fcn(178, double )
define atan2        virt_fcn(179, double )
define sinh         virt_fcn(180, double )
define cosh         virt_fcn(181, double )
define tanh         virt_fcn(182, double )
define sqrt         virt_fcn(183, double )
define log          virt_fcn(184, double )
define log10        virt_fcn(185, double )
define pow          virt_fcn(186, double )
define exp          virt_fcn(187, double )
define jn           virt_fcn(188, double )
define j0           virt_fcn(189, double )
define j1           virt_fcn(190, double )
define erf          virt_fcn(191, double )
define erfc         virt_fcn(192, double )
define rand         virt_fcn(193, int    )
define srand        virt_fcn(194, void   )
define qsort        virt_fcn(195, void   )

/*page*/
/*
==================================================================
======== */
/* plc bios data definitions                                    */
/*
==================================================================
======== */ define FW_VER_NUM          0x1000                  /* firmware version number      */
define dflt_vector_tbl     ((hword (**)())0x000400)  /* default virtual vector values */
define dflt_handle_tbl     ((hword *)0x000800)      /* default vector handle table
 */
define virt_vector_tbl     ((hword (**)())0x040000)  /* virtual vector table         */
```

```c
define virt_handle_tbl         ((lword *)0x040400)           /* virtual vector handle table */ define dflt_vec_chk_sum        (*(word *)0x040000)           /* default vector table checksum */
define virt_vec_chk_sum        (*(word *)0x040002)           /* virtual vector table checksum */
define crash_buffer            ((hword *)0x040800)           /* contains register values after crash */ define ram_quads               (*(hword *)0x040840)          /* size of ram in quadwords */
define ctrl_str_quads          (*(hword *)0x040844)          /* size of control store in quadwords */
define op_str_quads            (*(hword *)0x040848)          /* size of operand store in quadwords */
define equip_flag              (*(hword *)0x04084C)          /* equipment flag */
define last_attached           (*(struct rtc_def *)0x040850) /* time last attached */
define last_modified           (*(struct rtc_def *)0x040858) /* time last modified */
define code_chain              (*(struct code_hdr **)0x040860) /* start of downloaded code chain */
define task_info_tbl           (*(struct task_info_def **)0x040864) /* normal task information table */
define volatile_data           ((word *)0x040868)            /* start of volatile data area */ define num_tasks()             (*(word *)0x040868)           /* number of tasks */ define mmisc_out               (*(word *)0x04086A)           /* mirror of the misc output port */
define current_tcb             (*(struct tcb_template **)0x04086C) /* tcb of running task, 0=dispatcher */
define bios_timer              (*(struct bios_tmr_def *)0x040870) /* bios timers */ define ms_counter              (*(hword *)0x040878)          /* free running millisecond counter */
define dispatch_defer          (*(word *)0x04087C)           /* dispatcher defer flag */
define dispatch_req            (*(word *)0x04087E)           /* dispatcher request flag */
define attached                (*(word *)0x040880)           /* attached to programmer flag */
define our_owner               ((byte *)0x040882)            /* programmers id */ define timer_vec_tbl           ((hword (**)())0x040890)      /* timer interrupt vector table */ define tex_flags               ((word *)0x0408A0)            /* event & resource flags */
define tex_fetches             ((word *)0x0408C0)            /* fetch counters */
define tcb_table               ((struct tcb_template *)0x0408E0) /* table of task control blocks */ define prolan                  (*(struct lance_desc *)0x040B20) /* programming lance descriptor table */
define riolan                  (*(struct lance_desc *)0x040B80) /* remote i/o lance descriptor table */
define errno                   ((hword *)0x040BE0)           /* error number for floating point math */
```

```c
                */
define _randx              ((hword *)0x040BE4)     /* random number generator seed
                */
define _lastp              ((hword *)0x040BE8)     /* last power
                */
define end_volatile_data   ((word *)0x040C00)      /* end of volatile data area      */ define VEC_TBL_WORDS       512
define TIC_TBL_WORDS       8

/* ========================= memory allocation definitions ========================= */ define get_non_volatile_words(n)   getquads1(ram_pool, (n)+3 >> 2)
define rls_non_volatile_words(p, n) rlsquads1(ram_pool, (p), (n)+3 >> 2)
define rst_non_volatile_ram()      rstquads1(ram_pool)
define get_volatile_words(n)       getquads2(ram_pool, (n)+3 >> 2)
define rls_volatile_words(p)       rlsquads2(ram_pool, p)
define rst_volatile_ram()          rstquads2(ram_pool)
define main_words_left()           (quadsleft(ram_pool) << 2)

define get_ctrl_str_ram(n)  (struct afl_def *)(getquads1(ctrl_str_pool, n))
define rls_ctrl_str_ram(p, n)      rlsquads1(ctrl_str_pool, p, n)
define rst_ctrl_str_ram()          rstquads1(ctrl_str_pool)
define ctrl_str_left()             quadsleft(ctrl_str_pool)
/*title*/
/* plcdnl.h - plc downloaded code include file (c) 1986 Pertron Controls */

/* ========================= constant defintions ========================= */
define MODE            0x0070    /* logical scan state definitions     */
define PROGRAM_MODE            0x0010    /* program mode                 */
define TEST_MODE       0x0020    /* test mode                          */
define RUN_MODE        0x0040    /* run mode                           */
define DIRTY           0x0080    /* dirty mode                         */
                                  /* control word bit definitions       */
define MCR_FORCE       0x4000    /* master control relay override bit  */
define MCR_OFF                 0x8000    /* master control relay bit     */
                                  /* event number definitions           */
```

```
define LSCN_START_EVENT      7       /* start logic scan event number      */
define SCAN_DONE_EVENT       8       /* scan complete event number         */
                                      /* scan error definitions             */
define RSRC_ERROR            1       /* unable to aquire scanner resource  */
define LTIM_ERROR            2       /* max logic scan time exceeded       */
define TTIM_ERROR            3       /* max total scan time exceeded       */
define WDOG_ERROR            4       /* max watch dog time exceeded        */
define RACK_ERROR            5       /* rack bus error occurred            */
define LPAR_ERROR            6       /* logic scanner parity error occured */
define PRST_ERROR            7       /* processor reset error occurred     */
define BXFR_ERROR            8       /* bad block transfer occured         */
                                      /* null pointer definitions           */
define NO_RUNG    ((struct rung_def *)0)   /* null rung pointer            */
define NO_REF     ((struct ref_def *)0)    /* null reference pointer       */

/* ========================= macro & constant defintions ================== */
define fetch_scanner()     (fetch(LOGIC_SCANNER, 10000/TICK) ? 0 : proc_error(RSRC_ERROR))
define release_scanner()   (release(LOGIC_SCANNER))
define longsum(l)          (((word *)&(l))[0] + ((word *)&(l))[1])
define update_src_long(ol,nl)  (source_checksum += longsum(nl) - longsum(ol), (ol) = (nl))

/* ========================= structure defintions ======================== */ struct time_base_def {              /* --- time base for timer instr --- */
    word timer_1ms;                 /* 1 ms timer                        */
    word timer_10ms;                /* 10 ms timer                       */
    word timer_100ms;               /* 100 ms timer                      */
    word timer_1sec;                /* 1 sec timer                       */
    word timer_10sec;               /* 10 sec timer                      */
};

struct lower_work_area_def {              /* --- lower work area definition --- */
    struct time_base_def time_base;       /* timer time base values             */
    word scan_ctrl_word;                  /* no. of racks, mcr & mcr override bits*/
    word scan_set_time;                   /* scan time set register             */
    word scan_stat_time;                  /* scan time status register          */
```

```c
};

struct upper_work_area_def {            /* --- upper work area definition ---   */
        struct rtc_def rtc_data;        /* real time clock data area            */
        word src_quads_left;            /* quadwords of source memory left      */
        word obj_quads_left;            /* quadwords of object memory left      */
        word err_stat_word;             /* error status on processor failure    */
        word plc_stat_word;             /* plc status word                      */
};

struct tbl_ptr_list {                           /* ------ data table area ptrs ------    */
        struct lower_work_area_def *lower_work_area;    /* lower work area      */
        word *outputs;                                  /* outputs              */
        struct upper_work_area_def *upper_work_area;    /* upper work area      */
        word *inputs;                                   /* inputs               */
};
/*title*/
/* stddefs.h -- standard definitions. Copyright (c) 1986 Pertron Controls */

/* ............................................................................
   ------ */
/* standard types
                   */
/* ............................................................................
   ------ */
typedef int             void;
typedef char            byte;
typedef unsigned        word;
typedef long            lword;

/* ............................................................................
   ------ */
/* standard structures
                   */
/* ............................................................................
   ------ */
```

```c
struct task_def {  /* --------------- task definition structure --------- */
        char task_id[4];        /* id, eott = end of task tbl       */
        int stack_size;         /* task stack size                  */
        int que_entries;        /* number of queue entries          */
        int (*entry_pt)();      /* task entry point                 */
};

struct rtc_def { /* --- real time clock routine return definitions --- */
        unsigned years_thousands : 4;   /* (1,2) thousands of years   */
        unsigned years_hundreds  : 4;   /* (9,0) hundreds of years    */
        unsigned years_tens      : 4;   /* (0:9) tens of years        */
        unsigned years_units     : 4;   /* (0:9) years                */
        unsigned month_tens      : 4;   /* (0:1) tens of months       */
        unsigned month_units     : 4;   /* (0:9) months               */
        unsigned days_tens       : 4;   /* (0:3) tens of days         */
        unsigned days_units      : 4;   /* (0:9) days                 */
        unsigned hours_tens      : 4;   /* (0:2) tens of hours        */
        unsigned hours_units     : 4;   /* (0:9) hours                */
        unsigned minutes_tens    : 4;   /* (0:5) tens of minutes      */
        unsigned minutes_units   : 4;   /* (0:9) minutes              */
        unsigned seconds_tens    : 4;   /* (0:5) tens of seconds      */
        unsigned seconds_units   : 4;   /* (0:9) seconds              */
        unsigned seconds_tenths  : 4;   /* (0:9) tenths of seconds    */
        unsigned week_day        : 4;   /* (1:7) day of the week      */
};

struct XREG {   word    ax, bx, cx, dx, si, di; };
struct HREG {   byte al,ah,bl,bh,cl,ch,dl,dh;   };
union REGS {    struct XREG x; struct HREG h;   };

/* ------------------------------------------------------------------------
   ------ */
/* standard equates
                    */
/* ------------------------------------------------------------------------
```

```
----- */
define ON              1
define IN              1
define OK              1
define TRUE            1
define SET             1
define OFF             0
define OUT             0
define FALSE           0
define CLEAR           0
define NO_CAN_DO       0
define NONE            0
define NO_DIFF         0
define NO_ERROR        0
define NORMAL          0
define NULL_STR        ((char *)0)
define NULL_PTR        ((byte *)0)
define NULL_FCN        ((int(*)())0)
/* ----------------------------- misc  definitions -------------------------- */
define TICK            50          /* ms. per task exec clock tick */
define DENY_READ_WRITE 0x10        /* sharing mode equates for dos */
define DENY_WRITE      0x20        /* function 3dh (ver >= 3.0) */
define DENY_READ       0x30
define DENY_NONE       0x40
define MAYBE           -1
define YES             1
define NO              0
define FRESH           1
define REFRESH         0
define FORCE           1
define NO_FORCE        0
define EASY            0
define UP              1
define DOWN            2
define LEFT            4
define RIGHT           8
define NO_WAIT         0
define WAIT            1
```

```c
define FOREVER            2
define TEMPORARILY        4
define FORWARD            1
define BACKWARD           -1
/*page*/
/* ----------------- keyboard scancode definitions ----------------- */
define CUR_LEFT           0x4b00      /* left cursor key          */
define CUR_RIGHT          0x4d00      /* right cursor key         */
define CUR_UP             0x4800      /* up cursor key            */
define CUR_DOWN           0x5000      /* down cursor key          */
define CELL_LEFT          0x4b20      /* left cell key            */
define CELL_RIGHT         0x4d20      /* right cell key           */
define CELL_UP            0x4820      /* up cell key              */
define CELL_DOWN          0x5020      /* down cell key            */
define MOUSE_LEFT         0x011f      /* mouse left key           */
define MOUSE_RIGHT        0x0120      /* mouse right key          */
define MOUSE_UP           0x0112      /* mouse up key             */
define MOUSE_DOWN         0x012d      /* mouse down key           */
define PAGE_UP            0x4900      /* page up key              */
define PAGE_DOWN          0x5100      /* page down key            */
define CTRL_PAGE_UP       0x0184      /* control page up key      */
define CTRL_PAGE_DOWN     0x0176      /* control page down key    */
define INSERT_KEY         0x5200      /* insert key               */
define DELETE_KEY         0x5300      /* delete key               */
define HOME_KEY           0x4700      /* home key                 */
define END_KEY            0x4f00      /* end key                  */
define SHF_PAGE_UP        0x4920      /* shifted page up key      */
define SHF_PAGE_DOWN      0x5120      /* shifted page down key    */
define SHF_INSERT_KEY     0x5220      /* shifted insert key       */
define SHF_DELETE_KEY     0x5320      /* shifted delete key       */
define SHF_HOME_KEY       0x4720      /* shifted home key         */
define SHF_END_KEY        0x4f20      /* shifted end key          */
define TAB_KEY            0x0009      /* tab key                  */
define BACK_TAB           0x010f      /* shifted tab key          */
define BACK_SPACE         0x0008      /* back space key           */
define ESC_KEY            0x001b      /* escape key               */
define RET_KEY            0x000d      /* return key               */
define SPACE              ' '         /* return key               */
```

```c
define F1_KEY      0x013b    /* F1 key scan code         */
define F10_KEY     0x0144    /* F10 key scan code        */
define SHFT_F1     0x0154    /* shifted F1 scan code     */
define SHFT_F10    0x015d    /* shifted F10 scan code    */
define CTRL_F1     0x015e    /* control F1 scan code     */
define CTRL_F10    0x0167    /* control F10 scan code    */
define ALT_F1      0x0168    /* alternate F1 scan code   */
define ALT_F10     0x0171    /* alternate F10 scan code  */
define CTL_A       0x0001    /* ctl ... sequence         */
define CTL_B       0x0002    /* ctl ... sequence         */
define CTL_C       0x0003    /* ctl ... sequence         */
define CTL_D       0x0004    /* ctl ... sequence         */
define CTL_E       0x0005    /* ctl ... sequence         */
define CTL_F       0x0006    /* ctl ... sequence         */
define CTL_G       0x0007    /* ctl ... sequence         */
define CTL_H       0x0008    /* ctl ... sequence         */
define CTL_I       0x0009    /* ctl ... sequence         */
define CTL_J       0x000a    /* ctl ... sequence         */
define CTL_K       0x000b    /* ctl ... sequence         */
define CTL_L       0x000c    /* ctl ... sequence         */
define CTL_M       0x000d    /* ctl ... sequence         */
define CTL_N       0x000e    /* ctl ... sequence         */
define CTL_O       0x000f    /* ctl ... sequence         */
define CTL_P       0x0010    /* ctl ... sequence         */
define CTL_Q       0x0011    /* ctl ... sequence         */
define CTL_R       0x0012    /* ctl ... sequence         */
define CTL_S       0x0013    /* ctl ... sequence         */
define CTL_T       0x0014    /* ctl ... sequence         */
define CTL_U       0x0015    /* ctl ... sequence         */
define CTL_V       0x0016    /* ctl ... sequence         */
define ALT_A       0x011E    /* alt ... sequence         */
define ALT_S       0x011F    /* alt ... sequence         */
define ALT_D       0x0120    /* alt ... sequence         */
define ALT_F       0x0121    /* alt ... sequence         */
define ALT_G       0x0122    /* alt ... sequence         */
define ALT_H       0x0123    /* alt ... sequence         */
define ALT_J       0x0124    /* alt ... sequence         */
define ALT_K       0x0125    /* alt ... sequence         */
```

```c
define ALT_L    0x0126    /* alt ... sequence    */
define ALT_Q    0x0110    /* alt ... sequence    */
define ALT_W    0x0111    /* alt ... sequence    */
define ALT_E    0x0112    /* alt ... sequence    */
define ALT_R    0x0113    /* alt ... sequence    */
define ALT_T    0x0114    /* alt ... sequence    */
define ALT_Y    0x0115    /* alt ... sequence    */
define ALT_U    0x0116    /* alt ... sequence    */
define ALT_I    0x0117    /* alt ... sequence    */
define ALT_O    0x0118    /* alt ... sequence    */
define ALT_P    0x0119    /* alt ... sequence    */
define ALT_Z    0x012C    /* alt ... sequence    */
define ALT_X    0x012D    /* alt ... sequence    */
define ALT_C    0x012E    /* alt ... sequence    */
define ALT_V    0x012F    /* alt ... sequence    */
define ALT_B    0x0130    /* alt ... sequence    */
define ALT_N    0x0131    /* alt ... sequence    */
define ALT_M    0x0132    /* alt ... sequence    */

/* ------------------- video attribute definitions ------------------- */ define DSP_LINES         25      /* total number of lines in the display */
define DSP_COLUMNS       80      /* total number of columns in the dsp  */
define MONO_SEGMENT      0xb000  /* monochrome display segment  */
define COLOR_SEGMENT     0xb800  /* color display segment  */
define REG_VIDEO         0x07    /* regular video attribute  */
define INV_VIDEO         0x70    /* inverse video attribute  */
define UNDERLINE         0x01    /* underline video attribute  */
define BLACK             0x00    /* black attribute  */
define BLUE              0x01    /* blue attribute  */
define GREEN             0x02    /* green attribute  */
define CYAN              0x03    /* cyan attribute  */
define RED               0x04    /* red attribute  */
define MAGENTA           0x05    /* magenta attribute  */
define YELLOW            0x06    /* yellow attribute  */
define WHITE             0x07    /* white attribute  */
define LIGHT             0x08    /* high intensity video attribute  */
define INTENSIFY         0x08    /* high intensity video attribute  */
define BLINKING          0x80    /* blinking video attribute  */
```

```c
define SCROLL_UP        6    /* directional control for scroll up   */
define SCROLL_DOWN      7    /* directional control for scroll down */

/* -------------------------------------------------------------------------- */
/* standard macros                                                            */
/* -------------------------------------------------------------------------- */ define foreground(a)       (a)
define background(a)       ((a) << 4)
define foreground_of(a)    (a & 0xf)
define background_of(a)    (((a) >> 4) & 0xf)
define bytesof(x)          (sizeof(x) / sizeof(byte))
define wordsof(x)          (sizeof(x) / sizeof(word))
define longsof(x)          (sizeof(x) / sizeof(long))
define arg_to_num(n, p)    for (*(n) = 0; '0' <= (p) && (p) <= '9'; *(n) = *(n) * 10 + *(*(p))++ - '0')

/*title*/
/* stderrs.h -- standard error code definitions  (c) 1986 Pertron Controls */

/* -------------------------------------------------------------------------- */
/* miscellanious error codes                                                  */
/* -------------------------------------------------------------------------- */ define NO_ERR           0                                    /* honky dory status */ define ERR_MASK         0x8000                               /* all errors have this bit set */ define MISC_ERR_MASK    0x4000                               /* all miscellanious errors have this bit set */ define ERR              (ERR_MASK + MISC_ERR_MASK + 0x00 )   /* plain old failure for unspecified reasons */ define OUT_OF_MEMORY    (ERR_MASK + MISC_ERR_MASK + 0x01 )
```

```c
define OVERLAY_ERR     (ERR_MASK + MISC_ERR_MASK + 0x02 )
define UNKNOWN_FUNC    (ERR_MASK + MISC_ERR_MASK + 0x03 )
define STACK_OVERFLOW  (ERR_MASK + MISC_ERR_MASK + 0x04 )
define PARAMETER_ERR   (ERR_MASK + MISC_ERR_MASK + 0x05 )
define BUFFER_OVERFLOW (ERR_MASK + MISC_ERR_MASK + 0x06 )
define FILE_ERR        (ERR_MASK + MISC_ERR_MASK + 0x07 )
define NOT_INITIALIZED (ERR_MASK + MISC_ERR_MASK + 0x08 )

/* ............................................................................
   ....... */
/* error codes for threecom interface
             */
/* ............................................................................
   ....... */
define E3_ERR_MASK   0x2000                              /* all threecom errors have this bit set
             */
define E3NOT_HAPPY  (ERR_MASK + E3_ERR_MASK + 0x00 )     /* operation other than reset attempted
after an error   */
define E3OVLY_ERR   (ERR_MASK + E3_ERR_MASK + 0x01 )     /* manager overlay error
             */
define E3OUT_MEM    (ERR_MASK + E3_ERR_MASK + 0x02 )     /* manager out of memory
             */
define E3FILE_ERR   (ERR_MASK + E3_ERR_MASK + 0x03 )     /* manager file error
             */
define E3DMA_ERR    (ERR_MASK + E3_ERR_MASK + 0x03 )     /* comprocessor resident manager dma
error            */
define E3BAD_DMA_SPEC  (ERR_MASK + E3_ERR_MASK + 0x04 )  /* invalid dma specification
             */
define E3BAD_INT_SPEC  (ERR_MASK + E3_ERR_MASK + 0x05 )  /* invalid interrupt channel
specification    */
define E3NOT_CONFIG (ERR_MASK + E3_ERR_MASK + 0x06 )     /* threecom operation attempted before
configuration    */
define E3RST_IGNORED   (ERR_MASK + E3_ERR_MASK + 0x07 )  /* reset signal to adapter was
ignored          */
define E3RST_FAILED (ERR_MASK + E3_ERR_MASK + 0x08 )     /* adapter reset failed
             */
define E3NOT_RST    (ERR_MASK + E3_ERR_MASK + 0x09 )     /* threecom operation attempted before a
```

```c
                           reset                */
define  E3TOUT              (ERR_MASK + E3_ERR_MASK + 0x0A )    /* your basic timeout, no known
reason                 */
define  E3XMT_DATA_TOUT     (ERR_MASK + E3_ERR_MASK + 0x0B )    /* timeout while transmitting
data                   */
define  E3XMT_ACC_TOUT      (ERR_MASK + E3_ERR_MASK + 0x0C )    /* timeout while waiting for
acceptance of a transmit    */
define  E3XMT_REJ           (ERR_MASK + E3_ERR_MASK + 0x0D )    /* transmition rejected by adapter
                       */
define  E3RCV_DATA_TOUT     (ERR_MASK + E3_ERR_MASK + 0x0E )    /* timeout while receiving data
                       */
define  E3RCV_OVR_FLOW      (ERR_MASK + E3_ERR_MASK + 0x0F )    /* receive buffer overflowed
                       */
define  E3RCV_BAD_LEN       (ERR_MASK + E3_ERR_MASK + 0x10 )    /* number of bytes received
doesn't jive           */
define  E3DN_STK_OVR        (ERR_MASK + E3_ERR_MASK + 0x11 )    /* downloaded program manger
stack overflow         */
define  E3DN_OUT_MEM        (ERR_MASK + E3_ERR_MASK + 0x12 )    /* downloaded program manger out of
memory                 */
define  E3DN_OVLY_ERR       (ERR_MASK + E3_ERR_MASK + 0x13 )    /* downloaded program manger
overlay error          */
define  E3DN_BAD_ID         (ERR_MASK + E3_ERR_MASK + 0x14 )    /* downloaded program manger bad
program id             */

/* ------------------------------------------------------------------------------- */
/* error codes set by the threecom compiler              */
/* ------------------------------------------------------------------------------- */ define  COMP_ERR_MASK       0x1000                              /* all compiler errors
have this bit set   */
define  BOOLEAN_ERR         (ERR_MASK + COMP_ERR_MASK + 0x00 )  /* couldn't booleanate
                       */
define  COMBINE_ERR         (ERR_MASK + COMP_ERR_MASK + 0x00 )  /* couldn't combine boolean
expressions            */
define  CODEGEN_ERR         (ERR_MASK + COMP_ERR_MASK + 0x00 )  /* couldn't generate afl code
```

```c
define FORCE_ERR      (ERR_MASK + COMP_ERR_MASK + 0x00 )      /* force table length error
                */

/* ----------------------------------------------------------------------------- */
/* error codes set by plcnet               */
/* ----------------------------------------------------------------------------- */
define PLCNETNAK    0x15                                      /* negative acknowledge (crc error etc)  */
define PLCNETWAK    0x16                                      /* wait acknoledge (sync, try later) */
define PLCNETHACK   0x1a                                      /* halt acknoledge (sub, reject cmd)  */
define PLCNETQUACK  0x1b                                      /* quit acknoledge (fatal driver error)  */
define PLCNETRINT   0x18                                      /* reverse interrupt (cancel)  */
define PLCNETTOUT   0x07                                      /* error status for timeout   */

/* STDIO.H -- Standard I/O definitions */
/**
 *
 * This header file defines the information used by the standard I/O
 * package.
 *
 **/ define _BUFSIZ 512        /* standard buffer size */
define BUFSIZ 512         /* standard buffer size */
define _NFILE 20          /* maximum number of files */ struct _iobuf
```

```
{
    char *_ptr;         /* current buffer pointer */
    int _rcnt;          /* current byte count for reading */
    int _wcnt;          /* current byte count for writing */
    char *_base;        /* base address of I/O buffer */
    char _flag;         /* control flags */
    char _file;         /* file number */
    int _size;          /* size of buffer */
    char _cbuff;        /* single char buffer */
    char _pad;          /* (pad to even number of bytes) */
};
/* STDIO.H -- Standard I/O definitions */ extern struct _iobuf -iob[_NFILE];

define _IORREAD 1      /* read flag */
define _IOWRT 2        /* write flag */
define _IONBF 4        /* non-buffered flag */
define _IOMYBUF 8      /* private buffer flag */
define _IOEOF 16       /* end-of-file flag */
define _IOERR 32       /* error flag */
define _IOSTRG 64
define _IORW 128       /* read-write (update) flag */ if SPTR
define NULL 0          /* null pointer value */
else
define NULL 0L
endif
define FILE struct _iobuf      /* shorthand */
define EOF (-1)                /* end-of-file code */ define stdin  (&_iob [0])      /* standard input file pointer */
define stdout (&_iob [1])      /* standard output file pointer */
define stderr (&_iob[2])       /* standard error file pointer */ define getc(p) (--(p)--_rcnt>=0? *(p)->_ptr++:_filbf(p))
define getchar() getc(stdin)
```

```c
define putc(c,p) (--(p)->_wcnt>=0? ((int) (*(p)->_ptr++=(c))):_flsbf((c),p))
define putchar (c) putc(c,stdout)
define feof(p) (((p)->_flag&_IOEOF) !=0)
define ferror(p) (((p)->_flag&IOERR) !=0)
define fileno(p) (p)->_file
define rewind (fp) fseek (fp, 0L, 0)
define fflush (fp) _flsbf (-1,fp)
define clearerr (fp) clrerr (fp)

FILE *fopen();
FILE *freopen();
long ftell();
char *fgets();

define abs (x) ((x) <0?-(x) : (x))
define max (a,b) ((a)>(b) ? (a) : (b))
define min (a,b) ((a)<=(b)?(a) : (b))
/*title*/
/* target.h -- plcnet target dependant data for 68010 */

/* ------------------------------------------------------------------ */
/* macros and target dependant definitions for 68010 plc              */
/* ------------------------------------------------------------------ */ include "plcbios.h"

undef xmt_select
undef xmt_poll
undef rcv_cmd
undef rej_cmd
undef xmt_msg
undef rcv_msg define CMD_MAX_TRIES          10
define CMD_TOUT_TIME                    (500/TICK)
define DAT_MAX_TRIES          50
define DAT_TOUT_TIME                    (100/TICK)
```

```c
define sleep(t)           wait_time(t)
define upmem(s,d,b)       movwords(s, d, (b) >> 1)
define downmem(s,d,b)     movwords(s, d, (b) >> 1)
define movmem(s,d,b)      movwords(s, d, (b) >> 1)
define cmpmem(s,d,b)      cmpwords(s, d, (b) >> 1)
define setmem(s,b,v)      setwords(s, (b) >> 1, v)
define getmem(b)          getquads2(ram_pool, (b)+7 >> 3)
define rlsmem(p,b)        rlsquads2(ram_pool, (p))

define xmt_net_frame(f)   xmt_frame(&prolan, f)
define rtv_net_frame(f)   rtv_frame(&prolan, f)
define rls_net_frame(f)   rls_frame(&prolan, f)
define rcv_net_frame(t)   rcv_frame(&prolan, t)

/*#define rls_net_frame(f)    (f ? (setmem(f, (f)->plen+4, 0), rls_frame(&prolan, f)) : 0)*/ s
/*title*/
/* trace.h -- trace utility header  (c) 1986 Pertron Controls */ define TRACENBL    1       /* remove to disable trace completely */

/* =================== macro definitions =================== */
define mum(r)             (sub_row((r), rung_top(r)))

ifdef TRACENBL define entry_point()      (editor_flags.trace ? (prn_scrn(), nesting_level=0):0)
define exit_point()       (editor_flags.trace ? (prn_scrn(), putchar('\n')):0)
define enter(s,i,j,k,l)   (editor_flags.trace ? (enter_nest(),printf((s),(i),(j),(k),(l))):0)
define within(s,i,j,k,l)  (editor_flags.trace ? (in_nest(),printf((s),(i),(j),(k),(l))):0)
define leave(s,i)         return((editor_flags.trace ? (leave_nest(),printf(s)):0),(i))

else define entry_point()
define exit_point()
```

```
define enter(s,i,j,k,l)
define within(s,i,j,k,l)
define leave(s,i)        return(i)

endif
```

```
/* =========================== global variables =========================== */
extern int nesting_level;                /* current subroutine nesting level   */
extern struct editor_flags_def editor_flags;  /* useless comment for symmetry   */
```

LOGIC SCANNER 57

PAL20L8A (FAMILY CODE 2226)                                PAL DESIGN SPECIFICATION
1980021                                                    GATES 06/29/86
LOGIC SCANNER CONDITION TEST LOGIC (300 NS)
(C) 1986 PERTRON CONTROLS CORPORATION

CLK /RESET /CMD /WR /SCP J0  J1  CTS0 CTS1 CTS2 CTS3 GND
CT  OVR  NC1  C  Z /LD3 /LD2 /LD1 /LD0 OET N  VCC

/OET = GND

IF ( J0*/CTS2) LD0 = /RESET*/CMD*SCP* J1*/CTS3*        /CTS0* Z
              + /RESET*/CMD*SCP* J1*/CTS3*/CTS1*       N*/OVR
              + /RESET*/CMD*SCP* J1*/CTS3*/CTS1*       /N* OVR
              + /RESET*/CMD*SCP* J1*/CTS3* CTS1* CTS0* OVR
              + /RESET*/CMD*SCP* J1* CTS3*             CT
              + /RESET*/CMD*SCP*/J1
              + /RESET* CMD*SCP* WR

IF ( J0* CTS2) LD1 = /RESET*/CMD*SCP* J1*/CTS3*        /CTS0* Z
              + /RESET*/CMD*SCP* J1*/CTS3*/CTS1*       C
              + /RESET*/CMD*SCP* J1*/CTS3* CTS1*/CTS0* /C
              + /RESET*/CMD*SCP* J1*/CTS3* CTS1* CTS0* N
              + /RESET*/CMD*SCP* J1* CTS3*             CT

```
           + /RESET*/CMD*SCP*/J1
           + /RESET* CMD*SCP* WR

IF (/J0*/CTS0) LD2 = /RESET*/CMD*SCP* J1*/CTS3*/CTS2*/CTS1* /N*/OVR*/Z
              + /RESET*/CMD*SCP* J1*/CTS3*/CTS2*/CTS1*  N* OVR*/Z
              + /RESET*/CMD*SCP* J1*/CTS3*/CTS2* CTS1* /Z
              + /RESET*/CMD*SCP* J1*/CTS3* CTS2*/CTS1* /Z*/C
              + /RESET*/CMD*SCP* J1*/CTS3* CTS2* CTS1* /Z*C
              + /RESET*/CMD*SCP* J1* CTS3*           /CT
              + /RESET* CMD*SCP* WR

IF (/J0* CTS0) LD3 = /RESET*/CMD*SCP* J1*/CTS3*/CTS2*/CTS1* /N*/OVR
              + /RESET*/CMD*SCP* J1*/CTS3*/CTS2*/CTS1*  N* OVR
              + /RESET*/CMD*SCP* J1*/CTS3*/CTS2* CTS1* /OVR
              + /RESET*/CMD*SCP* J1*/CTS3* CTS2* CTS1* /N
              + /RESET*/CMD*SCP* J1*/CTS3* CTS2*/CTS1* /C
              + /RESET*/CMD*SCP* J1* CTS3*           /CT
              + /RESET* CMD*SCP* WR

FUNCTION TABLE

/RESET /CMD /WR /SCP J1 J0 CTS3 CTS2 CTS1 CTS0 Z C N OVR CT
/LD0 /LD1 /LD2 /LD3
-----------------------------------------------------------
; /
; R
; E/ /  CCCC      ////
; S C/S TTTT  O   LLLL
; E M W C JJ SSSS  V C DDDD
; T D R P 10 3210 ZCNR T 0123
;-------------------------------
 L X X X XH XLXX XXXX X  HZZZ ; RESET
 L X X X XH XHXX XXXX X  ZHZZ
```

```
L X X X XL XXXL XXXX X   ZZHZ

L X X X XL XXXH XXXX X   ZZZH

X X X H XH XLXX XXXX X   HZZZ ; SCP

X X X H XH XHXX XXXX X   ZHZZ

X X X H XL XXXL XXXX X   ZZHZ

X X X H XL XXXH XXXX X   ZZZH

H H X L LH XLXX XXXX X   LZZZ ; J1

H H X L LH XHXX XXXX X   ZLZZ

H H X L LL XXXL XXXX X   ZZHZ

H H X L LL XXXH XXXX X   ZZZH

H L L L XH XLXX XXXX X   LZZZ ; RUN CMD

H L L L XH XHXX XXXX X   ZLZZ

H L L L XL XXXL XXXX X   ZZLZ

H L L L XL XXXH XXXX X   ZZZL

H H X L HH LLLL HXXX X   LZZZ ; (N^OVR) + Z

H H X L HH LLLL XXHL X   LZZZ

H H X L HH LLLL XXLH X   LZZZ

H H X L HH LLLL LXHH X   HZZZ

H H X L HH LLLL LXLL X   HZZZ

H H X L HL LLLL HXXX X   ZZHZ ; /[(N^OVR) + Z]

H H X L HL LLLL XXHL X   ZZHZ

H H X L HL LLLL XXLH X   ZZHZ

H H X L HL LLLL LXHH X   ZZLZ

H H X L HL LLLL LXLL X   ZZLZ

H H X L HH LLLH XXHL X   LZZZ ; N^OVR

H H X L HH LLLH XXLH X   LZZZ

H H X L HH LLLH XXHH X   HZZZ

H H X L HH LLLH XXLL X   HZZZ

H H X L HL LLLH XXHL X   ZZZH ; /(N^OVR)

H H X L HL LLLH XXLH X   ZZZH

H H X L HL LLLH XXHH X   ZZZL

H H X L HL LLLH XXLL X   ZZZL
```

; 1980021

; /

; R

; E/ / CCCC      ////

```
;SC/S TTTT O  LLLL
;EMWCJJSSSS VC DDDD
;TDRP 10 3210 ZCNR T 0123
;--------------------------------
 HH X L HH LLHL HXXX X  LZZZ ;Z
 HH X L HH LLHL LXXX X  HZZZ
 HH X L HL LLHL HXXX X  ZZHZ ;/Z
 HH X L HL LLHL LXXX X  ZZLZ
 HH X L HH LLHH XXXH X  LZZZ ;OVR
 HH X L HH LLHH XXXL X  HZZZ
 HH X L HL LLHH XXXH X  ZZZH ;/OVR
 HH X L HL LLHH XXXL X  ZZZL
 HH X L HH LHLL HXXX X  ZLZZ ;Z+C
 HH X L HH LHLL XHXX X  ZLZZ
 HH X L HH LHLL LLXX X  ZHZZ
 HH X L HL LHLL HXXX X  ZZHZ ;/(Z+C)
 HH X L HL LHLL XHXX X  ZZHZ
 HH X L HL LHLL LLXX X  ZZLZ
 HH X L HH LHLH XHXX X  ZLZZ ;C
 HH X L HH LHLH XLXX X  ZHZZ
 HH X L HL LHLH XHXX X  ZZZH ;/C
 HH X L HL LHLH XLXX X  ZZZL
 HH X L HH LHHL HXXX X  ZLZZ ;Z+/C
 HH X L HH LHHL XLXX X  ZLZZ
 HH X L HH LHHL LHXX X  ZHZZ
 HH X L HL LHHL HXXX X  ZZHZ ;/(Z+/C)
 HH X L HL LHHL XLXX X  ZZHZ
 HH X L HL LHHL LHXX X  ZZLZ
 HH X L HH LHHH XXHX X  ZLZZ ;N
 HH X L HH LHHH XXLX X  ZHZZ
 HH X L HL LHHH XXHX X  ZZZH ;/N
 HH X L HL LHHH XXLX X  ZZZL
 HH X L HH HLXX XXXX H  LZZZ ;CT
 HH X L HH HHXX XXXX H  ZLZZ
 HH X L HH HLXX XXXX L  HZZZ
 HH X L HH HHXX XXXX L  ZHZZ
 HH X L HL HXXL XXXX H  ZZHZ ;/CT
 HH X L HL HXXH XXXX H  ZZZH
```

H H X L HL HXXL XXXX L  ZZLZ

H H X L HL HXXH XXXX L  ZZZL

PAL20L8A (FAMILY CODE 2226)         PAL DESIGN SPECIFICATION

1980030                              GATES 10/06/86

LOGIC SCANNER CONTROL STORE PARITY LOGIC (C) 1986 PERTRON CONTROLS CORPORATION

/RESET /CTRLSTR /WR  PD7 PD6 PD5  PD4  PD3  PD2 PD1 PD0 GND

IND  NDX  /PWE /PIE /B1 /PAROK /BERR1 /BERR0 /B0 /POE A1  VCC

PAROK = /NDX*/IND*PD7*PD6*PD5*PD4*PD3*PD2*PD1*PD0

+ /NDX*  IND*PD7*PD6*PD5*PD4*PD3*PD2

+  NDX*/IND*PD7*PD6*PD5*PD4*         PD1*PD0

+  NDX* IND*PD7*PD6*PD5*PD4

IF (/RESET*CTRLSTR*/WR*B1*B0*/A1) BERR0 = /PD0 + /PD1 + /PD4 + /PD5

IF (/RESET*CTRLSTR*/WR*B1*B0* A1) BERR1 = /PD2 + /PD3 + /PD6 + /PD7

PWE = /RESET* CTRLSTR*WR*B1*B0

POE = /RESET* CTRLSTR*WR

PIE = /RESET*/CTRLSTR

+ /RESET*/WR

FUNCTION TABLE

/RESET /CTRLSTR /WR A1 B1 B0 NDX IND PD7 PD6 PD5 PD4 PD3 PD2 PD1 PD0
/PAROK /BERR1 /BERR0 /PWE /POE /PIE
---------------------------------------
; /
; C
;/T       ///
;R R      P B B

```
;EL        .AEE///
;SS/    N I PPPPPPPP  RRRPPP
;ETWABB D N DDDDDDDD  ORRWOI
;TRR1 10 X D 76543210 K 1 0 E E E
;-----------------------------------

LXXXXX X X XXXXXXXX  XZZHHH ; RESET

HHXXXX X X XXXXXXXX  XZZHHL ; NOT CTRLSTR

HXHXXX X X XXXXXXXX  XXXHHL ; NOT WRITE

HXLXXX X X XXXXXXXX  XZZXXX ; WRITE

HXXXLX X X XXXXXXXX  XZZHXX ; B1

HXXXXL X X XXXXXXXX  XZZHXX ; B0

HLHHHH X X LXXXXXXX  HLZHHL ; PD7

HLHHHH X X XLXXXXXX  HLZHHL ; PD6

HLHLHH X X XXLXXXXX  HZLHHL ; PD5

HLHLHH X X XXXLXXXX  HZLHHL ; PD4

HLHHHH L X XXXXLXXX  HLZHHL ; PD3

HLHHHH L X XXXXXLXX  HLZHHL ; PD2

HLHLHH X L XXXXXXLX  HZLHHL ; PD1

HLHLHH X L XXXXXXXL  HZLHHL ; PD0

HLLXXX X X XXXXXXXX  XZZXLH ; CTRLSTR WRITE

HLLXHH X X XXXXXXXX  XZZLLH ; CTRLSTR WRITE
```

We claim:

1. In a programmable logic controller system including a programmable logic controller (15) having input/output scanner means (55) for reading data from and writing data to a plurality of peripheral controllers as determined by a ladder diagram, each of said plurality of peripheral controllers for controlling a plurality of data points, said input/output scanner means including an input/output scan processor (61) coupled to input/output ports, said input/output ports for coupling to said plurality of peripheral controllers, and a memory means (63) for storing data read from and to be written to said peripheral controllers, the improvement comprising a logic scanner means (57) coupled to said input/output scanner means for executing compiled Boolean logic statements representing said ladder diagram wherein said logic scanner means comprises program memory means (85) for storing said compiled Boolean logic statements, control logic means (81) for storing logic equations, a Boolean processor (83) for directly executing said compiled Boolean logic statements under control of said logic equations, and data memory means (87) for storing the status of each of said plurality of data points.

2. The improvement defined by claim 1 wherein said program memory means comprises a random access memory.

3. The improvement defined by claim 1 wherein said control logic means comprises a programmed logic array (81) programmed with said logic equations.

4. The improvement defined by claim 1 wherein said Boolean processor of said logic scanner means comprises a bit sliced microprocessor (83).

5. The improvement defined by claim 1 wherein said data memory means (87) comprises a random access memory.

6. A programmable logic controller system including a programmable logic controller having input/output scanner means (55) for reading data from and writing data to a plurality of peripheral controllers as determined by a ladder diagram, each of said plurality of peripheral controllers for controlling a plurality of data points, said input/output scanner means including an input/output scan processor (61) coupled to input/output ports, said input/output ports for coupling to said plurality of peripheral controllers, and a first memory means (63) for storing data read from and to be written to said peripheral controllers, wherein said programmable logic controller is for coupling to a personal computer (11) over a communications link (13), said personal computer including i) second memory means (12) for storing data and programs having statements to be executed, and ii) processor means (14) for executing said statements in said second memory means (12) utilizing said data in said second memory means (12), wherein said programs comprise:

a) editor task means (35) for creating and modifying source code representing said ladder diagram and generating a pointer corresponding to created and modified rungs of said ladder diagram;

b) compiler task means (37) for compiling said ladder diagram source code and generating object code for each rung of said ladder diagram utilizing said pointer generated by said editor task means;

c) housekeeping task means (38) for creating and maintaining a list of data table values representing elements of said ladder diagram and said data points;

d) communications task means (39) for converting said generated object code into packets for transmission over said communications link and for receiving messages from said housekeeping task means for converting into packets for transmission over said communications link, which messages instruct said input/output scanner means to retrieve values representing the state of said data points.

7. The programmable logic controller system defined by claim 6 wherein said editor task means (35) comprises:

a) an initialization program (100) which when executed by said processor means loads into said second memory a predetermined ladder diagram located on an external storage medium (16) coupled to said personal computer (11);

b) a program loop which when executed by said processor means (14) performs a selected one of a command mode (104), a data monitor display mode (103), an element mode (105) and a line mode (107), wherein for said command mode, one of a selected one of a file command (111), a remote command (113), a find command (115), a print command (117) and an area command (119) is performed, wherein for said data monitor display mode (103), data corresponding to a selected ladder diagram element is displayed on a display monitor (18) coupled to said personal computer (11), wherein for said element mode (105), new rungs for said ladder diagram are inserted, rows, elements and forces in said ladder diagram are deleted and elements are installed in said ladder diagram, wherein for said line mode (107), elements are connected to each other by movement of a cursor on said display monitor (18).

8. The programmable logic controller system defined by claim 6 wherein said compiler task means (37) comprises a computer program which when executed by said processor means (14) converts source code representing said ladder diagram to object code and performs a data compression which removes unused fields within said source code.

9. The programmable logic controller system defined by claim 6 wherein said housekeeping task means (38) comprises a computer program which when executed by said processor means (14) creates and maintains a list of data table values representing elements of said ladder diagram and dispatches messages to said communications task means (39) to retrieve data from said programmable logic controller (15).

10. The programmable logic controller system defined by claim 6 wherein said communications task means (39) comprises a computer program which when executed by said processor means (14) converts said generated object code into packets for transmission over said communications link (13) and receives messages from said housekeeping task means (38) and converts said received messages into packets for transmission over said communications link (13), which messages instruct said input/output scanner means (55) to retrieve values representing the state of said data points.

11. In a programmable logic controller system including a programmable logic controller (15) having input/output scanner means (55) for performing input/output scans which read data from and write data to a plurality of peripheral controllers as determined by a ladder diagram which is stored in a ladder diagram memory means (85) coupled to said input/output scanner means (55), each of said plurality of peripheral controllers for controlling a plurality of data points, said input/output scanner means (55) including an input/output scan processor (61) coupled to input/output ports, said input/output ports for coupling to said plurality of peripheral controllers, and a first data memory means (63) coupled to said input/output scan processor for storing data read from and to be written to said peripheral controllers, wherein said programmable logic controller is for coupling to a personal computer (11) over a communications link (13), and said input/output scanner means (55) further comprises:

a) communications task means (47) for receiving packets of object code and compressed source code generated by said personal computer (11) and decoding said packets, said object code and compressed source code representing rungs of said ladder diagram;

b) ladder logic control task means (49) for i) receiving said decoded object code and source code from said communications task means 47), ii) adding to or replacing rungs of ladder diagram information stored in said ladder diagram memory means (85), and iii) performing input/output scanning for reading from and writing to said peripheral controllers;

said programmable logic controller (15) further comprising logic scanner means (57) for performing logic scans which calculate data to be written to said peripheral controllers during said input/output scans, said calculated data being stored in a second data memory means (87) coupled to said logic scanner means (57).

12. The programmable logic controller system defined by claim 11 wherein said communications task means (47) comprises a computer program which when executed by said input/output scan processor (61) decodes packets of data sent by said personal computer (11) over said communications link (13) to obtain ladder diagram object code and compressed source code and commands which cause uploads and downloads of said ladder diagrams between said personal computer (11) and said programmable logic controller (15) over said communications link (13).

13. The programmable logic controller system defined by claim 12 wherein said ladder logic control task means (49) comprises a computer program which when executed by said input/output scan processor (61) downloads and uploads said decoded ladder diagram object code and source code to and from said first memory means (63), respectively, and controls said input/output scanning and said logic scanning.

14. The programmable logic controller system defined by claim 13 wherein said ladder logic control task means (49) further comprises a parallel logic and input/output control subtask means (53) which ensures that said input/output scanning and said logic scanning are performed synchronously and in parallel.

15. The programmable logic controller system defined by claim 14 wherein said parallel logic and input/output control subtask means (53) comprises a computer program which when executed by said input/output scan processor (61):
a) reads data from said peripheral controllers and stores said read data in said first data memory means (63);
b) swaps data between said first (63) and second (87) data memory means during a time period in between said logic scans and said input/output scans so that the data to be output to said peripheral controllers is the data most recently calculated by the execution of said ladder diagram and the data used during the execution of said ladder diagram to create said calculated data is the data most recently read from said peripheral controllers during said input/output scans.

16. The programmable logic controller system defined by claim 11 further comprising linker task means (51) for adding and replacing rungs of said ladder diagram stored in said ladder diagram memory means (85) based upon data generated by said personal computer (11) and received over said communications link (13).

17. The programmable logic controller system defined by claim 16 wherein said linker task means (51) comprises a computer program which when executed by said input/output scan processor (61) links ladder diagram rungs generated by said personal computer and decoded by said communications task means (47) into a linked list of ladder diagram rungs stored in said ladder diagram memory means (85) and removes from said linked list rungs which have been removed by operation of said personal computer (11).

* * * * *